US009639722B2

(12) United States Patent
Landau et al.

(10) Patent No.: US 9,639,722 B2
(45) Date of Patent: May 2, 2017

(54) OBJECT MANAGEMENT SYSTEM AND METHOD

(71) Applicant: THE STANLEY WORKS ISRAEL LTD., Rosh Ha'Ayin (IL)

(72) Inventors: Eitan Landau, Netanya (IL); Amir Katz, Bat-Heffer (IL); Ori Goren, Shoham (IL)

(73) Assignee: The Stanley Works Israel Ltd., Rosh Ha'Ayin (IL)

( * ) Notice: Subject to any disclaimer, the term of this patent is extended or adjusted under 35 U.S.C. 154(b) by 13 days.

(21) Appl. No.: 14/532,075

(22) Filed: Nov. 4, 2014

(65) Prior Publication Data

US 2015/0054627 A1    Feb. 26, 2015

Related U.S. Application Data

(62) Division of application No. 12/785,249, filed on May 21, 2010, now Pat. No. 8,928,463.

(Continued)

(51) Int. Cl.
*G05B 19/02*    (2006.01)
*H04Q 5/22*    (2006.01)
(Continued)

(52) U.S. Cl.
CPC ....... *G06K 7/10366* (2013.01); *G06Q 10/087* (2013.01); *G08B 13/1418* (2013.01);
(Continued)

(58) Field of Classification Search
CPC .......... G05B 19/02; H04Q 5/22; G08B 13/14; G08B 21/02; G08B 13/24; G06Q 10/08; G06Q 10/087
(Continued)

(56) References Cited

U.S. PATENT DOCUMENTS 3,253,270 A    5/1966  Downer
5,004,425 A *  4/1991  Hee ...................... A41D 13/008
                                                       361/220
(Continued)

FOREIGN PATENT DOCUMENTS

WO    2008/056942    5/2008

OTHER PUBLICATIONS

Examination Report as issued for European Patent Application No. 10163602.5, dated Jan. 27, 2014.

(Continued)

*Primary Examiner* — Nam V Nguyen
(74) *Attorney, Agent, or Firm* — Pillsbury Winthrop Shaw Pittman LLP

(57) ABSTRACT

An object management system that includes at least one object identification device to be secured to an associated object. The object identification devices provide radio frequency signals containing object identification codes. The system includes at least one user identification device providing a radio frequency signal containing a user identification code and a control unit having a reader for receiving and reading the signals provided by the user identification devices and the object identification devices. One aspect provides a remote unit that communicates directly with the control unit to receive information associated with a condition of the object management system at a location remote from the control unit. The remote unit is further configured to be carried by a user and configured to communicate information and/or an alert to the user, wherein the information and/or the alert is associated with the condition of the object management system.

12 Claims, 38 Drawing Sheets

Related U.S. Application Data

(60) Provisional application No. 61/180,778, filed on May 22, 2009.

(51) Int. Cl.
*G08B 13/14* (2006.01)
*G08B 23/00* (2006.01)
*G06K 7/10* (2006.01)
*G06Q 10/08* (2012.01)
*G08B 13/24* (2006.01)
*G08B 21/02* (2006.01)

(52) U.S. Cl.
CPC ..... *G08B 13/1427* (2013.01); *G08B 21/0288* (2013.01); *G08B 13/2417* (2013.01); *G08B 13/2434* (2013.01); *G08B 13/2454* (2013.01); *G08B 21/0275* (2013.01)

(58) Field of Classification Search
USPC ...... 340/10.33, 10.51, 10.52, 572.1; 361/212
See application file for complete search history.

(56) References Cited

U.S. PATENT DOCUMENTS

| | | | |
|---|---|---|---|
| 5,337,503 A | 8/1994 | Goby | |
| 5,650,766 A * | 7/1997 | Burgmann | G08B 21/22 200/DIG. 2 |
| 5,661,457 A | 8/1997 | Ghaffari et al. | |
| 5,664,113 A | 9/1997 | Worger et al. | |
| 5,686,897 A * | 11/1997 | Loh | G01R 31/026 324/509 |
| 5,742,256 A * | 4/1998 | Wakabayashi | H01Q 1/273 224/178 |
| 5,936,529 A * | 8/1999 | Reisman | G07C 9/00111 340/539.1 |
| 5,949,336 A | 9/1999 | Deschenes et al. | |
| 5,959,568 A | 9/1999 | Woolley | |
| 5,963,134 A | 10/1999 | Bowers et al. | |
| 5,969,613 A | 10/1999 | Yeager et al. | |
| 5,977,877 A * | 11/1999 | McCulloch | G08B 21/22 340/572.8 |
| 6,005,489 A | 12/1999 | Siegle et al. | |
| 6,064,306 A | 5/2000 | Deschenes et al. | |
| 6,128,932 A | 10/2000 | Mainetti et al. | |
| 6,150,921 A | 11/2000 | Werb et al. | |
| 6,188,320 B1 | 2/2001 | Kolton et al. | |
| 6,215,639 B1 * | 4/2001 | Hee | A61N 1/14 361/212 |
| 6,226,839 B1 | 5/2001 | Sayegh | |
| 6,232,870 B1 | 5/2001 | Garber et al. | |
| 6,234,051 B1 | 5/2001 | Bareggi | |
| 6,236,319 B1 * | 5/2001 | Pitzer | B63C 9/0005 340/572.8 |
| 6,239,737 B1 | 5/2001 | Black | |
| 6,326,890 B1 | 12/2001 | Costa | |
| 6,346,886 B1 * | 2/2002 | De La Huerga | A61J 1/035 340/3.1 |
| 6,472,989 B2 * | 10/2002 | Roy, Jr. | E05B 73/0017 340/551 |
| 6,556,819 B2 | 4/2003 | Irvin | |
| 6,567,003 B2 | 5/2003 | Kolton et al. | |
| 6,598,433 B1 | 7/2003 | Malvasio | |
| 6,600,418 B2 | 7/2003 | Francis et al. | |
| 6,764,012 B2 | 7/2004 | Connolly et al. | |
| 6,774,782 B2 | 8/2004 | Runyon et al. | |
| 6,804,578 B1 | 10/2004 | Ghaffari | |
| 6,845,279 B1 | 1/2005 | Gilmore et al. | |
| 6,853,303 B2 | 2/2005 | Chen et al. | |
| 6,933,847 B2 | 8/2005 | Feibelman | |
| 6,989,749 B2 | 1/2006 | Mohr | |
| 7,044,373 B1 | 5/2006 | Garber et al. | |
| 7,119,686 B2 | 10/2006 | Bertness et al. | |
| 7,123,149 B2 | 10/2006 | Nowak et al. | |
| 7,129,841 B2 | 10/2006 | Feibelman | |
| 7,145,437 B2 | 12/2006 | Jalkanen et al. | |
| 7,151,455 B2 | 12/2006 | Lindsay et al. | |
| 7,151,979 B2 | 12/2006 | Andersen et al. | |
| 7,209,041 B2 | 4/2007 | Hines et al. | |
| 7,227,467 B2 | 6/2007 | Feibelman | |
| 7,239,241 B2 | 7/2007 | Claudatos et al. | |
| 7,243,963 B2 | 7/2007 | De Lima Castro | |
| 7,245,221 B2 | 7/2007 | Claudatos et al. | |
| 7,249,401 B2 | 7/2007 | Copen et al. | |
| 7,253,736 B2 | 8/2007 | Tethrake et al. | |
| 7,259,674 B2 | 8/2007 | Marsilio et al. | |
| 7,278,341 B1 | 10/2007 | Novin et al. | |
| 7,283,975 B2 | 10/2007 | Broughton | |
| 7,298,240 B2 | 11/2007 | Lamar | |
| 7,307,530 B2 | 12/2007 | Fabian et al. | |
| 7,319,395 B2 | 1/2008 | Puzio et al. | |
| 7,333,016 B2 | 2/2008 | Ancel | |
| 7,336,181 B2 | 2/2008 | Nowak et al. | |
| 7,339,477 B2 | 3/2008 | Puzio et al. | |
| D567,128 S | 4/2008 | Sayegh | |
| 7,391,326 B2 | 6/2008 | Puzio et al. | |
| 7,397,375 B2 | 7/2008 | Marsilio et al. | |
| 7,535,356 B2 * | 5/2009 | Lerch | G06K 19/04 340/568.1 |
| 7,557,709 B2 | 7/2009 | Flores et al. | |
| 7,595,733 B2 | 9/2009 | Spagna | |
| 7,609,166 B2 | 10/2009 | Forster et al. | |
| 7,626,501 B2 | 12/2009 | Feibelman | |
| 7,636,047 B1 * | 12/2009 | Sempek | G08B 21/22 340/572.1 |
| 7,639,155 B2 | 12/2009 | Gauthier et al. | |
| 7,755,482 B2 | 7/2010 | Hubbard | |
| 7,811,203 B2 | 10/2010 | Unuma et al. | |
| 7,948,381 B2 * | 5/2011 | Lindsay | G06K 19/0717 340/539.11 |
| 8,020,768 B2 | 9/2011 | Ramos-Elizondo et al. | |
| 8,085,148 B2 | 12/2011 | Reed et al. | |
| 8,115,621 B2 * | 2/2012 | Rajala | G01S 1/042 340/539.11 |
| 8,928,463 B2 * | 1/2015 | Landau | G06Q 10/087 340/10.33 |
| 2002/0008621 A1 | 1/2002 | Barritz et al. | |
| 2002/0089434 A1 | 7/2002 | Ghazarian | |
| 2002/0153418 A1 | 10/2002 | Maloney | |
| 2002/0154014 A1 | 10/2002 | Elston | |
| 2003/0102970 A1 | 6/2003 | Creel et al. | |
| 2003/0160697 A1 | 8/2003 | Sedon et al. | |
| 2004/0056779 A1 | 3/2004 | Rast | |
| 2005/0078006 A1 | 4/2005 | Hutchins et al. | |
| 2005/0200485 A1 | 9/2005 | Connolly et al. | |
| 2005/0231365 A1 | 10/2005 | Tester et al. | |
| 2005/0234778 A1 | 10/2005 | Sperduti et al. | |
| 2006/0109118 A1 | 5/2006 | Pelo et al. | |
| 2006/0179473 A1 | 8/2006 | Innami et al. | |
| 2006/0202009 A1 | 9/2006 | Austin | |
| 2006/0267575 A1 | 11/2006 | Sampson et al. | |
| 2007/0219916 A1 | 9/2007 | Lucas | |
| 2008/0088447 A1 | 4/2008 | Flores et al. | |
| 2008/0115636 A1 | 5/2008 | DeRose et al. | |
| 2008/0147529 A1 | 6/2008 | Kreiner et al. | |
| 2008/0156047 A1 | 7/2008 | Sayegh | |
| 2008/0177267 A1 | 7/2008 | Sands et al. | |
| 2008/0266108 A1 | 10/2008 | Teeter | |
| 2008/0316035 A1 | 12/2008 | Tuttle | |
| 2009/0320532 A1 | 12/2009 | Bonato | |
| 2011/0273296 A1 | 11/2011 | Laase et al. | |

OTHER PUBLICATIONS

Examination Report as issued for European Patent Application No. 10163602.5 dated Jul. 23, 2012.

* cited by examiner

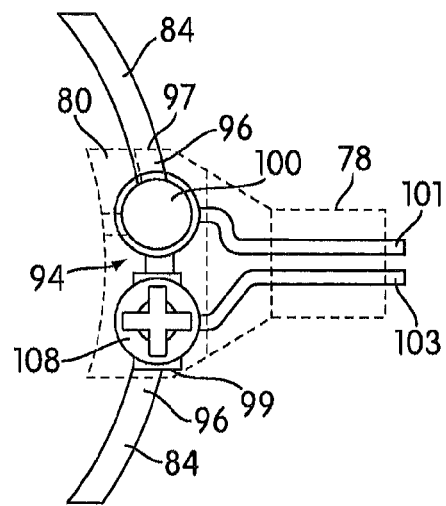
FIG. 9a
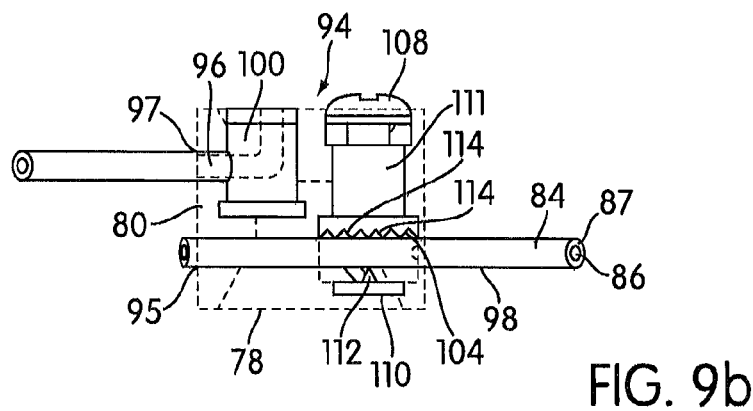
FIG. 9b
FIG. 9c

OBJECT MANAGEMENT SYSTEM AND METHOD

CROSS-REFERENCE TO RELATED APPLICATIONS

This application is a divisional of U.S. patent application Ser. No. 12/785,249, now U.S. Pat. No. 8,928,463, entitled "Object Management System and Method", filed May 21, 2010, which claims priority and benefit under 35 U.S.C. §119(e) to U.S. Provisional Patent Application No. 61/180,778, entitled "Object Management System and Method", filed on May 22, 2009. The contents of the above-noted patent and the above-noted application are incorporated herein in their entirety by reference.

BACKGROUND OF THE INVENTION

Field of the Invention

The present invention relates to an object management system and method.

Systems are known for managing the whereabouts and status of objects. For example, containers can store objects that are needed for accomplishing a task. However, missing objects and unauthorized use of objects at a worksite is often a problem.

SUMMARY

One aspect of the invention provides an object management system including at least one object identification device constructed to be secured to an associated object. The at least one object identification device provides a radio frequency signal containing an object identification code. The object management system also includes at least one user identification device providing a radio frequency signal containing a user identification code. The system also includes a control unit comprising a reader. The reader is configured to receive and read the radio frequency signal provided by the at least one user identification device and the at least one object identification device. The object management system has a remote unit that communicates directly with the control unit and is configured to receive information associated with a condition of the object management system from the control unit at a location remote from the control unit. The remote unit is further configured to be carried by a user and is configured to communicate information and/or an alert to the user, wherein the information and/or the alert is associated with the condition of the object management system.

Another aspect provides an object management system having a control unit including a reader that is configured to receive and read radio frequency signals. The system also includes at least one user identification device configured to transmit radio frequency signals containing a user identification code to the control unit. The user identification code is associated with a user. The system further includes at least one object identification device constructed to be secured to an associated object. The at least one object identification device is configured to transmit radio frequency signals to the control unit. The object identification device includes a transmitter configured to transmit radio frequency signals containing an object identification code and at least one actuator configured to be actuated to signal the transmitter to transmit the radio frequency signal. The control unit is configured to associate the at least one object identification device and the associated object with the at least one user identification device. The at least one actuator of the at least one object identification device is further configured to be actuated to signal the control unit to associate the at least one object identification device and the associated object with the at least one user identification device and the associated user.

Another aspect provides an object identification device configured to transmit a radio frequency signal containing an object identification code. The object identification device is constructed to be secured to an associated object. The object identification device includes a housing having an interior space and a transmitter within the housing configured to transmit radio frequency signals containing an object identification code. The object identification device also includes a closed loop connector having an electrically conductive material and operatively connected to the housing and moveable between i) an unsecured position wherein the at least one object identification device can be released from the associated object and ii) a secured position wherein the housing and the connector form a closed loop to be attached to the associated object. The connector is adjustable to adjust a size of the closed loop formed by at least a portion of the connector. The electrically conductive material of the connector is configured such that severing the connector or disconnecting the connector from the housing causes the RFID transmitter to cease transmission of radio frequency signals from the object identification device.

Another aspect provides an object management system comprising an alarm configured to indicate an occurrence of a hostile event and a control unit configured to activate the alarm to indicate the occurrence of the hostile event. The control unit includes a reader that is configured to receive and read radio frequency signals. The object management system also includes at least one object identification device constructed to be secured to an associated object and configured to send the radio frequency signals containing an object identification code to the control unit and at least one user identification device associated with a user and configured to send the radio frequency signals containing a user identification code to the control unit. The at least one user identification device is configured to interact with the control unit to enable removal of the at least one object identification device and associated object from the container an area without the activation of the alarm by the control unit. The control unit is configured to associate the at least one user identification device with the at least one object identification device and the associated object removed from the container area. At least one of the at least one user identification devices is a master user identification device configured to interact with the control unit such that information associated with the at least one object identification device and information associated with at least one of the user identification devices can be entered into the control unit.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

FIGS. 9a-9c illustrate an embodiment of an attachment mechanism of the object identification device of the object identification system;

FIG. 37b-37c are detailed views of portions of FIG. 37a.

DETAILED DESCRIPTION OF THE INVENTION

Figure 1:
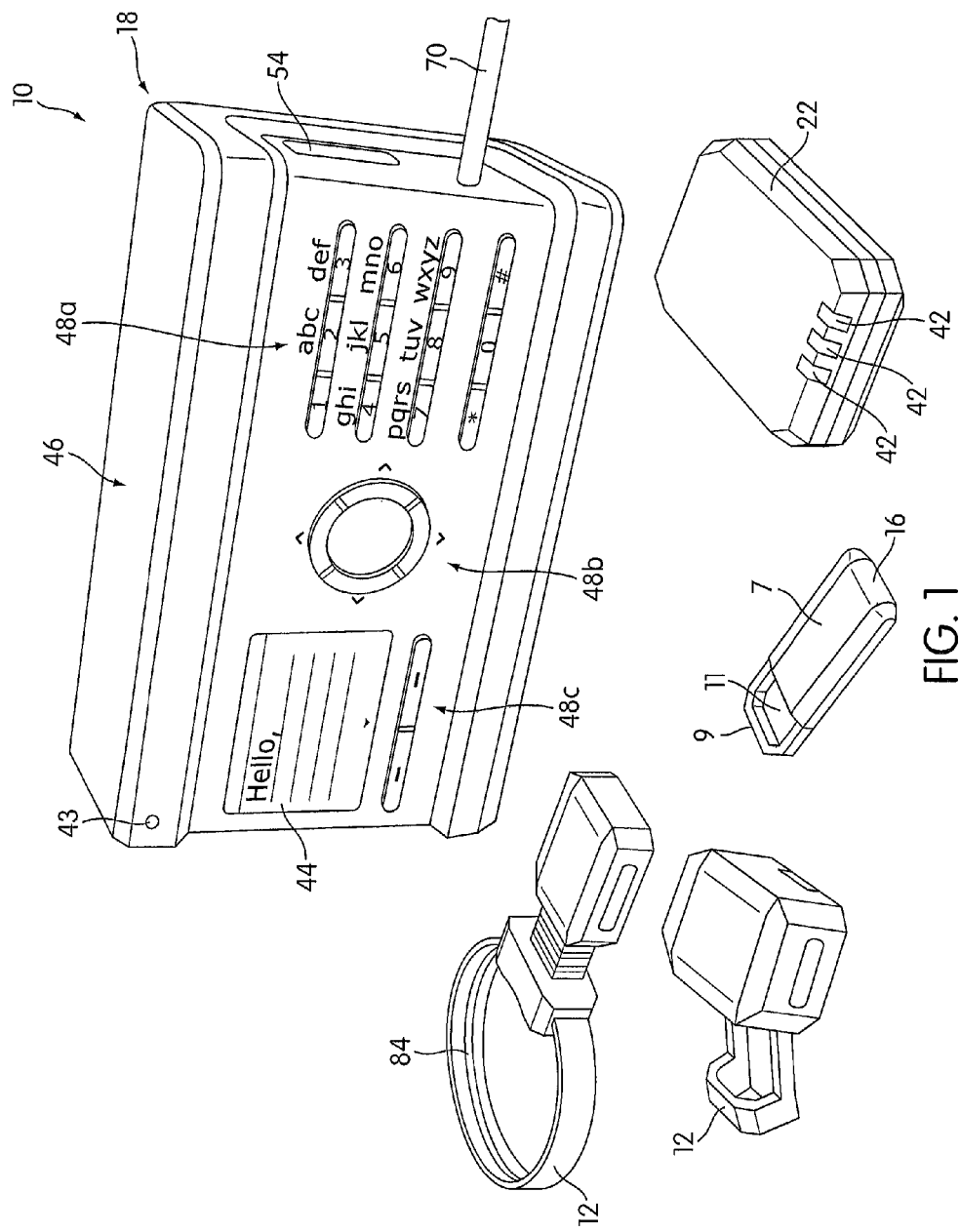
FIG. 1 is a perspective view an object management system in accordance with one embodiment.

FIG. 1 shows an object management system 10 in accordance with an embodiment of the present invention. In this embodiment, the object management system 10 includes at least one object identification device 12 constructed to be secured to an associated object 14, which are tools in the embodiment shown in FIGS. 11a-11b, although it is contemplated that the objects 14 may be any tangible item. The object identification devices 12 may be attached to or hung on their associated objects 14. The at least one object identification device 12 provides a radio frequency signal containing an object identification code. The system 10 also includes at least one user identification device 16 providing a radio frequency signal containing a user identification code. The user identification code is associated with a user 13, 13a (see FIG. 2). The user identification device 16 may include a body 7 and an extension 9 extending therefrom. A space 11 is provided between the extension 9 and the body 7 such that the extension 9 can be used to hang the user identification device 16.

A control unit 18 is also provided. The control unit 18 has a reader 20 (see FIG. 2) configured to interrogate and receive signals from the user identification devices 16, 16a and a reader 21 (see FIG. 2) configured to receive signals from the object identification devices 12. The readers 20, 21 will be described in more detail later. The control unit 18 may include a visual display 44, a liquid crystal display (LCD) screen, and user interface 48a, 48b, 48c. A light 43 may also be provided on the control unit 18. The control unit 18 may also include a receiving portion 54, which is constructed and arranged to receive a user identification device 16. That is, at least a portion of a user identification device 16 may be inserted into the receiving portion 54 of the control unit 18 to be "cradled" by the control unit 18. The control unit 18 will be described in more detail later.

In the illustrated embodiment, the object identification devices 12 are tool tags and the user identification devices 16 are user tags. At least one of the user identification devices 16 may be a master user identification device 16a associated with a master user 13a. The master user identification device 16a is configured to interact with the control unit 18 such that information associated with the at least one object identification device 12 and information associated with the at least one user identification device 16, 16a can be entered into the control unit 18. The master user identification device 16a will be described in more detail later. The control unit 18 directly communicates with a remote unit 22 that is configured to receive information associated with a condition of the object management system 10 from the control unit 18 at a location remote from the control unit 18. The control unit 18 and the remote unit 22 may directly transmit signals to one another without the control unit 18 or the remote unit 22 having to relay signals through a third device by sending signals to the third device and then having the third device send signals to the other one of the control unit 18 or the remote unit 22. However, it is contemplated that in some embodiments, the control unit 18 and the remote unit 22 may indirectly communicate with one another through the use of a third device. The remote unit 22 is further configured to be carried by a user 13, 13a and configured to communicate information and/or an alert to the user 13, 13a, wherein the information and/or the alert is associated with the condition of the object management system 10. In one embodiment, the remote unit 22 is carried by the master user 13a. The remote unit 22 may be a wireless device that can only receive signals, or alternatively, may be a wireless device that can receive and transmit signals. The remote unit 22 may operate at any appropriate frequency, such as, for example, RF, IR, or other frequencies.

Figure 2:
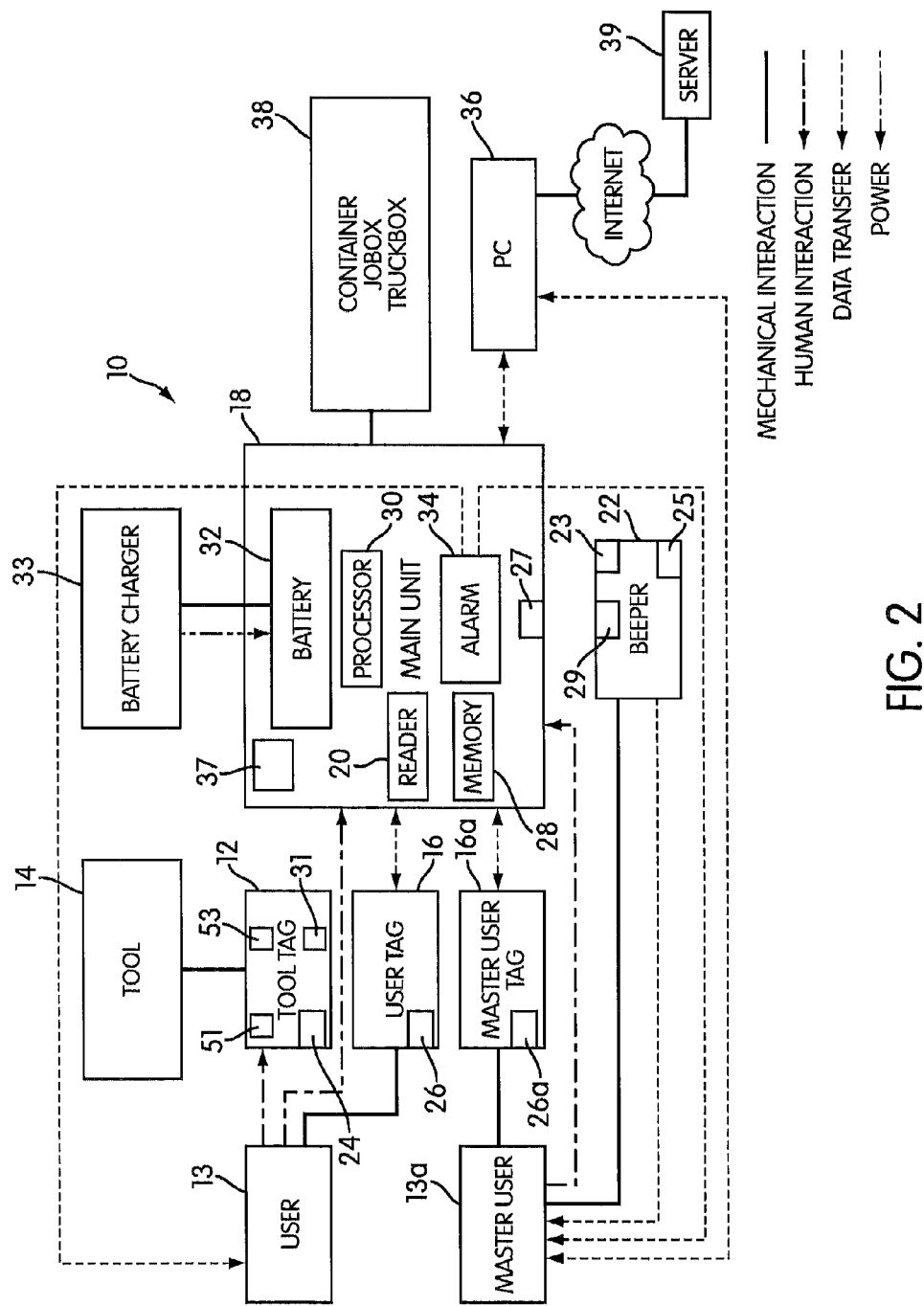
FIG. 2 is a schematic view of the object management system.

FIG. 2 illustrates the system 10 schematically. In the illustrated embodiment, the object identification devices 12 and the user identification devices 16, 16a include RFID tags or transponders that communicate with the control unit 18 via radio frequency signals. The object identification devices 12 and the user identification devices 16, 16a may include transmitters 24, 26, 26a configured to transmit radio frequency signals to the control unit 18. The transmitter 24 may be configured to transmit at, just for example, 2.4 GHz. It is contemplated that other methods of communications may be used, such as satellite signals, personal area networks (IrDA, Bluetooth, UWB, Z-Wave, and ZigBee). In this embodiment, the remote unit 22 is a portable indicator unit. The portable indicator unit 22 may be a beeper. The indicator unit 22 may communicate with the object identification device 12 and the user identification device 16 wirelessly or with a wire. In one embodiment, the indicator unit 22 includes a receiver 29 configured to receive radio frequency signals from the control unit 22 which includes a transmitter 27 configured to transmit radio frequency signals to the indicator unit 22. An antenna may also be provided with the transmitter 27. Alternatively, the transmitter 27 may be separate from the control unit 18. That is, the transmitter 27 may be external to the control unit 18 and may be operatively connected to the control unit 18 via a cable (e.g., USB) or wire such that the control unit 18 may use the transmitter 27 to transmit signals to the indicator unit 22. With wireless transmissions, the signals may be transmitted at different frequencies to decrease the likelihood of interference. It is contemplated that the time intervals between transmission may be random and may be different for each user identification device 16 and/or object identification device 12. Thus, the control unit 18 may include a timer (not shown) and may be configured to constantly or periodically determine the period of time that has passed since the last signal transmission that the control unit 18 has received from the object identification devices 12. As described below, if the determined period of time is greater than a predetermined or threshold period of time, then a hostile event may be determined to be present and an alarm indication would be generated as a result.

The object identification devices 12 and user identification devices 16 may include an antenna (not shown), circuitry for processing radio frequency signals (not shown), and a digital memory (not shown). The object identification device 12 may also optionally have a receiver for receiving signals from the control unit 18. In one embodiment, the object identification device 12 is an active device that includes a microprocessor 51 and a battery 53 as a power source. The battery 53 may be an Energizer CR2450, just for example. In one embodiment, the battery 53 is not replaceable/rechargeable. Alternatively, the battery 53 may be replaceable/rechargeable in some embodiments. The object identification devices 12 and user identification devices 16 may optionally have built-in sensor capabilities that sense temperature, humidity, movement, and/or shock. In one embodiment, the object identification device 12 includes a movement/acceleration sensor 31 configured to sense movement of the object identification devices 12 and the associated objects 14. The object identification devices 12 may be configured to transmit signals containing both object identification codes and information associated with whether the object identification device 12 is moving or stationary. In one embodiment, the object identification devices 12 are long range active devices capable of transmitting at, just for example, 2.4 GHz. In one embodiment, the user identification devices 16 are short range passive RFID devices capable of transmitting at, just for example, 125 kHZ. For passive RFID devices, the RFID reader 20 may emit a low-power radio wave field which is used to power the passive device so that the passive device can transmit radio frequency signals upon receiving interrogation signals from the RFID reader 20. Active RFID devices include their own power source and are capable of receiving and transmitting radio frequency signals over a much longer range than passive devices. Active RFID devices can also power an internal clock and transmit time and date stamp to a recorded event. It is contemplated that in some embodiments, a combination of active and passive object identification devices 12 and active and passive user identification devices 16 may be used.

In one embodiment, the reader 20 may be capable of managing a certain number of transmissions (e.g., 15) in a certain period of time (e.g., 2 seconds). The reader 20 may detect object identification devices 12 at least a certain range (e.g., 8 ft.) of the reader 20 when the object identification devices 12 are carried in container 38 (see FIG. 11a). The reader 20 may detect the object identification device 12 at least a certain range (e.g., 3 m, 6 m) when the object identification device 12 is outside of the container 38.

In the embodiment shown in FIG. 2, the control unit 18 includes a memory 28 (such as storage chips or a small hard drive), and a programmable processor 30 for processing information and controlling the functions of the control unit 18. In one embodiment, the memory 28 may include databases to store information. The readers 20, 21 may be radio frequency identification (RFID) readers. The RFID reader 20, or may be of any type suitable for receiving signals from the user identification devices 16. In one embodiment, the RFID reader 20 may include a microprocessor, a transmitter for transmitting radio frequency signals, and a receiver for receiving radio frequency signals. In one embodiment, the RFID reader 20 transmits and receives signals at 125 kHz. In one embodiment, the RFID reader 21 includes a microprocessor and a receiver for receiving radio frequency signals. The RFID reader 21 may optionally include a transmitter for receiving radio frequency signals in some embodiments. In one embodiment, the RFID reader 21 receives signals at 2.4 GHz. The control unit 18 may include an active reader configured to read radio frequency signals from active devices, such as the object identification devices 12, and a passive RFID reader configured to read radio frequency signals from passive RFID devices, such as the user identification devices 16*a*, 16. Therefore, the readers 20, 21 as described herein may represent multiple readers, such as any number or combination of passive or active readers. Just for example, the control unit 18 may include a Motorola RD5000 Mobile RFID Reader. The RFID reader 20 may include a radio frequency receiver and a transmitter for providing interrogation signals to passive identification devices. The RFID readers 20, 21 may also optionally transmit information to the user identification devices 16, 16*a* and/or the object identification devices 12. The RFID readers 20, 21 may further include antennas (not shown) to transmit and receive signals to and from the object identification devices 12 and user identification devices 16. The control unit 18 may also include sensors 37 that may be used to sense damage to the control unit 18, tampering of the control unit 18, and/or detachment of the control units 18 from their associated containers 38. The control unit 18 may also optionally be provided with sensors that senses temperature, movement, and/or humidity.

The control unit 18 also includes a battery 32 as a power source for powering the control unit 18. Alternatively or additionally, other power sources may be used, such as solar panels, and/or A/C mains provided by a utility provider or a generator. The battery 32 may be operatively connected to a battery charger 33 for re-charging the battery 32. In one embodiment, the control unit 18 generates low battery indications to notify the users 13*a*, 13 of the low battery status. The battery charger 33 may be separate from the control unit 18. In one embodiment, charging may only occur when the control unit 18 is turned off or shut-down. Alternatively, charging may occur when the control unit 18 is on and operating.

As shown in FIG. 2, an alarm 34 is also provided in the control unit 18. The alarm 34 is configured to provide alerts associated with the condition of the object management system 10, which may be, for example, a predetermined event, including a hostile event (such as theft of objects 14, unauthorized use of objects 14, or tampering events), or a low battery condition. The alarm 34 may be configured to provide alerts based on the actions of the users 13 and/or master users 13*a*. The alarm 34 may include an audio alarm having a volume that may vary and may be selected by the master user 13*a*. Furthermore, the audio alarm may be a siren with five volts buzzer. The audio alarm may include, but not limited, to a tone, a buzz, a beep, a sound (e.g., a horn or a chime), and/or a prerecorded voice message. In one embodiment, the audio alarm may include tones with changing frequency or volume. In another embodiment, the audio alarm may include user configurable tones and alarms. The alarm 34 may also be capable of generating visual alarms. In one embodiment, the alarm 34 may be configured to indicate the alert via a user interface or the visual display 44 (see FIG. 4). The alarm 34 may also be capable of generating visual alarms via the light 43 (see FIG. 4) provided on the control unit 18. In one embodiment, the light 43 may include lamps, light emitting diodes and/or liquid crystal displays. The light 43 may optionally have a flashing or stroke effect. It is contemplated that any, one, or all of these alarm indications may be used. It is also contemplated that the user may also select the type of alarm indications that is generated and where the alarm indications is generated, such as in the control units 18 and/or in the indicator units 22.

The control unit 18 may also provide information to/receive information from a remote computing device 36, which may be, just for example, a personal computer, laptop computer, personal digital assistant (PDA), or smartphone. The control unit 18 may transmit/receive information from the remote computing device 36 via wire or wireless communication protocols. For example, the control unit 18 may communicate with the remote computing device 36 via a USB wire or wirelessly through the Internet. In one embodiment, the remote computing device 36 may be used to open an account/register the system 10 with a server 39 via the Internet. The server 39 may include a database configured to store information associated with each system 10, such as each of the control units 10 and master user identification devices 16*a*. The server may also store information associated with each user identification device 16 (e.g., serial numbers and registration codes). The server 39 may include associations between each master user identification device 16*a* and control units 18. The server may also provide information via the Internet (e.g., product information, support/maintenance, references, answers, tutorials, etc.). It is contemplated that any computing device may be used to interact with the server 39. In some embodiments, the control unit 18 may directly send information to/receive information from the server 39 via the Internet.

Figure 11A:
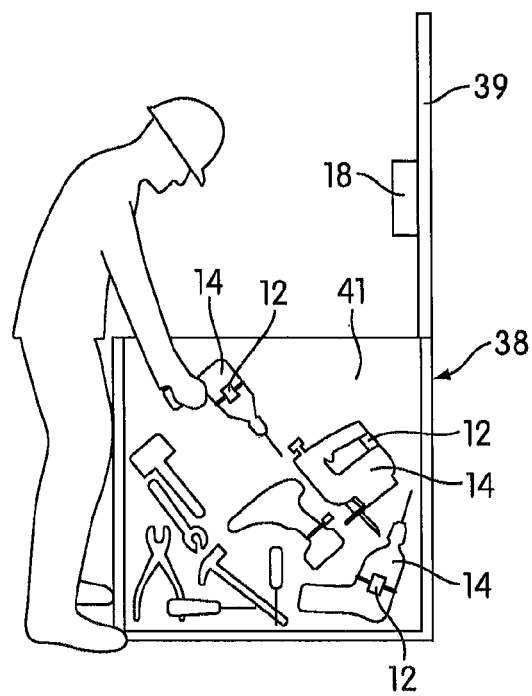
FIGS. 11a-11b illustrate checking out or returning objects associated with the object identification devices of the object management system.

The system 10 may be used at a worksite and the control unit 18 may be associated with a container 38 (see FIG. 11*a*). The container 38 may be constructed and arranged to transport and store tools or other objects. The container 38 may be a job box, a truck box, or other boxes or containers, such as the portable truck box described in U.S. patent application Ser. No. 12/683,166, which is incorporated herein by reference in its entirety. The containers 38 may also be shipping containers, freight containers, and storage facilities. It is also contemplated that in some embodiments, the object management system 10 may manage objects 14 within a perimeter or area. For example, the object management system 10 may be associated with a defined area at a worksite, a truck bed, or an area within a predetermined radius of the object management system 10. These examples of the areas that may be associated with the object management system 10 are not intended to be limiting.

In one embodiment, the control unit 18 is constructed and arranged to be removably attached to the container 38. The control unit 18 may be optionally attached to the container 38 using screws, snap fit connections, fasteners, pins, or other attachment mechanisms known in the art. In one embodiment, a mounting bracket (not shown) may be attached to the container 38, and the control unit 18 may then be attached to the mounting bracket. The control unit 18 may be attached to the container 38 on a side wall of the container 38 or on a door or cover 39 (see FIG. 11*a*) of the container 38. The container 38 may include an interior space 41 that may be used to hold objects 14. In one embodiment, the cover 39 can be moved between a closed position preventing access to the interior space 41 and an open position permitting access to the interior space 41.

In one embodiment, the control unit 18 may include several modes. The control unit 18 may be in an armed or active mode when attached to the container 38 and may be in a maintenance or deactivated mode when the control unit 18 is detached from the container 38. In the maintenance mode, the control unit 18 may be in a power saving mode and the alarm 34 may be inoperative. In one embodiment, the master user 13*a*, 13 may select the option of operating the control unit 18 in the maintenance mode or armed mode. In the maintenance mode, the master user 13*a* may enter/edit information associated with the system 10, including the user identification devices 16*a*, 16, the object identification devices 12, and the system settings. For example, the master user 13*a* may add/edit/remove user identification devices 16*a*, 16 or add/edit/remove/freeze object identification devices 12. In one embodiment, the master user 13*a* may also set the statuses of the objects 14, which will be described later.

The control unit 18 may also be in communication with the indicator unit or beeper 22. The control unit 18 may include the transmitter 27 and antenna for transmitting information from the control unit 18 to the indicator unit 22. In one embodiment, the indicator unit 22 has a reception range of at least 300 meters and may receive signals having a frequency of 430 MHz. In one embodiment, the indicator unit 22 can only receive information from the control unit 18 and cannot transmit information to the control unit 18. Alternatively, in one embodiment, the indicator unit 22 can transmit and receive information to and from the control unit 18. In one embodiment, the control unit 18 sends a signal to the indicator unit 22 at a predetermined interval (e.g., every 10 seconds), the signal containing information associated with the indicator unit 22 (e.g., the serial number) and the control unit 18 (e.g., serial number). The indicator unit 22 is considered to be in the detection range if the signals have been received from the control unit 18 within a period of time (e.g., every 10 seconds). Otherwise, the indicator unit 22 may be considered to be out of the detection range, in which case the indicator unit 22 may alert the user 13*a* via visual alarm, audio alarm, or vibrating alarm. However, the control unit 18 may send a signal alerting the indicator unit 22 to the occurrence of a predetermined event at any time. The indicator unit 22 communicates directly with the control unit 18 and is configured to receive information associated with the condition of the system 10 from the control unit 18 at a location remote from the control unit 18. For the control unit 22 to be able to transmit signals to the indicator unit 22, the indicator unit 22 may be paired to the control unit 18 during system 10 set up or system edit, which will be described in detail later.

As shown in FIG. 2, the indicator unit 22 may include an audible alarm module 23 configured to communicate an alert to the master user 13*a*. It is contemplated that the volume of an audio alarm generated by the alarm module 23 may vary and may be selected by the master user 13*a*. Furthermore, the audio alarm may be a siren with five volts buzzer. The audio alarm may include, but not limited to, a tone, a buzz, a beep, a sound (e.g., a horn or a chime), and/or a prerecorded voice message. In one embodiment, the audio alarm may include tones with changing frequency or volume. In another embodiment, the audio alarm may include user configurable tones and alarms. The indicator unit 22 may also include a visual indication module 25 configured to communicate an alert to the master user 13*a*. The indicator 22 unit may be configured to provide information and/or alerts to the master user based on the condition of the system 10, such as the presence of predetermined events, including hostile events, and low battery condition. In one embodiment, the visual indication module 25 may be configured to indicate the alert via a plurality of lights 42 (see FIGS. 1 and 7*b*). It is contemplated that some embodiments may have a user interface or visual display, such as a liquid crystal display (LCD) screen, that displays an alert. The indicator unit 22 may optionally also have a vibrating alarm indication. The alarms may be terminated automatically after a period of time. In one embodiment, the audio alarm may terminate after 1 second, the vibrating alarm may terminate after 3 seconds, and the visual alarm (e.g., lights) may terminate after 10 seconds. The alarms may also terminate after the master user 13*a* has actuated an actuator (not shown) on the indicator unit 22 or after the master user 13*a* inserts the associated master user identification device 16*a* into the control unit 18, which will be described later. The indicator unit 22 may also include an attachment mechanism, such as a buckle, clip, or other attachment mechanisms to attach the indicator unit 22 to the master user 13*a*.

Figure 3:
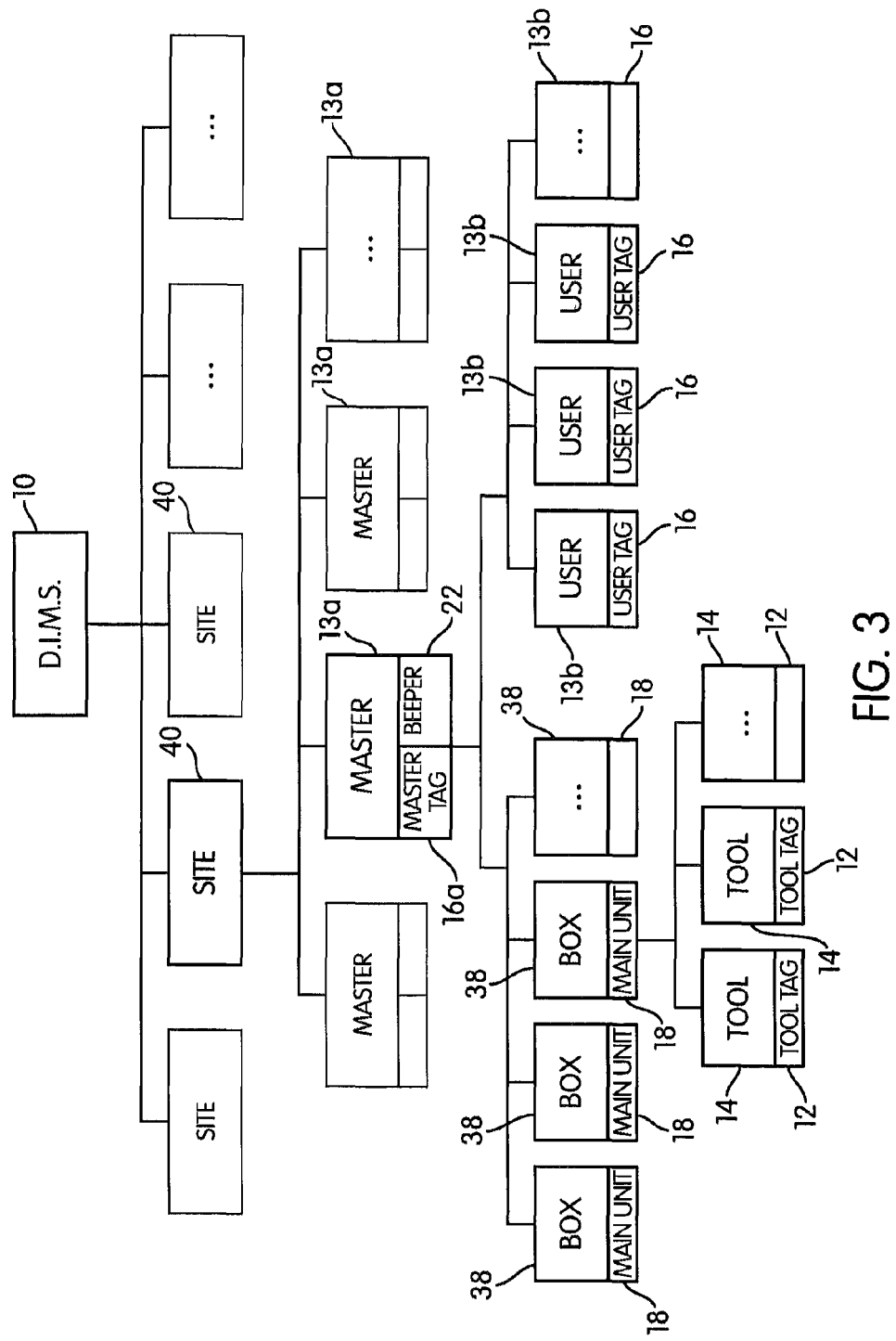
FIG. 3 is a schematic view of the relationship among components of the object management system.

Referring now to FIG. 3, the system 10 may be used in several worksites 40. Each worksite 40 may have at least one master user 13*a*. Each master user 13*a* may have an associated master user identification device 16*a* and an indicator unit or beeper 22. The master user 13*a* may be someone who supervises the operations at the worksite 40. For example, the master user 13*a* may be in charge of supervising a plurality of non-master users 13, who may be other workers at the worksite 40. Some of the non-master users 13 may be trusted users. The master user 13*a* and the non-master users 13 (including the trusted users) may each have various privileges and levels of interactions that they may perform with respect to the system 10. For example, the master user 13*a* may be authorized to assign objects 14 to users 13, 13*a* by associating object identifications corresponding to the objects 14 with the user identification devices 16, 16*a* corresponding to the users 13*a*, 13. The master user 16*a* may also interact with the indicator unit 22 and the control unit 18 to cease alarm indications from both units, initialize or activate the system 10 for operation at the beginning of the day, deactivate the system 10 at the end of the day, and enter information into the control unit 18 for setup or maintenance purposes (e.g., entering information for user identification devices 16, 16*a*, object identification devices 12, generating status logs, displaying status, etc.). The trusted user of the non-master users 13 may also be given authority to do all of the above except for the ability to enter information into the control unit 18 for set up or maintenance purposes. In some embodiments, the non-master users 13 who are not trusted users may only check out and return objects 14 from the containers 38.

Referring back to FIG. 3, each of the non-master users 13 may be associated with a user identification device 16. The master user 13*a* may also be responsible for supervising the use of the objects or tools 14 that are transported in a plurality of the containers 38 at the worksite 40. Each of the containers 38 may include a control unit 18 associated therewith. Each of the objects 14 transported in the containers 38 may have an object identification device 12 associated therewith. Each of the control units 18 may be able to identify and manage a plurality of user identification devices 16 (e.g., 30) and object identification devices 12 (e.g., 50). It is contemplated that the number and combination of control units 18, indicator units 22, object identification devices 12, and user identification devices 16 may vary.

Figure 4:
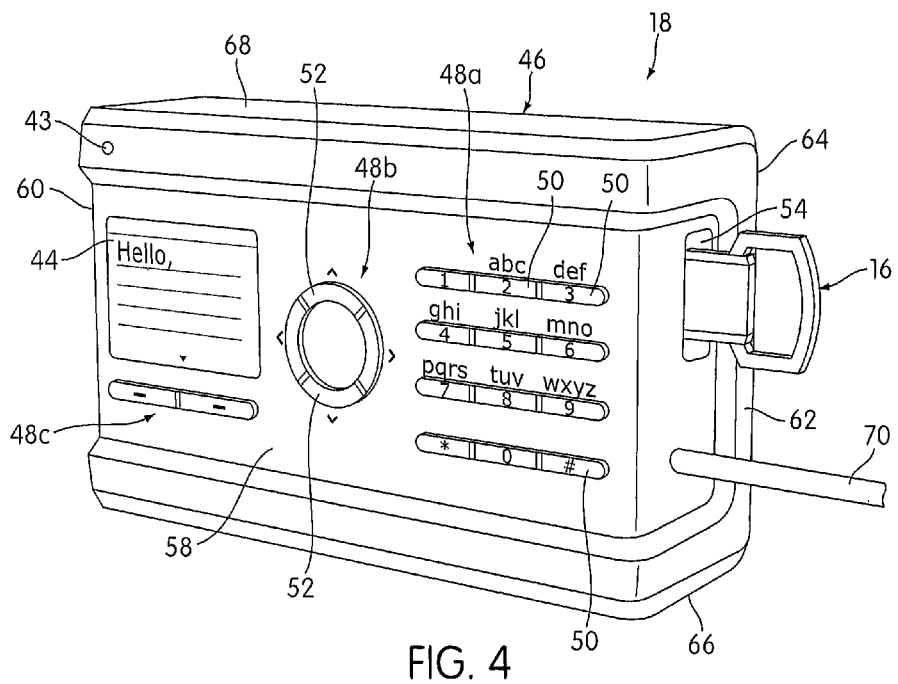
FIG. 4 is a perspective view of a control unit of the object management system.

FIG. 4 illustrates the control unit 18 in accordance with an embodiment. In the embodiment shown in FIG. 4, the control unit 18 includes a housing 46 constructed and arranged to enclose the components of the control unit 18. The housing 46 includes a front side or wall 58, a left side or wall 60, a right side or wall 62, a back side or wall 64, a bottom side or wall 66, and a top side or wall 68. The housing 46 may be constructed of plastic, metal, wood, other materials, or a combination thereof. A visual display 44, taking the form of a screen, is provided on the front side 58 of the control unit 18. The user interface 48a, 48b, 48c may also be provided on the control unit 18. The user interface 48a may be a numeric keypad having a plurality of buttons 50. The user interface 48a may enable the master user 13a to submit the master user's identification information to the control unit 18 by entering in a user code as an alternative to transmitting the master user 13a's user identification code via the master user identification device 16a. The user interface 48b may comprise buttons 52 corresponding to arrows to enable navigation through the visual display 44. User interface 48c may also be used to navigate or select information on the visual display 44. A connector 70, which may be a cable, is configured to transmit information and/or power to the control unit 18 and may be connected to the control unit 18, such as on the right side 62 of the control unit 18. The control unit 18 may also optionally have a USB (universal serial bus) port (not shown) provided thereon. The USB port may be provided on the bottom side 66 and may be used to connect the control unit 18 to the remote computing device 36. It is contemplated that the USB port may be provided at other locations on the control unit 18.

In one embodiment, the control unit 18 may also include an on/off button (not shown). The on/off switch may be actuated to switch the control unit 18 between the activated state and the deactivated state, or to turn the control unit 18 on or off. The on/off button may be part of the user interface 48a, 48b, 48c or may be a separate button different from the user interface 48a, 48b, 48c. In this embodiment, when the control unit 18 is turned off, the supply of energy from the battery 32 to the other components of the control unit 18 is prevented, thus conserving energy in the control unit 18 when the control unit 18 is not in use.

In the illustrated embodiment, the receiving portion 54 is provided in the housing 46, the receiving portion 54 being constructed and arranged to receive a user identification device 16, 16a such that the control unit 18 can "cradle" the user identification devices 16, 16a. In the illustrated embodiment, the receiving portion 54 is provided on the right side 62 of the housing, although it is contemplated that the receiving portion 54 may be provided on other locations of the housing 46. The receiving portion 54 may be provided with a pivotable cover (not shown) that may cover the receiving portion 54 and which may be pivoted inwards into the receiving portion 54 when the user identification device 16a, 16 is inserted into the receiving portion 54 and which may pivot outwards (by a bias of a spring) when the user identification device 16, 16a is removed from the receiving portion 54. In the illustrated embodiment, the control unit 18 cradles the user identification device 16a, 16 for the reader 20 to interrogate and obtain the user identification code from the user identification devices 16. The control unit 18 may include a microswitch (not shown) in or near the receiving portion 54 such that the user identification device 16a, 16 inserted into the receiving portion 54 may activate the microswitch to signal to the control unit 18 to interrogate the user identification device 16, 16a. Alternatively or additionally, a magnetic switch (not shown) may be used. For example, a magnetic contact member may be located on the user identification device 16, 16a and a corresponding contact member may be located on the control unit 18. When the user identification device 16, 16a is inserted into the control unit 18, the control unit 18 may sense the presence of the user identification device 16, 16a via the magnetic contact member. If the control unit 18 does not recognize the user identification device 16a, 16, an error signal may be displayed on the visual display 44 or a buzz may be generated. If the user identification device 16 is recognized and is cradled for at least a certain period of time (e.g., 1 min) without any interaction (e.g., selecting tool, pressing any keypad) or an action being performed by the user 13, the user identification device 16 may become temporarily locked. That is, the user identification code may be removed from the control unit 18's memory or from the control unit 18's list of active user identification devices 16 such that the user 13 associated with the user identification device 16 becomes an unauthorized user. The control unit 18 may provide a warning signal (e.g, in the form of a buzzer) to the user 13 after a certain period of time (e.g., 15 seconds) has passed since the last interaction with the control unit 18. In one embodiment, only user identification devices 16 associated with non-master users 13 may become locked.

The master user 13a associated with the master user identification device 16a may unlock the non-master user 13's user identification device 16 (e.g, by entering the user identification code into the control unit 18). As mentioned above, the master user 13a is associated with the master user identification device 16a that is configured to interact with the control unit 18 such that information relating to the user identification devices 16 and the object identification devices 12 can be entered into the control unit 18. Accordingly, the master user identification device 16a enables the master user 13a to interact with the control unit 18 to activate or pair the user identification devices 16 of the non-master users 13 with the control unit 18 so that the control unit 18 can recognize the non-master users 13. The master user 13a may enter information during system setup or when the control unit 18 is in the maintenance mode. These procedures will be described later.

Referring back to FIG. 4, the control unit 18 displays its status using the screen 44. The status of the control unit 18 may also be displayed by one or more lights 43 provided on the control unit 18. The status of the control unit 18 may include the control unit 18 having low power. The status of the control unit 18 may also include the control unit 18 being armed, where alarm indications are generated in response to the occurrence of predetermined or specified events, or disarmed (i.e., in the maintenance mode), where alarm indications are not generated in response to the occurrence of predetermined events. The predetermined events that are recognized may be removal of an object 14 by an unauthorized user, movement of the container 38 by an unauthorized user, tampering of the container 38, loss of communication between the indicator unit 22 and the control units 18, and low power in any of the indicator units 22 and the control unit 18. It is contemplated that the object management system 10 may recognize other statuses and other particular events. It is also contemplated that other events may also trigger the alarm indication.

In one embodiment, when the control unit 18 is in normal operation, the light 43 is solid or softly blinking and the audio alarm 34 is off. When an object 14 is being selected to be checked out of the container 38, the light 43 may blink once and the control unit 18 may emit a single buzz. The control unit 18 may be in a "check out" mode when objects 14 are to be checked out or assigned to a user 13a, 13. When an object 14 and its associated object identification device 12 has been assigned to a user 13, 13a and is determined to be moving, the light 43 may blink at least once and the control unit 18 may generate at least one buzz. When a procedure, such as checking out objects 14 by an authorized user 13a, 13 has not been completed and a certain period of time has passed, the light 43 may blink frequently and the control unit 18 may generate frequent buzzes to remind the user 13a, 13 to complete the checking out process. In addition, when any of the objects 14 and associated object identification devices 12 that have not been assigned to a user 13a, 13 are moved, the light 43 may blink frequently or the control unit 18 may generate frequent buzzes to remind the user who moved the objects 14 and associated object identification devices 12 to check out the objects 14 and associated object identification devices 12 via the checking out process. Thus, these indications may serve as a reminder to check out the objects 14 and the object identification devices 12 before a hostile event is generated as a result of unauthorized use.

Figure 5:
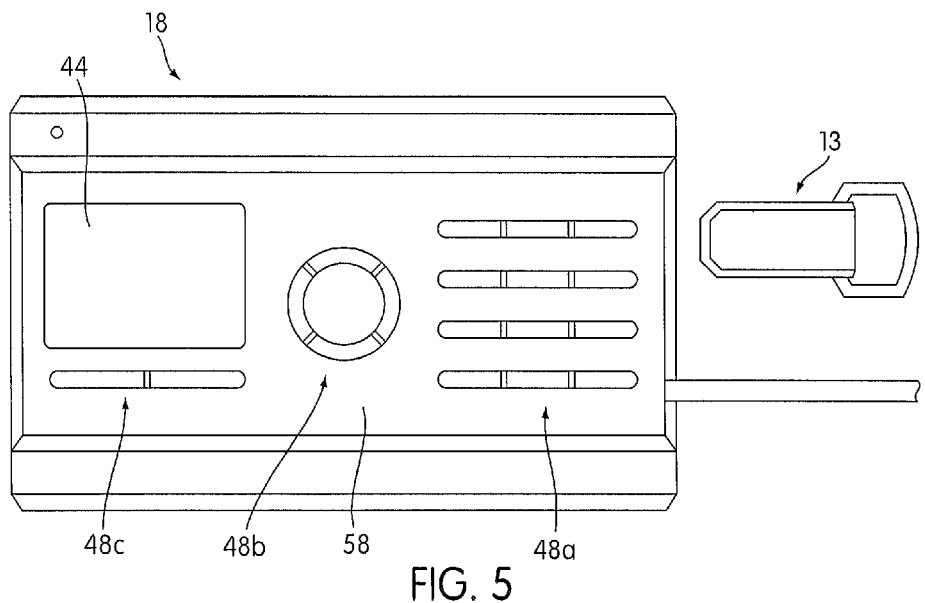
FIG. 5 is a front view of the control unit of the object management system.
Figure 6A:
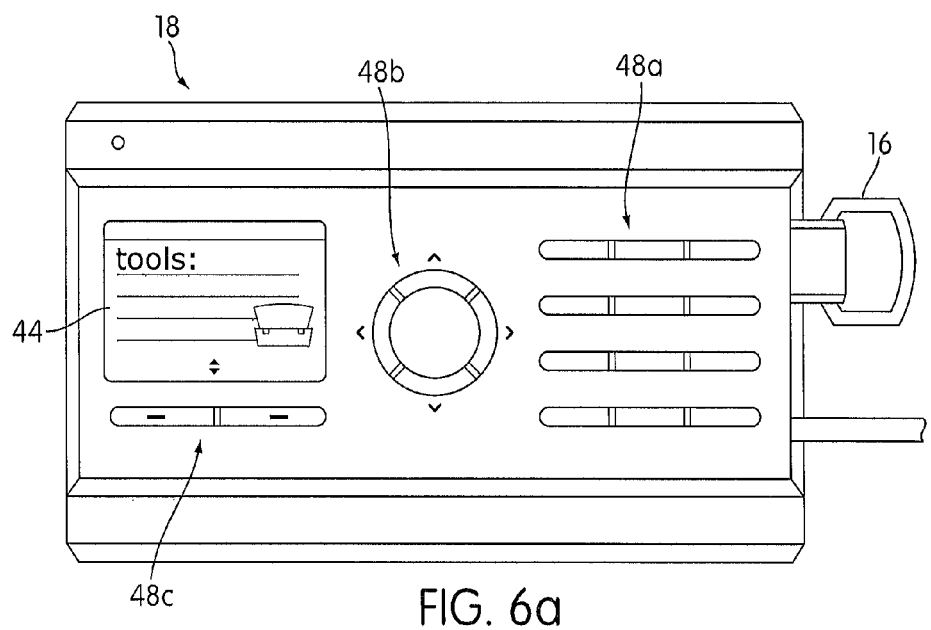
FIG. 6a-6b are front views of the control unit of the object management system.
Figure 6B:
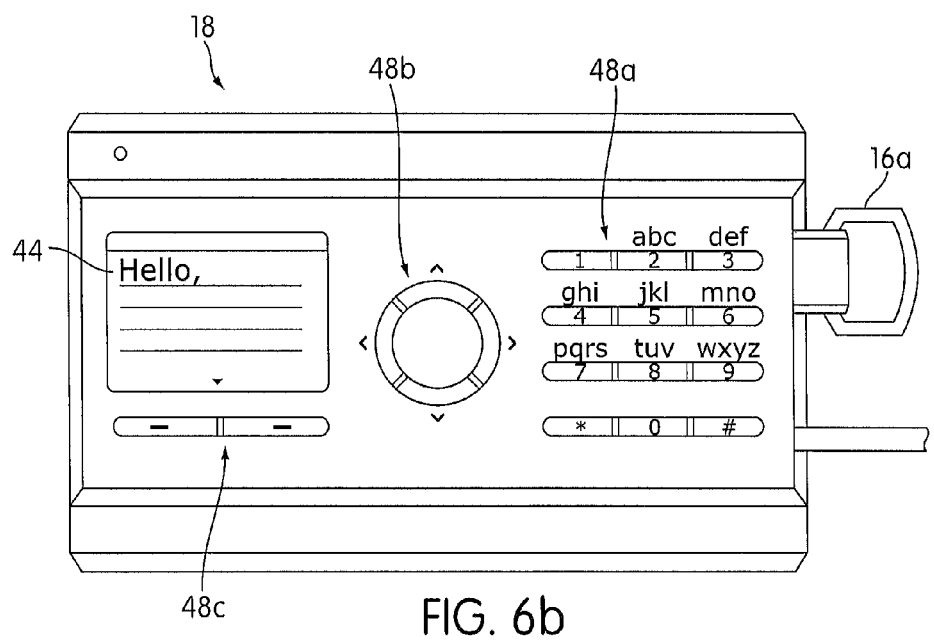

As shown in FIG. 5, the control unit 18 may be in a standby mode wherein the control unit 18 is on and active. In the standby mode, the visual display 44 may be off to save power. When a user identification device 16, 16a is inserted into the control unit 18 to be cradled by the control unit 18 so that the reader 20 can interrogate and read the user identification code from the user identification device 16, 16a, the control unit 18 may change to the operative mode wherein the visual display 44 is on and displaying information to the master or non-master user 13 or 13a, for example, as shown in FIGS. 6a-6b. In some embodiments, the control unit 18 may be in a standby mode after more than a time period (e.g., 10 seconds) has passed since the last user interaction with the control unit 18. The control unit 18 may return from the standby mode and the visual display 44 may be illuminated or turned on again after the user interacts with the control unit 18 via the user interface 48a, 48b, 48c.

Figure 7A:
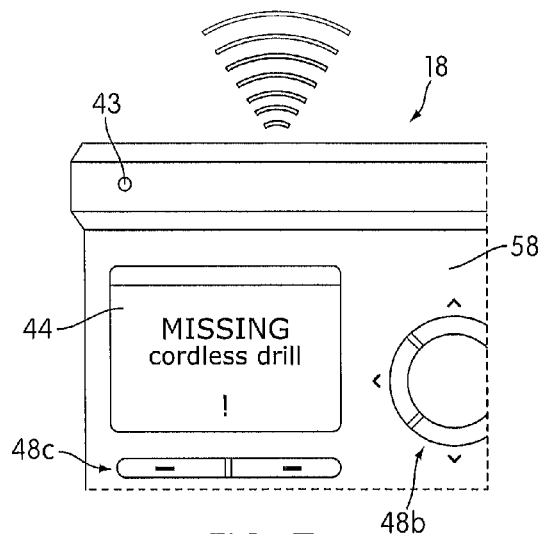
FIG. 7a-7c illustrate alarm indications that are generated by the object management system.

In the embodiment shown in FIG. 7a, when the object management system 10 is in the armed state, the control unit 18 is capable of outputting the alarm indication in response to the occurrence of one or more predetermined (or programmed) events or hostile events associated with a condition of the system 10. The predetermined (preprogrammed) or hostile event may be a missing object (the removal of an object 14 by an unauthorized user), severance or removal of the object identification devices 12 from the objects 14, detachment of the control unit 18 from its associated container 38, the tampering of the control unit 18, and low battery condition in the control unit 18. In the example shown in FIG. 7a, the hostile event is a missing object 14 (or the unauthorized removal of an object 14 by an unauthorized user). Unauthorized use occurs when there is no user identification device 16 that is read or sensed when the object 14 with the object identification device 12 is removed from the container 38 or when the object 14 with the object identification device 12 is removed from the vicinity of the control unit 18 without the object 14 being assigned to a user 13a, 13. The object 14 may be assigned to a user 13a, 13 when the control unit 18 associates an object identification device 12 and the associated object 14 with a user identification device 16 and the associated user 13a, 13. Unauthorized use may also occur when a user identification device 16 is sensed and read by the RFID reader 20, but the user identification code associated with the user identification device 16 is not stored in the control unit 18 and/or not recognized by the control unit 18. In other words, authorized users 13a, 13 are users that are associated with user identification devices 16, 16a having codes recognized by the control unit 18 and/or stored in the memory of the control unit 18. Accordingly, a user who does not have a recognizable user identification device 16 will be considered an unauthorized user.

Figure 7B:
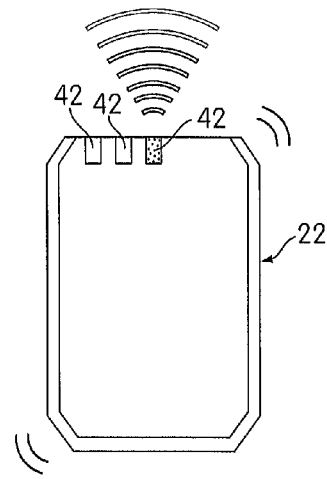
Figure 7C:
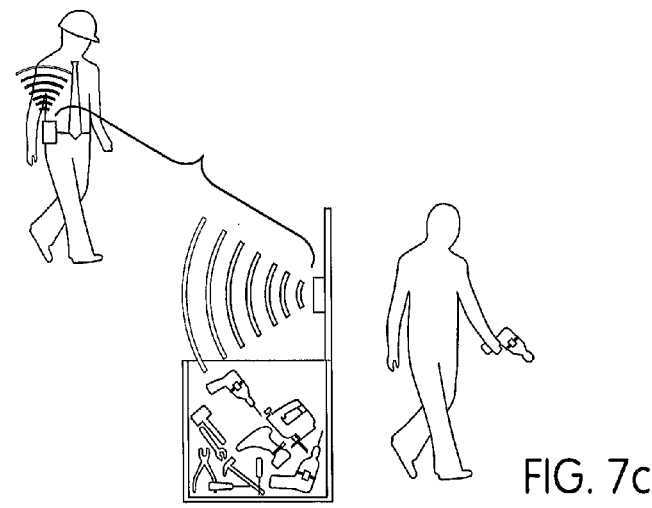
Figure 8A:
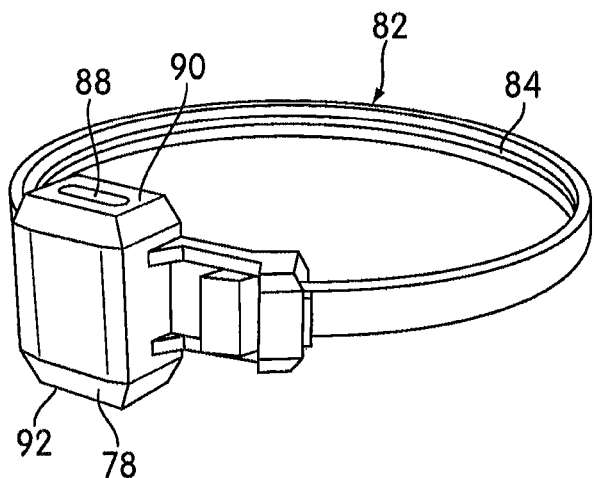
FIG. 8a-8b illustrate an embodiment of an object identification device of the object management system.
Figure 8B:
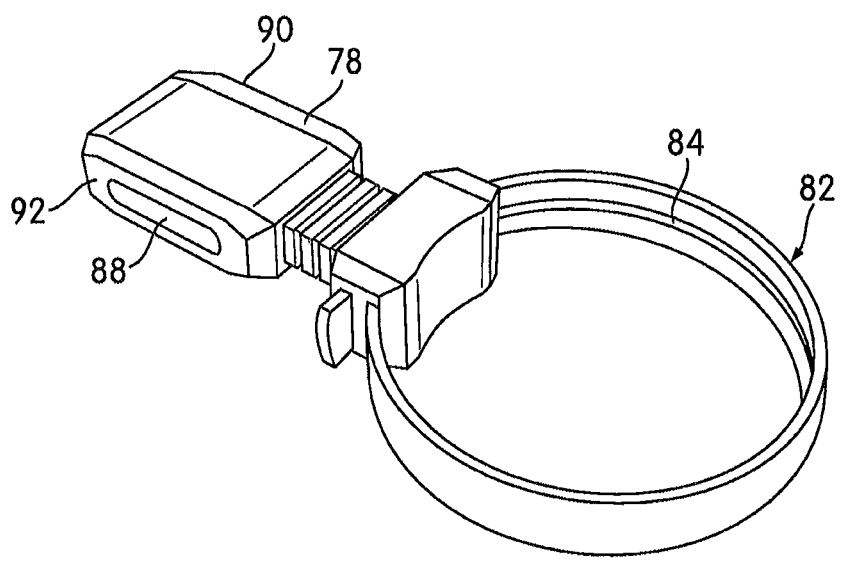

The alarm indication may cease when a predetermined time has passed or after the master user 13a with the master user identification device 16a has interacted with the control unit 18. The master user identification device 16a may be alerted when the control unit 18 transmits a signal to the indicator unit 22 to signal the indicator unit 22 to generate an alarm, alert, or other indication that the hostile event is present, as shown in FIG. 7c. As shown in FIG. 7b, the indicator unit 22 may generate an audio alarm and a visual alarm via the lights 42. It is contemplated that in embodiments wherein the indicator unit 22 can transmit signals to the control unit 18, the indicator unit 22 may transmit a signal to reset the control unit 18, causing the alarm indication to cease. When the alarm indication is generated because of the removal of an object 14 by an unauthorized user, the alarm indication may cease when the object 14 has been returned or a user identification device 16 is read by the RFID reader 20, and the user identification code of the user identification device 16 is recognized by the control unit 18 as corresponding to an authorized user 13a, 13.

As mentioned above, the control unit 18 has the memory 28 to store information and records of events or activities. The number of records and the information stored may vary and may be customized. For example, each record may include the time, date, and identity of the user obtained from the user identification code that is transmitted from the user identification device 16. The control unit 18 may transmit the information and records to the remote computing device 36 in accordance with a request from the master user 13a or another authorized user or may transmit the information and records periodically. Time periods between transmission may vary and may be customized. The object management system 10 may also allow the selection of records or information to be transmitted and the selection of time periods between transmissions. For example, predetermined events may be transmitted as soon as the predetermined events are determined by the control unit 18.

As mentioned above, the memory 28 of the control unit 18 may contain databases. At least one database may include information associated with users 13a, 13. The database may include information such as the user identification codes associated with the user identification devices 16a, 16, names of the users, status of the users (e.g, non-master user, trusted user, locked user), and preferred language of the user. It is contemplated that for the preferred language, the control unit 18 is configured to display information in the preferred language associated with the user identification device 16 that is cradled in the control unit 18. At least one database may include information associated with the objects or tools 14. The information may include the object identification codes associated with the object identification devices 12 and the names of the objects or tools 14. In one embodiment, the object identification code may be at least 5 characters. At least one database may include information associated with the inventory or status of the objects 14 within the containers 38. The information may include times, the object identification codes associated with the object identification devices 12, and statuses of the objects 14 at the recorded times. The statuses may be, just for example, "in rest," "in movement,", "frozen" (wherein the object 14 is temporarily taken out of the active list of objects 14 and which will be described in more detail later), "hostile event" (wherein the object 14 was taken by an unauthorized user), and low battery (wherein the battery in the object identification device is low). If the object 14 is assigned to a user 13, 13a, the object 14 may change status from "in rest" to "in movement," and the user identification code of the user identification device 16, 16a associated with the user 13, 13a may be stored in the same database. The "in rest" status refers to objects 14 that are recognized and stationary and the "in movement" status refers to objects 14 that are recognized and moving. If the objects 14 have the statuses of being "in rest" or "in movement", the objects 14 are considered "in." If, however, the objects 14 are not associated with a user 13, 13a and do not have the status of being either "in rest", "in movement", or "frozen", the objects 14 are considered to be "out" and a hostile event is determined to be present. The control unit 18 may generate an alarm as soon as the object 14 is determined to be "out." In one embodiment, when the object identification device 12 of the associated object 14 has the status of being "in rest" (as determined by the motion sensor 31), the control unit 18 is configured to expect to receive signals from the object identification device 12 at a first predetermined interval (e.g., every 20 seconds), otherwise a hostile event is determined to be present. Similarly, when the object identification device 12 of the associated object 14 has the status of being "in movement" (as determined by the motion sensor 31), the control unit 18 is configured to expect signals from the object identification device 12 at a second predetermined interval (e.g., every 2 seconds), otherwise a hostile event is determined to be present. That is, the control unit 18 is configured to determine whether a period of time that has passed since the last transmission of signals received from the object identification device 12 is greater than the first predetermined interval (e.g., more than 20 seconds) when the object identification device 12 is "in rest" and/or greater than the second predetermined interval (e.g., more than 2 seconds) when the object identification device 12 is "in movement." These different intervals associated with different statuses may be used to preserve power and thus extend the life of the battery in the object identification devices 12.

The control unit 18 may retrieve information from the databases in the memory 28 and may display the information on the visual display 44 on demand (by selection of the master user 13a), at a predetermined time, or at the end of the day when the system 10 is being turned off. For example, as shown in FIG. 6a, the visual display 44 may display the objects 14 that have been assigned to the non-master user 13 whose user identification device 16 is cradled in the control unit 18. The non-master user 13 may be able to view this menu when the user identification device 16 associated with the non-master user 13 is cradled in the control unit 18. In one embodiment, the non-master user 13 may only view the objects 14 that have been assigned to the non-master user 13, and not to other users 13a, 13. In contrast, when the master user identification device 16a is cradled in the control unit 18, the master user 13a may be able to input information corresponding to the user identification devices 16a, 16, object identification devices 12, and view/edit the status reports of all of the active object identification devices 12 and user identification devices 16, 16. As shown in FIG. 6b, the master user 13a may have access to a menu customized for the master user 13a.

An events log may also be generated, stored in memory 28, and displayed on the visual display 44. In one embodiment, the events log may include 1000 events and the events may be stored via the FIFO (first in first out) method. The events log may contain information such as date and time of event, event (e.g., "take tool", "return tool", "hostile event", "beginning of day", "end of day"). The "beginning of the day" may be the time at which the control unit 18 was first activated or turned on at the worksite 40. The "end of the day" event may be associated with the time at which the control 18 was deactivated or turned off at the worksite 40. The user identification code of the master user 13a who activated/deactivated the control unit 18 may also be displayed on the visual display 44. The control unit 18 may display the events log on the visual display 44 on demand (by selection of the master user 13a), at a predetermined time, or at the end of the day.

FIGS. 8a-8b, 32, and 35 illustrate various embodiments of the object identification device 12. The object identification device 12 includes a housing 78 having an attachment portion 94 having components to engage with the connector 84 and a containing portion 91 constructed and arranged to store components of the object identification device 12, such as, for example, the microprocessor 51, the RFID transmitter 24, the battery 53, and the sensor 31. The containing portion 91 of the housing 78 includes two opposing sides 90, 92 and an interior space 81 (see FIGS. 33a-33b, 36a-36b). The object identification device 12 may be configured to transmit signals only, and may not receive signals. Alternatively, the object identification device 12 may transmit and receive signals. A closed loop connector 84, taking the form of a strap in these two embodiments, includes an electrically conductive material 86 (see FIGS. 34b, 37b, 9c, 10c) and is operatively connected to the housing 78. The connector 84 is moveable between an unsecured position wherein the object identification devices 12 can be released from the associated objects 14 and a secured position wherein the housing 78 and the connector 84 form a closed loop 82 (see FIGS. 8a, 8b) to be attached to the associated object 14. As described in more detail below, the connector 84 may be retained in the secured position and connected to the housing 78 via a tightening mechanism. The connector 84 is constructed and arranged to be adjustable to adjust a size of the closed loop 82 formed by at least a portion of the connector 84. The electrically conductive material 86 of the connector 84 is configured such that severing the connector 84 or disconnecting the connector 84 from the housing 78 causes the RFID transmitter 24 to send a signal to the control unit 18 indicating the severance or disconnection and to cease transmission of radio frequency signals from the object identification device 12.

The connector 84 may be adjusted to attach the object identification device 12 to its associated object 14. In one embodiment, the connector 84 may be constructed and arranged to be detachable. After the connector 84 has been attached to associated object 14 such that the connector 84 and the housing 78 forms the closed loop 82, the object identification device 12 determines whether it has been attached properly. If the object identification device 12 has been improperly attached for a predetermined time (e.g., more than 100 milliseconds), no signals will be transmitted by the object identification device 12. If the object identification device 12 determines that it has been properly attached, the object identification device 12 may transmit signals after a predetermined period of time (e.g., 1 minute). The proper or improper attachment of the object identification device 12 may be determined using the electrically conductive material 86 of the connector 84, which will be described in more detail below. As mentioned above, the signals may include information associated with the object identification device 12 and its status, such as the object identification code and/or the movement or acceleration detected by the sensor 31. As mentioned above, the status of the object identification device 12 can be "in rest" or "in movement". If the object identification device 12 is initially "in rest," the status will change to "in movement" upon movement of the object 14 associated with the object identification device 12. If the object identification device 12 is in movement, the status will change to "in rest" if there is no movement detected a period of time (e.g., 2 seconds) after the last signal transmission. After the status has initially changed from "in rest" to "in movement", the first transmission of signals may occur a period of time (e.g., 2 seconds) from the last transmission. After the status has initially changed from "in movement" to "in rest", the first transmission of signals may occur either a period of time (e.g., 2 seconds) from the last transmission or upon movement of the object identification device 12. The object identification devices 12 may transmit signals at a first interval (e.g., every 20 seconds) when the object identification devices 12 are "in rest" and the object identification devices 12 may transmit signals at a second interval (e.g., every 2 seconds) when the object identification devices are "in movement." It is contemplated that the intervals may vary and may be randomly distributed around a certain mean interval to avoid collision of the radio frequency signals.

Referring to the embodiments shown in FIGS. 8a, 8b, 32, and 35, an actuator 88 is provided on the object identification device 12. In one embodiment, there may be at least two actuators 88 provided on each object identification device 12. In the illustrated embodiments, an actuator 88 is provided on both sides 90, 92 of the housing 78. In these embodiments, both actuators 88 must be actuated for the object identification device 12 to recognize the selection. The actuator 88 is configured to be actuated to signal the transmitter 24 to transmit the radio frequency signal. The actuator 88 may also be used during selection and check out of the object 14 from the container 38 by a user 13, 13a or when the object identification device 12 is to be "frozen" or deactivated so that the object identification device 12 can be removed from its associated object 14.

As mentioned above, the object identification device 12 is constructed and arranged to be able to transmit radio frequency signals to the control unit 18 to notify the control unit 18 of its presence. As also mentioned above, the signals may be transmitted at predetermined intervals. However, in one embodiment, the signals may also be transmitted at the time the actuator 88 is actuated. The object identification device 12 may also send signals to the control unit 18 to notify the control unit 18 of the low battery condition of the object identification device 12. The object identification device 12 may also send signals to the control unit 18 to notify the control unit 18 of the severance or disconnection of the connector 84.

Figure 32:
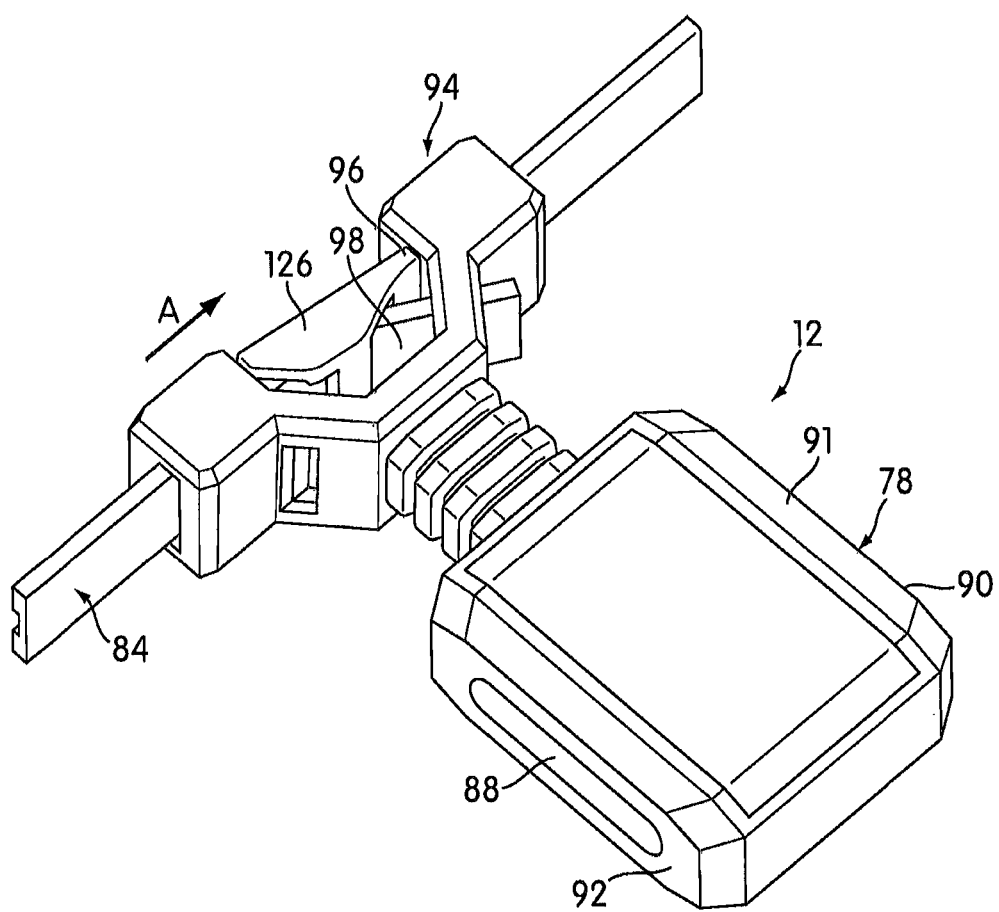
FIG. 32 is a perspective view of another embodiment of the object identification device.
Figure 33A:
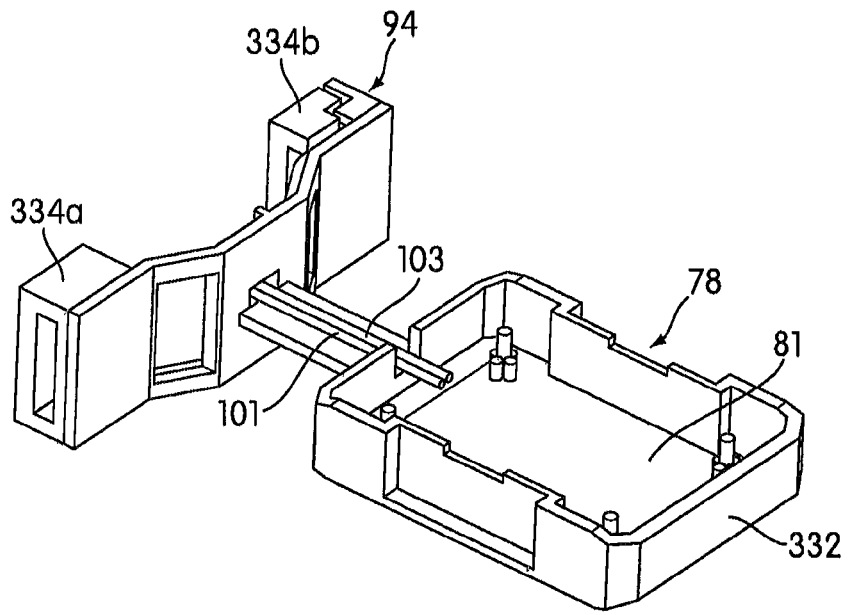
FIGS. 33a-33b illustrate a housing of the object identification device shown in FIG. 32.
Figure 33B:
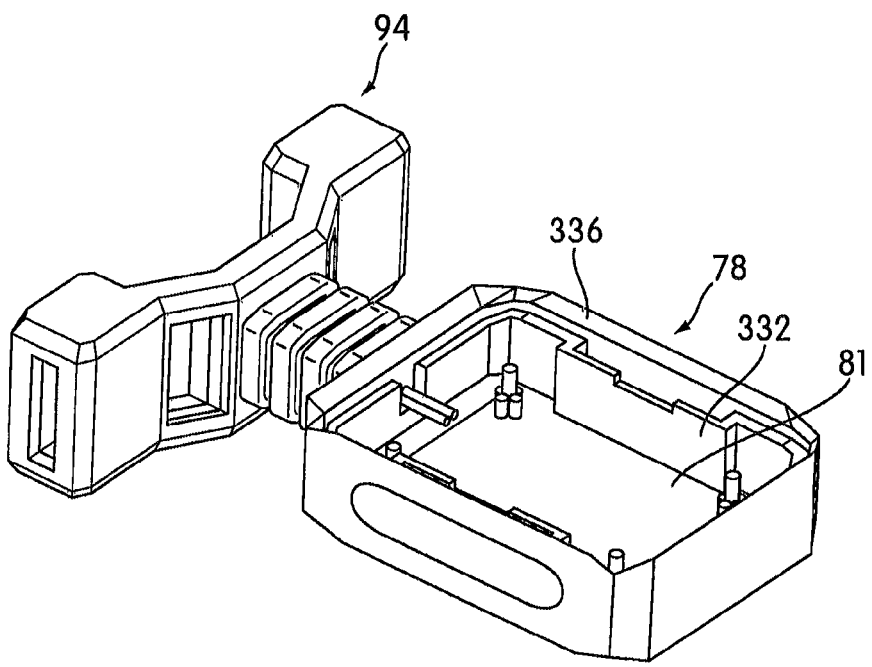
Figure 34A:
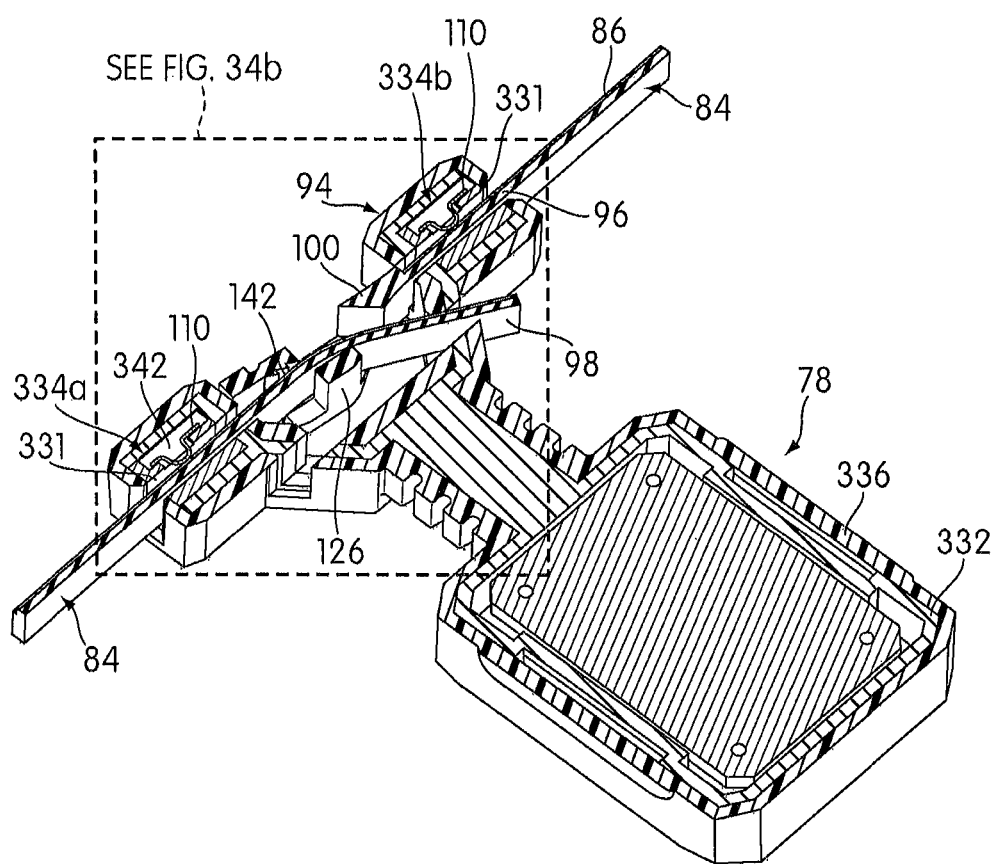
FIG. 34a is a cross sectional view of the object identification device and FIGS. 34b-34c are detailed views of the object identification device.
Figure 34B:
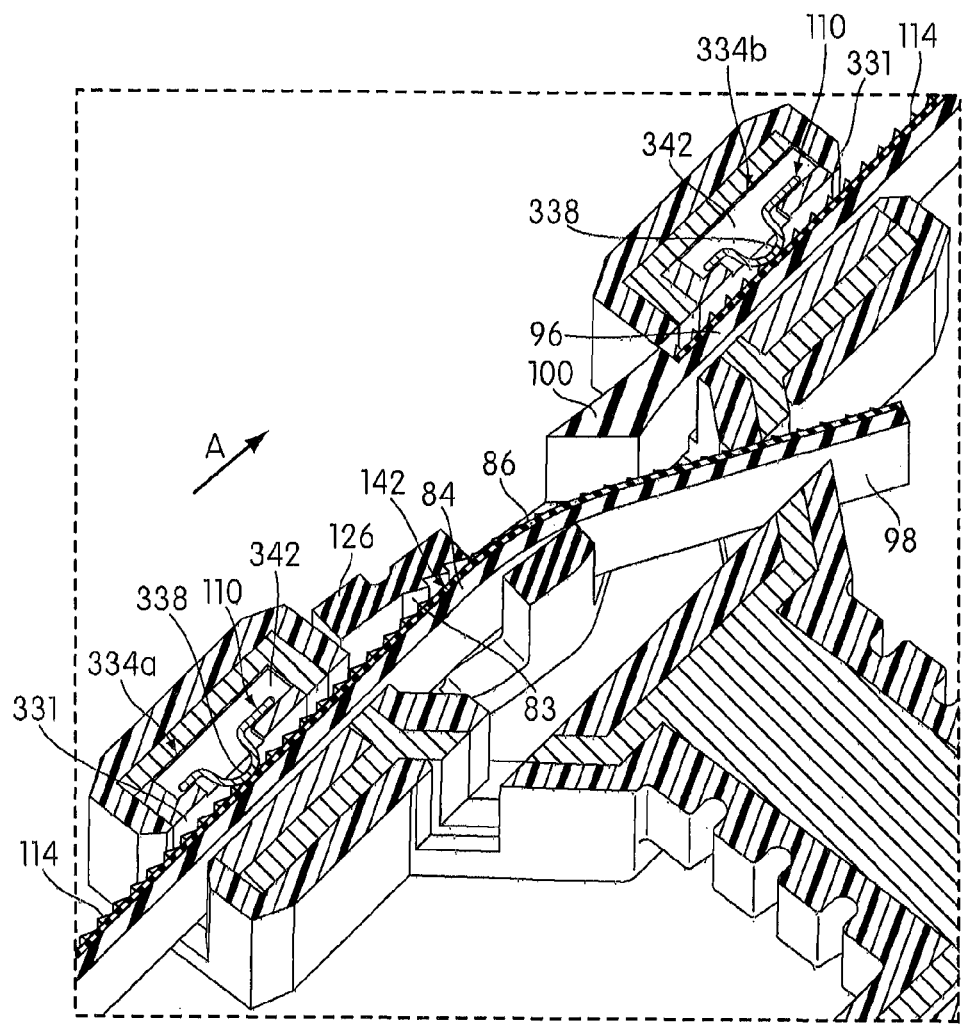

FIGS. 33a-33b illustrate components of the embodiment of the object identification device 12 shown in FIG. 32. As shown in FIG. 33a, the housing 78 may be made of an inner rigid body 332. The inner rigid body 332 may be provided with a flexible material 336 (e.g., rubber, foam) thereon (see FIG. 33b). The inner rigid body 332 may be made of plastic or any other materials. Terminals 334a, 334b (two are shown in FIG. 33a) may be provided as part of the attachment portion 94 of the housing 78. The terminals 334a, 334b may be constructed and arranged to receive the connector 84, as shown in FIGS. 34a-34b. In one embodiment, the terminals 334a, 334b may be made of the same material as the rigid inner body 332. The terminals 334a, 344b may be attached to the rigid inner body 332 via welding, adhesive, screws, or other attachment mechanisms. Wires 101, 103 (see FIG. 33a) may extend from the terminals 334a, 334b to the containing portion 91 so that a closed circuit can be created between the connector 84 and the electronic components in the containing portion 91 when the connector 84 is properly attached to the terminals 334a, 334b of the housing 78. In this embodiment, wire 101 is operatively connected to terminal 334a, and wire 103 is operatively connected to terminal 334b.

FIGS. 34a-34b illustrate a cross sectional view of the object identification device 12 with the connector 84 attached to the housing 78. In the embodiment shown in FIG. 34a, the connector 84 is inserted through the terminals 334a, 334b to create a closed circuit with the electronic components disposed in the containing portion 91 of the housing 78. A space 331 is defined in the terminals 334a, 334b to receive the connector 84. In this embodiment, the connector 84 includes a first portion 96 and a second portion 98. The first portion 96 and the second portion 98 may be considered ends of the connector 84 or near the ends of the connector 84. That is, the first portion 96 and the second portion 98 may be portions of the connector 84 that are not directly connected to one another. The first portion 96 is attached to a retaining member 100 constructed and arranged to prevent the first portion 96 from being removed from the terminal 334b. The second portion 98 includes the portion of the connector 84 that is received in a recess 83 of a receiving structure 126, as shown in FIG. 34b. The receiving structure 126 may be situated between the two terminals 334a, 334b and may be constructed and arranged to removably receive the second portion 98 of the connector 84 to form the closed loop 82. In one embodiment, the retaining member 100 may be part of the receiving structure 126 or may be attached to the receiving structure 126. The configuration of the receiving structure 126 and the second portion 98 enables the second portion 98 to be further inserted into the receiving structure 126 so as to decrease the size of the closed loop 82, thus enabling the connector 84 to be tightened around the associated object 14. Alternatively, in one embodiment, it is contemplated that the first portion 96 may also be removably received in the receiving structure 126 such that the first portion 96 can also be further inserted to decrease the size of the closed loop 82. In another alternative embodiment, one or both of the first portions 96 and the second portions 98 may be removed from the terminals 334a, 334b and/or the receiving structure 126 to detach the object identification device 12 from the associated object 14.

As shown in FIG. 34b, the connector 84 may include engaging structures, taking the form of a plurality of teeth 114 in this embodiment. The teeth 114 may be constructed and arranged to engage with engaging structure 142 provided on the receiving structure 126 to retain the size of the closed loop 82. The engaging structure 142 may take the form of a protrusion or any shape that may fit within the recess 83 of the receiving structure 126. In the embodiment of FIG. 34b, the engaging structure 142 takes the form of teeth that engages with the teeth 114 of the connector 84. The engaging structure 142 and the teeth 114 of the connector 84 are constructed and arranged to interact together such that the connector 84 is allowed to move further into the receiving structure 126 (thus tightening the connector 84 around the object 14 and decreasing the size of the closed loop 82) and is prevented from being pulled out of the receiving structure 126 to increase the size of the closed loop 82 or to completely detach the connector 84 from the object 14. As such, in one embodiment, after the connector 84 has been secured to the associated object 14, the connector 84 must be severed or disconnected from the housing 78 to remove the object identification device 12 from the associated object 14. In such an embodiment, the object identification device 12 must be in the "frozen" mode when severing or disconnecting the connector 84 so as to prevent an alarm indication from being generated to indicate the presence of a hostile event.

Figure 34C:
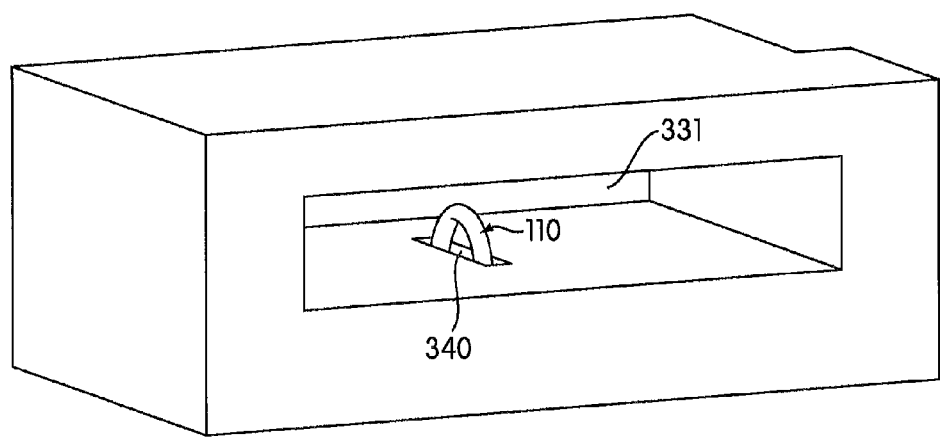

As shown in FIG. 34b, a contact member 110 is provided on the terminals 334a, 334b, the contact members 110 being constructed and arranged to contact the electrically conductive materials 86 provided on the connector 84. In one embodiment, the electrically conductive material 86 is provided near the teeth 114 of the connector 84. The contact members 110 may be made of a material that conducts electricity, such as copper or other materials. A raised portion 338 (see FIG. 34b) of the contact member 110 may be constructed and arranged to extend from a retaining portion 342 through a recess 340 (see FIG. 34c) provided in the terminals 334a, 344b and into the receiving space 331. The contact member 110 may be connected to the wires 101, 103 such that the connection between the contact members 110 and the electrically conductive material 86 of the connector 84 closes a circuit (i.e., causes electricity to flow) through the connector 84, the wires 101, 103, and the electronic components disposed in the containing portion 91.

To attach the object identification device 12 to the associated object 14, the first portion 96 may be inserted through the terminal 334b and the connector 84 may be pulled through terminal 334b until the first portion 96 is received in the terminal 334b and the retaining member 100 prevents further movement of the connector 84 along terminal 334b. To form the closed loop 82 around the associated object 14, the connector 84 may be wrapped around at least a portion of the associated object 14, and the second portion 98 may be inserted through the terminal 334a and into the receiving structure 126. The second portion 98 may be pulled through the receiving structure 126 to decrease the size of the closed loop 82 and thus tighten the object identification device 12 around the associated object 14. To remove the object identification device 12 from the associated object 14, the object identification device 12 may be set to the "frozen' mode using the control unit 18 and the connector 84 may be subsequently severed.

Figure 35:
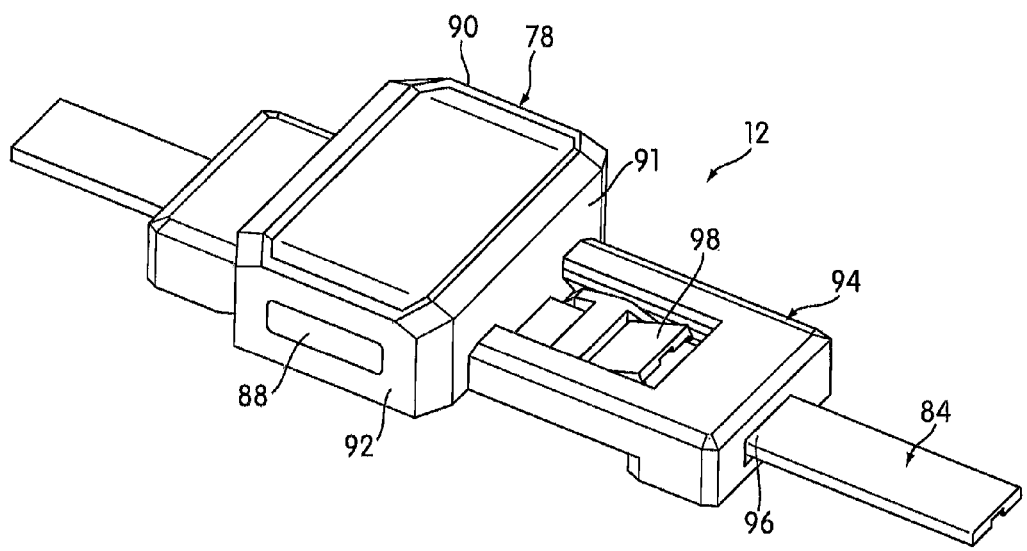
FIG. 35 is a perspective view of another embodiment of the object identification device.
Figure 36A:
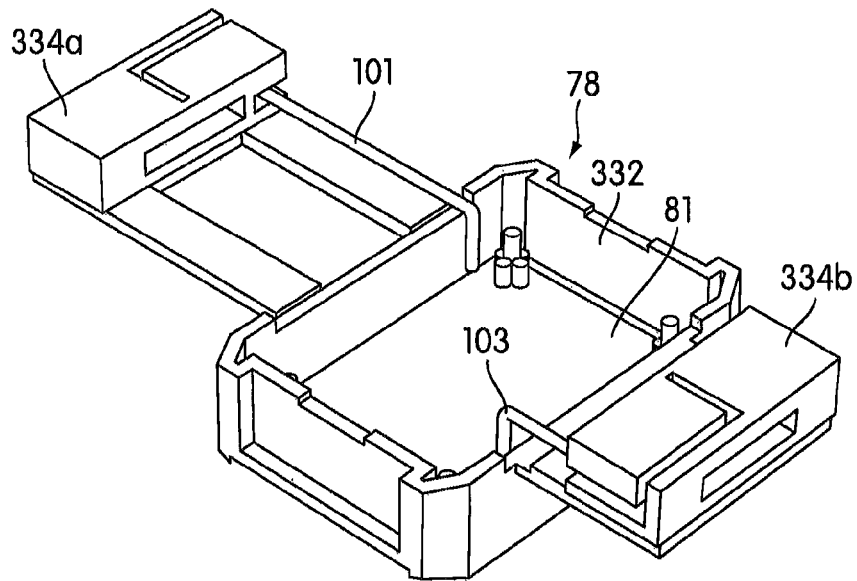
FIGS. 36a-36b illustrate a housing of the object identification device shown in FIG. 35.
Figure 36B:
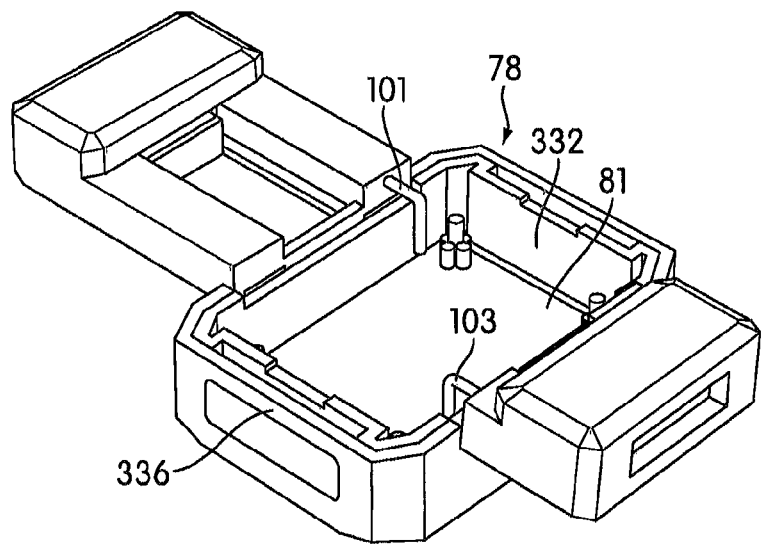

FIGS. 36a-36b illustrate components of the embodiment of the object identification device 12 shown in FIG. 35. Similar to the embodiment shown in FIG. 32, the embodiment in FIG. 36a includes the housing 78 that is made of the inner rigid body 332, the inner rigid body 332 being provided with the flexible material 336 (e.g., rubber, foam) thereon (see FIG. 36b). Terminals 334a, 334b (two are shown in FIG. 36a) are provided as part of the attachment portion 94 of the housing 78 and are constructed and arranged to receive the connector 84, as shown in FIGS. 37a-37b.

Figure 37A:
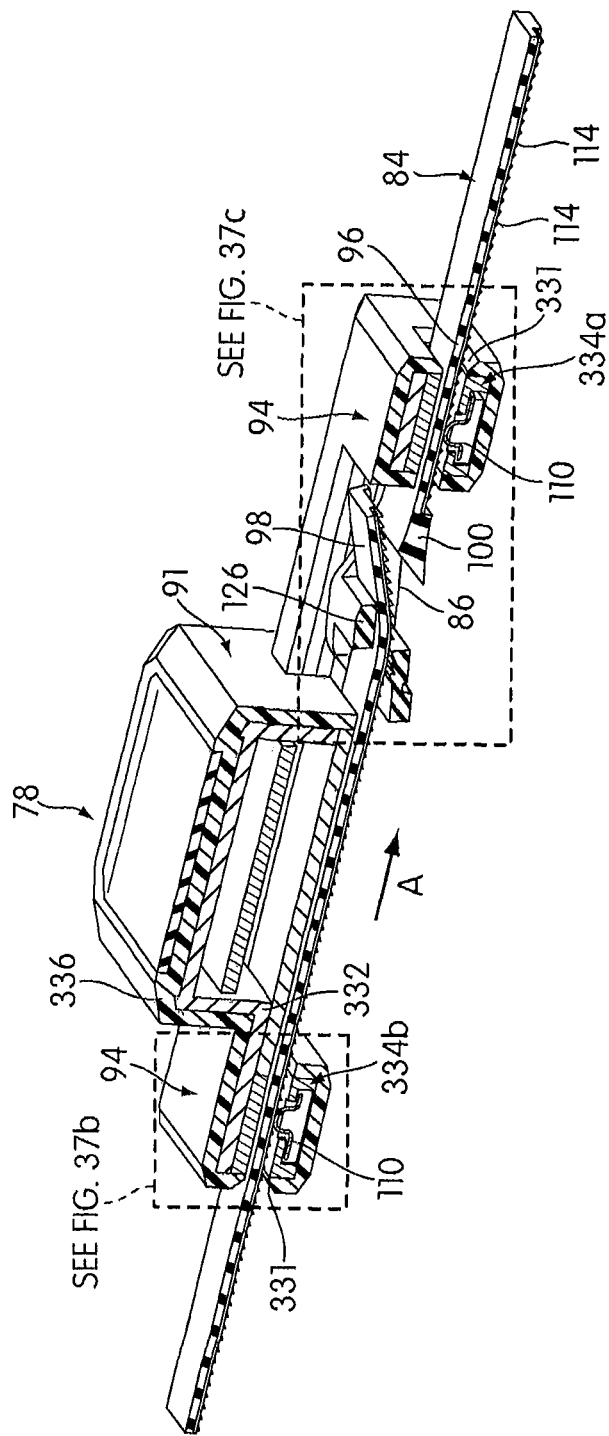
FIG. 37a is a cross sectional view of the object identification device shown in FIG. 35.
Figure 37B:
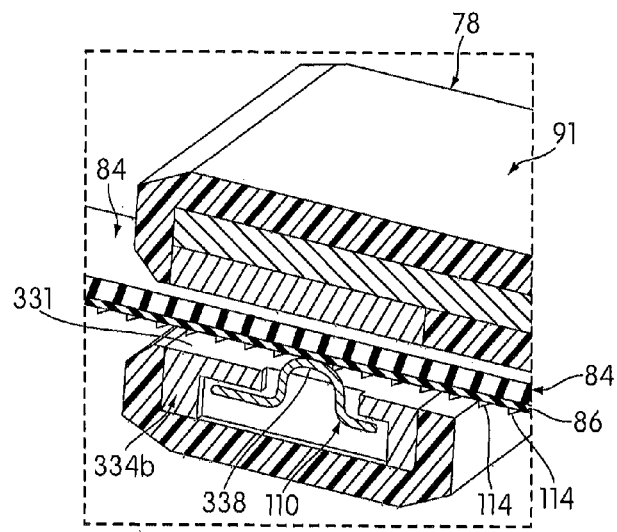

FIGS. 37a-37b illustrate cross sectional views of the object identification device 12 with the connector 84 attached to the housing 78. In the embodiment shown in FIG. 37a, the connector 84 is inserted through the terminals 334a, 334b to create a closed circuit with the electronic components disposed in the containing portion 91 of the housing 78 via the wires 101, 103 (see FIG. 36a). The terminals 334a, 334b are provided with the contact member 110 (see FIG. 37b) constructed and arranged to engage with the electrically conductive material 86 of the connector 84 to form the closed circuit. The object identification device 12 also includes the receiving structure 126 constructed and arranged to receive the second portion 98 of the connector 84. In this embodiment, the first portion 96 of the connector 84 may be attached to the retaining structure 100 to prevent the removal of the first portion 96 from the terminal 334a. Alternatively, in one embodiment, it is contemplated that one or both of the first portions 96 and the second portions 98 may be removed from the terminals 334a, 334b and/or the receiving structure 126 to detach the object identification device 12 from the associated object 14.

Figure 37C:
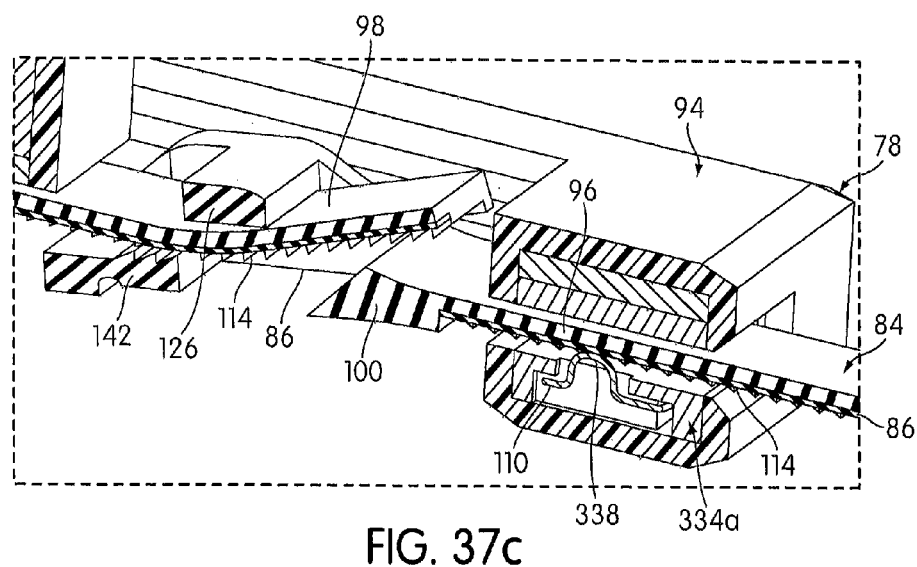

The connector 84 includes the teeth 114 (see FIG. 37a) that are provided on the connector 84 and that are constructed and arranged to engage with the engaging structure 142 (see FIG. 37c) of the receiving structure 126 to enable the connector 84 to be moved in a first direction (e.g., in the direction of A shown in FIG. 37a) to decrease the size of the closed loop 82 and to prevent the connector 84 to be moved in a second direction (e.g., opposite direction A) to increase the size of the closed loop 82 or to detach the connector 84 from the housing 78.

FIGS. 9a-9c show another embodiment of the object identification device 12 including the attachment portion 94 having components used to attach/detach the connector 84 to the housing 78. In this embodiment, the connector 84 includes the electrically conductive material 86 (see FIG. 9c), taking the form of a wire. The electrically conductive material 86 may be any material that conducts electricity, including, for example, copper. The electrically conductive material 86 may be coated with an insulation layer 87 (e.g., rubber, plastic) thereon. In the illustrated embodiment, a first portion 96 of the connector 84 is constructed and arranged to be fixed to the housing 78 at a retaining member 100 of the attachment portion 94. It is contemplated that in other embodiments, the first portion 96 may be removably connected to the housing 78 such that the first portion 96 may be removed from the housing to move the connector 84 to the unsecured position wherein the object identification device 12 can be released from the associated object 14. The first portion 96 may also optionally be removable from the retaining member 100 such that the connector 84 can be replaced. Openings 97, 99 are provided on the housing 78 such that portions of the connector 84 may enter the interior space 80 of the housing 78. An opening 95 (see FIG. 9b) is provided such that a portion of the connector 84 may exit the interior space 80 of the housing 78. In the illustrated embodiment, the first portion 96 of the connector 84 may be connected to the wire 101 via the retaining member 100, the wire 101 being constructed and arranged to carry electricity to or from the other electronic components of the object identification device 12, such as for example, the transmitter 24. A second portion 98 of the connector 84 is constructed and arranged to be movable into and out of the housing 78 such that the size of the closed loop 82 formed by the connector 84 is adjustable. The second portion 98 may be engaged or connected to an engaging member 104 (see FIG. 9b). The engaging member 104 may be disposed in the housing 78 such that the engaging member 104 may be considered to be a part of the housing 78. The engaging member 104 may be connected to a receiving structure 11 that is constructed and arranged to receive a tightening structure 108, taking the form of a screw in this embodiment. In one embodiment, the receiving structure 111 may be cylindrical and may be provided with a threaded internal surface that correspond to threads provided on the tightening structure 108. It is contemplated that other forms of tightening structures 108 may be used, such as excentric structures, snap fit structures, and/or self locking structures. In this embodiment, a plurality of teeth 114 are provided on the engaging member 10, the teeth 114 being constructed and arranged to contact the connector 84.

The second portion 98 of the connector 84 may be constructed and arranged to be inserted between the teeth 114 of the engaging member 104 and the contact member 110. The contact member 110 may be electrically connected to the wire 103 that carries electricity to or from the other electronic components of the object identification device 12. The contact member 110 may be provided with a piercing member 112 (see FIG. 9b) constructed and arranged to pierce the insulation layer 87 to contact the electrically conductive material 86 therein. The piercing member 112 and the contact member 110 may also be made of electrically conductive material. As such, when the piercing member 112 pierces the insulation layer 87 and contacts the electrically conductive material 86 therein, the second wire 103 may be electrically connected to the second portion 98 of the connector 84. Accordingly, the retaining member 100 and the contact member 110 may be considered electrical contacts configured to connect to the electrically conductive material 86.

The object identification device 12 may be attached or detached as follows. To attach the object identification device, the object identification device 12 may be wrapped around at least a portion of the object 14. The connector 84 may then form a closed loop 82 with the housing 78 around the portion of the object 14 by inserting the second portion 98 of the connector 84 into the opening 99 of the housing 78 to be received between the engaging member 104 and the contact member 110 of the housing 78. The size of the closed loop 82 may be adjusted by inserting the second portion 98 of the connector 84 further into the opening 99 of the housing 78. The tightening structure 108 may then be rotated or moved to engage the second portion 98 of the connector 84. As the tightening structure 108 is rotated or moved, the engaging member 104 is lowered until the engaging member 104 pushes the connector 84 against the contact member 110. When the engaging member 104 pushes the connector 84 sufficiently against the contact member 110, the piercing member 112 of the contact member 110 pierces the insulation layer 87 and connects to the electrically conductive material 86 provided therebetween. As such, a closed circuit is formed and electricity is able to flow through the connector 84 to the other electronic components of the object identification device 12. The teeth 114 of the engaging member 104 helps retain the connector 84 and prevents movement thereof. As such, severing the connector 84 or disconnecting the connector 84 from the housing 78 causes the circuit to no longer be closed, thus preventing electricity from flowing. Accordingly, the transmitter 14 may cease transmission of signals to the control unit 22. As mentioned above, if the control unit 22 does not receive signals from the object identification device 12 after a predetermined period of time, the object 14 is determined to be missing and a hostile event is determined to be present.

To detach the object identification device 12, the tightening structure 108 may be loosened by rotating the tightening structure 108 in reverse. Accordingly, the engaging member 104 may be moved upward so that it no longer retains the connector 84 between the engaging member 104 and the contact member 110. When the engaging member 104 has been moved up sufficiently, the electrically conductive material 86 of the connector 84 may be removed from its contact with the piercing member 112 of the contact member 110. As such, the circuit is no longer closed and the transmitter 24 ceases transmission of signals. The second portion 98 of the connector 84 may then be pulled out of the opening 99 in the housing 98 to increase the size of the closed loop 82 or to completely remove the second portion 98 from the housing 78.

Figure 10A:
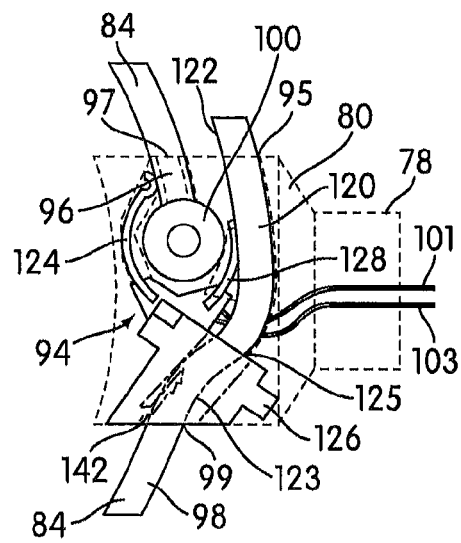
FIGS. 10a-10c illustrate an embodiment of an attachment mechanism of the object identification device of the object identification system.
Figure 10B:
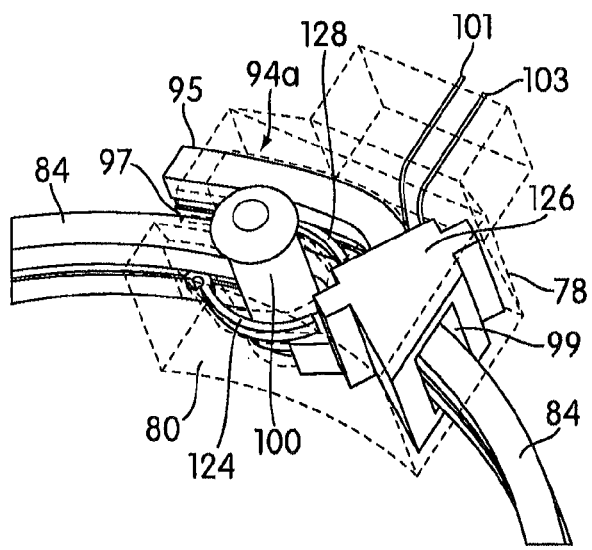
Figure 10C:
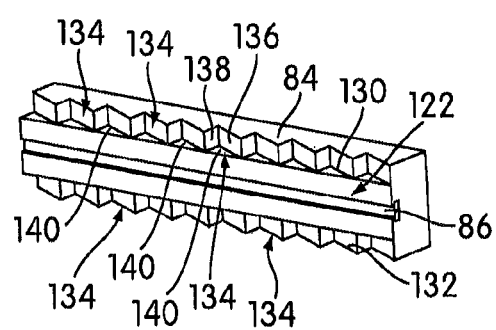

FIGS. 10a-10c show another embodiment of the object identification device 12 including the attachment portion 94 containing the components used to attach/detach the connector 84 to the housing 78. In this embodiment, the connector 84 includes an outer surface 120 and an inner surface 122. In this embodiment, the connector 84 includes a strip of electrically conductive material 86 provided on at least a portion of the inner surface 122 (see FIG. 10c). The electrically conductive material 86 may be any material that conducts electricity, including, for example, copper. The other portions of the connector 84 may be made of an insulation material (e.g., rubber, plastic). In the illustrated embodiment, the first portion 96 of the connector 84 is constructed and arranged to be fixed to the housing 78 at the retaining member 100 provided in the housing 78. The first portion 96 may also optionally be removable from the retaining member 100 such that the connector 84 can be replaced. The first portion 96 and the second portion 98 of the connector 84 may enter the housing 78 through the openings 97, 99, respectively, that are provided on the housing 78. The second portion 98 of the connector 84 may exit the housing 78 through the opening 95 provided on the same side as the opening 97. In this embodiment, the opening 99 provided in the housing 78 may align with an opening in the receiving structure 126 provided in the housing 78, the receiving structure 126 being constructed and arranged to receive at least portions of the connector 84. The opening 99 may enable the second portion 96 of the connector 84 to enter an interior space 123 of the receiving structure 126. An opening 125 in the receiving structure 126 enables the second portion 98 of the connector 84 to exit the interior space 123 of the receiving structure 126.

Similar to the embodiment shown in FIGS. 9a-9c, the wires 101, 103 are used to electrically connect the first portion 96 and second portion 98, respectively, to the other electronic components of the object identification device, such as the transmitter 24. In this embodiment, the retaining member 100 is not used to electrically connect the first portion 96 of the connector 84 to the wire 101. Instead, a first contact member 124 is provided on the receiving structure 126 in the housing 78, the first contact member 124 being constructed and arranged to contact the electrically conductive material 86 on the first portion 96 of the connector 84. The first contact member 124 may be electrically connected to the wire 101 inside the receiving structure 126. The contact member 124 may be made of a material that conducts electricity such that when the contact member 124 contacts the electrically conductive material 86 of the first portion 96, the contact member 124 may be used to electrically connect the connector 84 to the first wire 101. A second contact member 128 may also be provided on the receiving structure 126, the second contact member 128 being constructed and arranged to contact the electrically conductive material 86 on the second portion 98 of the connector 84. Thus, when the first contact member 124 contacts the first portion 96 of the connector 84 and the second contact member 128 contacts the second portion 98 of the connector 84, a closed circuit is formed, and electricity can flow to and from the wires 101 and 103 to and from the other electronic components of the object identification device 12.

In the embodiment shown in FIG. 10c, at least an upper portion 130 and a lower portion 132 of the inner surface 122 of the connector 84 is provided with engaging structures, taking the form of a plurality of teeth 134. The teeth 134 includes a side surface 136 and a contact surface 138. In one embodiment, the side surface 136 and the contact surface 138 are generally perpendicular to one another. A groove 140 is defined by the side surface 136 and the contact surface 138 of each of the teeth 134. The teeth 134 are constructed and arranged to engage with the engaging structure 142 (see FIG. 10a) provided on the receiving structure 126 of the housing 78. The engaging structure 142 may be provided on the receiving structure 126 and may be located in the interior space 80 of the housing. The engaging structure 142 may take the form of a protrusion or any shape that may fit within the groove 140 defined by the side surface 136 and the contact surface 138 of the teeth 134. The engaging structure 142 and the teeth 114 of the connector 84 are constructed and arranged to interact together such that the connector 84 is allowed to move further into the receiving structure 126 and the housing 78 (thus tightening the connector 84 around the object 14 and decreasing the size of the closed loop 82) and is prevented from being pulled out of the receiving structure 126 and the housing 78 to increase the size of the closed loop 82 or to completely detach the connector 84 from the object 14.

Figure 11B:
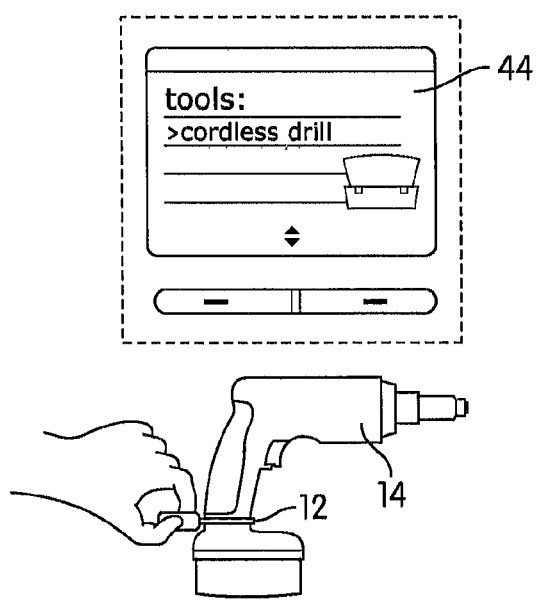

As shown in FIG. 11a, some of the objects 14 transported in the container 38 may have an object identification device 12 attached thereto. The object identification devices 12 may be attached to any portion of the object 14. For example, the object identification device 12 may encircle a portion of the object 14 (see FIG. 11b) or may be hung from the object 14. Thus, an authorized user 13a, 13 may simply insert his/her user identification device 16a, 16 into the control unit 18, set the control unit 18 to "check out" mode, select an object 14 from the container 38. As shown in FIG. 11b, the object identification device 12 can be used to signal the control unit 18 that the selected object 14 is being checked out, the control unit 18 can assign the object 14 to the user 13, 13a associated with the user identification device 16a, 16. As mentioned above, the object identification device 12 can signal the control unit 18 by actuating the actuators 88 on the object identification device 12. The control unit 18 may then display the information for the user 13a, 13 and the objects 14 that are assigned to the user, as shown in the visual display 44 in FIG. 11b.

Figure 12:
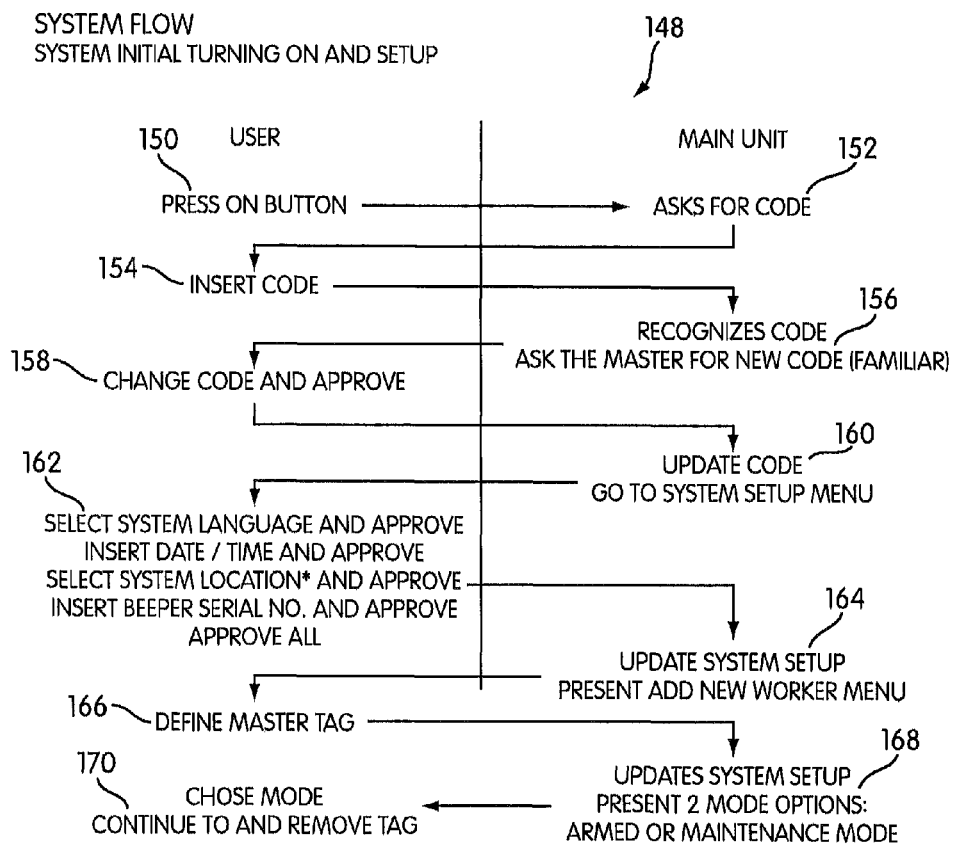
FIG. 12 is a flow diagram illustrating a method of initializing the object management system and turning on the object management system.

The operation of the system 10 will now be described. FIG. 12 illustrates a method 148 for initially turning on the system 10 and operating in the setup mode in accordance with one embodiment. The method 148 starts at procedure 150 where the system may be turned on using an on button (not shown) in the user interface 48a, 48b, or 48c. The method 148 then proceeds to procedure 152 where the control unit 18 prompts for a master user code. The initial digital code may be predetermined. The code may be entered into the control unit 148 via user interface 48a in procedure 154. The method 148 then proceeds to procedure 156 where the control unit 18 determines whether the code is recognized. If the code is not recognized, an audio alarm or visual alarm may be generated to indicate as such. The master user 13a may then be prompted again to enter a valid code. If the code is recognized, the control unit 18 prompts the master user 13a for a new code. The master user 13a may then enter the code into the control unit 18 and the control unit 18 then accepts the code and approves of the code in procedure 158. The method 148 proceeds to procedure 160 where the code is updated in the memory 28 of the control unit 18. A system setup menu may be displayed in the visual display 44. The method 148 proceeds to procedure 162 where the control unit 44 prompts the master user 13a to select a system language, prompts for date/time information, prompts for the location of the system 10 (e.g., what kind of container 38 the control unit 18 attached to), and prompts for the identification information of the indicator unit 22 so that the indicator unit 22 can be paired to the control unit 18. During pairing, the indicator unit 22 may emit a visual indication or alarm indication (e.g., a buzz) to indicate that the pairing is successful. Similarly, an indication may also be generated in the control unit 18 to indicate that the pairing was successful. After the aforementioned information have been entered and approved, the control unit 18 updates the setup information and presents a new menu in the visual display 44 to add information regarding the master user 13a in procedure 164. The method 148 then proceeds to procedure 166 where the master user identification device 16a is inserted into the receiving portion 54 of the control unit 18 so that the reader 20 can read the user identification code of the master user identification device 16a and associate the master user identification device 16a with the master user 13a. The method 148 then proceeds to procedure 168 where the control unit 18 updates the set up information and presents mode options, such as the armed mode or the maintenance mode. In the armed mode, the alarm 34 of the control unit and/or the indicator unit 22 are activated so that alarm indications may be generated in response to predetermined events. In the maintenance mode, the master user 13a may continue to enter information associated with the system 10, the user identification devices 16a, 16, and the object identification devices 12. In the maintenance mode, the alarm 34 of the control unit 18 and the indicator unit 22 may be inoperative. Alternatively, the alarm 34 and the indicator unit 22 may be operative to generate alarm indications when the control unit 18 is in the maintenance mode. In procedure 170, the control unit 18 receives the mode selection input and the master user 13a may continue to enter information or the master user 13a may remove the master identification device 16a from the control unit 18.

Figure 13:
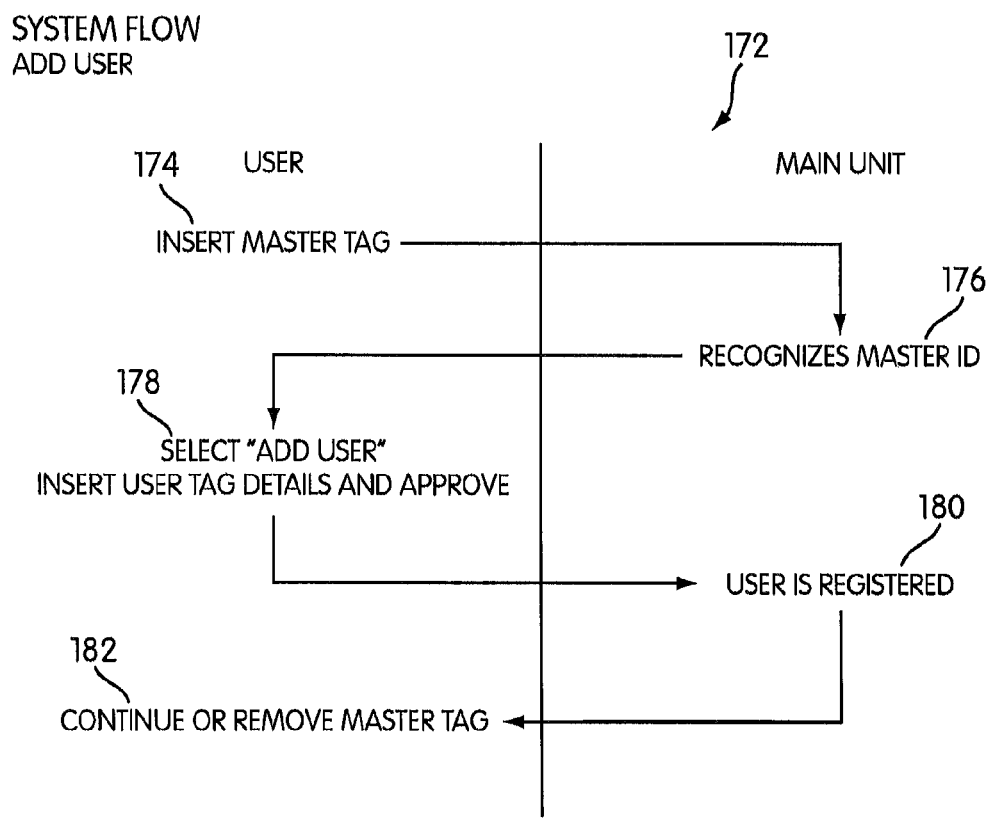
FIG. 13 is a flow diagram illustrating a method of adding a user identification device to the object management system.

FIG. 13 illustrates a method 172 of using the control unit 18 to add activate user identification devices 16 and/or add information associated with the user identification devices 16 to the system 10 in accordance with one embodiment. The method 172 starts at procedure 174 where the master user identification device 16a is inserted into the receiving portion 54 of the control unit 18. The method 172 proceeds to procedure 176 where the control unit 18 determines whether the user identification device 16a is a master user identification device 16a recognized by the control unit 18. If not, the control unit 18 may visually or audibly indicate that the user identification device 16a was not accepted. If the master user identification device 16a is recognized and accepted, the method 172 proceeds to procedure 178 where an option for adding a user 13 is displayed in the visual display 44 and selected by the master user 13a. Information about a user identification device 16 may be entered, such as the user identification code associated with the user identification device 13 and the name of the user 13 associated with the user identification code and the user identification device 16. It is contemplated that in some embodiments, the reader 20 may automatically read the user identification code from the user identification device 13. For example, a second receiving portion may optionally be provided in the control unit 18 to receive the additional user identification device 16 when the master user identification device 16a is in the receiving portion 54. After the information has been entered and approved by the system 10, the control unit 18 stores the information in memory 28 and the user 16 is thus registered in procedure 180. The user identification device 16 is thus activated and may be used by the associated user 13. The method 172 proceeds to procedure 182 where information may be further entered into the control unit 18 or the master user identification device 16a may be removed from the control unit 18.

Figure 14:
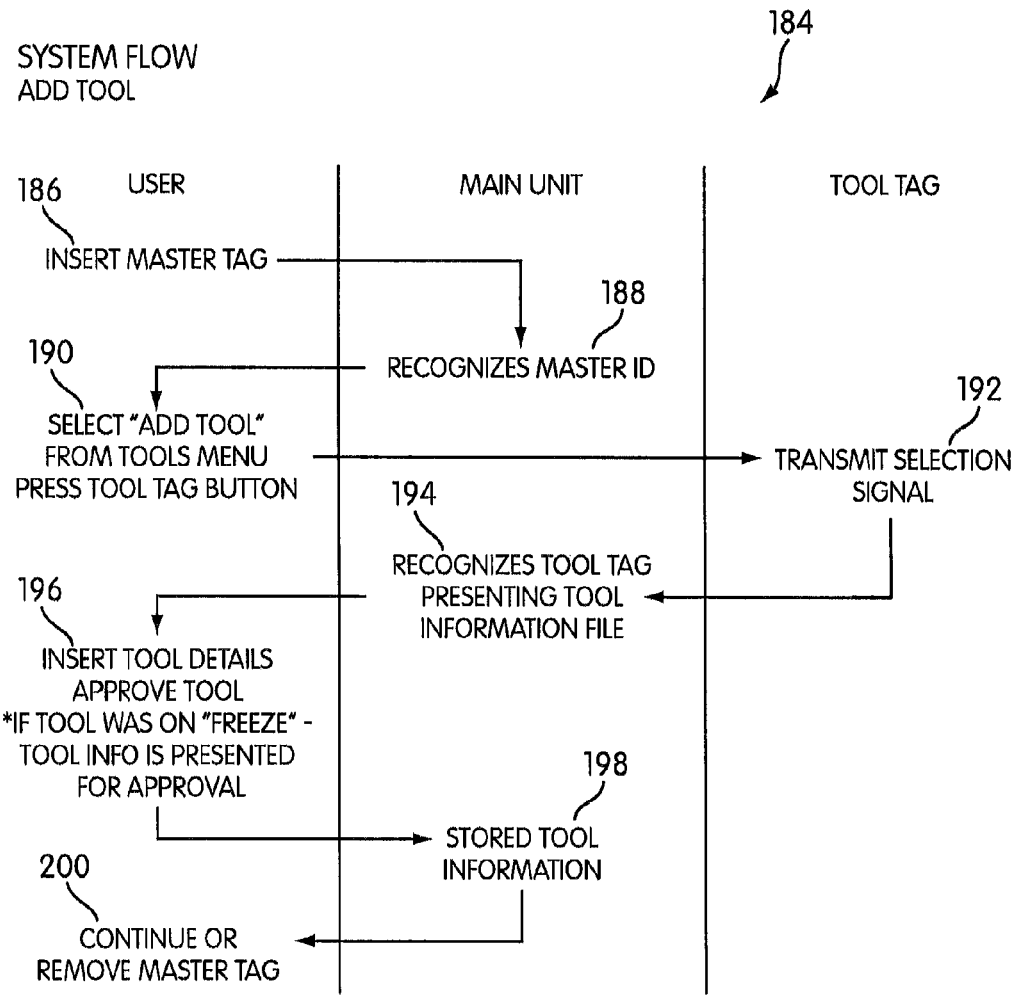
FIG. 14 is a flow diagram illustrating a method of adding an object identification device to the object management system.

FIG. 14 illustrates a method 184 of activating the object identification devices 12 and entering information associated therewith into the system 10 in accordance with one embodiment. As mentioned above, the object identification devices 12 must be attached properly to the objects 14. For example, the object identification devices 12 must be attached such that a closed circuit is formed, thereby enabling the transmitter 24 to transmit signals to the control unit 18. As also mentioned above, the object identification devices 12 must be properly attached for at least a period of time (e.g., 1 minute) for the transmitter 24 to start transmitting signals. Referring back to FIG. 14, the method 184 starts at procedure 186 where master user identification device 16a is inserted into the control unit 18. The method 184 proceeds to procedure 188 where the control unit 18 reads the master user identification device 16a to determine the user identification code associated therewith and determines whether the user identification device 16a is a registered user identification device 16a, 16. If not, the control unit 18 may visually or audibly indicate that the user identification device 16a was not accepted. If the master user identification device 16 is recognized and accepted, the method 184 proceeds to procedure 190 where the control unit 18 displays the option to add object identification devices 12 to the system 10. The object identification device 12 may be actuated via the actuators 88 to transmit signals to the control unit 18 or the object identification device 12 may transmit signals automatically at a predetermined interval. The master user 13a may also optionally enter the object identification code associated with the object identification device 12 into the control unit 18. If the actuators 88 are actuated, the method 184 proceeds to procedure 192 where the signals are transmitted from the object identification devices 12. The procedure 192 may be skipped, however, if the master user 13a entered the object identification code associated with the object identification device 12 into the system 10 manually. The method 184 proceeds to procedure 196 where the control unit 18 prompts for information associated with the object identification device 12, including information associated with the object 14, such as the name of the object 14. If the associated object 14 has a status of being "frozen," the information associated with the object 14 and the object identification device 12 will be displayed for approval by the master user 13a. The master user 13a may then unfreeze the object identification device 12 during this procedure 196. The master user 13a may enter information for the object identification device 12 into the system 10. The method 184 proceeds to procedure 198 where the information is stored in the memory 28 of the control unit 18. The method 184 proceeds to procedure 200 where information may be further entered into the control unit 18 or the master user identification device 16a may be removed from the control unit 18.

Figure 15:
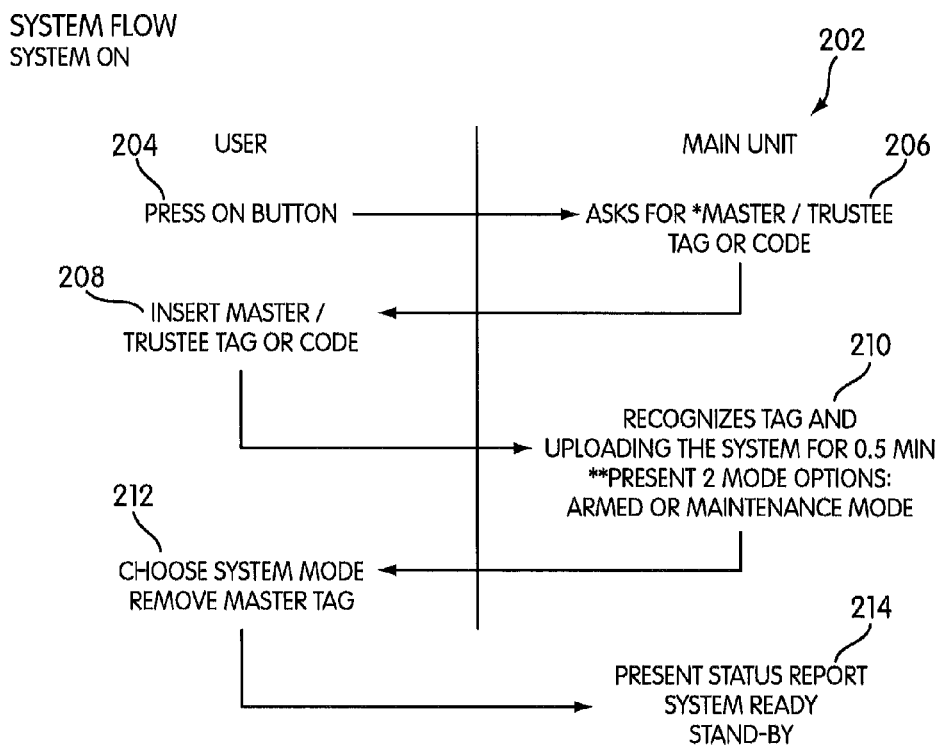
FIG. 15 is a flow diagram illustrating a method of turning on the object management system.

FIG. 15 illustrates a method 202 for turning on the system 10, for example, at the beginning of the day in accordance with one embodiment. In procedure 204, the on button is actuated to turn on the system 10. The on button may be part of the user interface 48a, 48b, or 48c. After the control unit 18 has been turned on, the control unit 18 may start receiving signals from the object identification devices 12 that are associated with objects transported in the container 38 associated with the control unit 18. The system 10 may determine the inventory/status of objects 14 in the container 38 at that time. The system 10 may also compare the recent inventory/status with the inventory/status at a previous time (e.g., the day before). In one embodiment, the control unit 18 may receive the signals within 20 seconds. The method 202 proceeds to procedure 206 where the control unit 18 prompts for the master user identification device 16a or the master code. However, if the master user identification device 16a is already inserted into the control unit 18, the control unit 18 will not prompt for the user identification device 16a. The master code may be entered or the master user identification device 16a may be inserted into the control unit 18 at procedure 208. The method 202 then proceeds to procedure 210 where the control unit 18 determines whether the user identification device 16a is a registered user identification device 16a, 16 or if the entered code is valid. If not, the control unit 18 may visually or audibly indicate that the user identification device 16a was not accepted or the entered code is invalid. If the master user identification device 16 or the entered code is recognized and accepted, the control unit 18 displays options for operating modes to the master user 13a, such as the armed mode or the maintenance mode. In one embodiment, only the master user 13a may have the authorization to select the armed mode/maintenance mode. In procedure 212, the master user 13a may select the armed mode or the maintenance mode. In one embodiment, if the maintenance mode is selected before a period of time (e.g., 20 seconds), the control unit 18 will upload information to the remote computing device 36 and a notification of the upload will be displayed on the visual display 44. If the armed mode is selected after the period of time (e.g., 20 seconds), the control unit 18 will display information/statuses associated with the objects 14, such as missing objects 14. In one embodiment, the control unit 18 may generate alarm indications and/or visual indications in accordance with a hostile event if there are missing objects 14 detected compared to the previous day's inventory/status of the objects 14. The master user 13a must approve of the status/inventory report for the system to cease the alarm indications/visual indications and to continue operating. The master user 13a may remove the master identification device 16a from the control unit 18 or the method 202 may proceed to procedure 214. The master user 13a may request the control unit 18 to display a status report by using the user interface 48a, 48b, or 48c. As mentioned above, the status report may be stored in the database in the memory 28 of the control unit 18. The status report may contain information associated with the objects 14, including which objects 14 are assigned to which user 13, 13a associated with a user identification device 16, 16a; the predetermined events, including the hostile events, that have occurred; and the battery statuses of the object identification devices 12.

Figure 16:
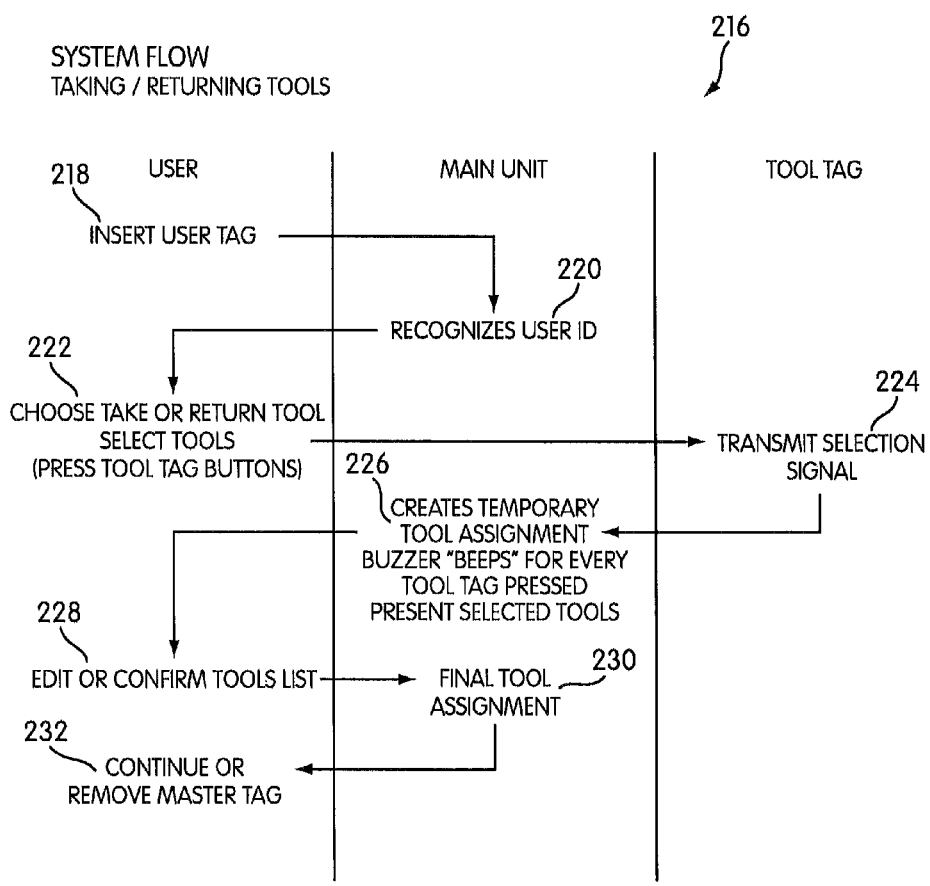
FIG. 16 is a flow diagram illustrating a method of checking out or returning objects and the associated object identification devices.

FIG. 16 illustrates a method 216 of checking out or returning objects 14 to and from the container 38 by a user 13a, 13 in accordance with one embodiment. The method 216 starts at procedure 218 where the user 13a, 13 inserts the associated user identification device 16a, 16 into the control unit 18. The method 216 then proceeds to procedure 220 where the control unit 18 determines whether the user identification device 16a, 16 is a registered or authorized user identification device 16a, 16. If not, the control unit 18 may visually or audibly indicate that the user identification device 16, 16a was not accepted. If the master user identification device 16, 16a or the entered code is recognized and accepted, the method 216 proceeds to procedure 222 where the control unit 18 prompts the user 13a, 13 to select the options for checking out objects 14 or returning objects 14.

The actuators 88 on the objects 14 may be actuated during the checking out/returning procedure for each selected object 14. The objects 14 may optionally be checked out or checked in by using the user interface 48a, 48b, 48c of the control unit 18 to select the objects 14 from a list. The method 216 proceeds to procedure 224 where the selected object 14 transmits signals to the control unit 18. In procedure 226, the control unit 18 temporarily creates an association between the user 13a, 13 and the object 14 in the control unit 18 during check out or temporarily disassociates the user 13a, 13 and the object 14 during return. As such, during check out, the selected object 14 will have a status of "out" and during return, the selected object 14 will have a status of "in". In one embodiment, if the actuators 22 of the returned object 14 (having status of "in") are actuated, the system 10 will ignore the transmission of signals. It is contemplated that in one embodiment, any authorized user 16a, 16 can return objects 14, including objects 14 not associated with the user 16a, 16 whose associated identification device 16a, 16 is cradled in the control unit 18. However, in one embodiment, if the user 13a, 13 has selected the check out mode, and the objects 14 are being checked out, actuating the actuators 22 by the user 13a, 13 or another user 13a, 13 will assign the object 14 to the user 13a, 13 whose associated user identification device 16, 16a is cradled in the control unit 18. In one embodiment, a buzzer or other indication may be generated when the actuators 88 on the object identification devices 12 are actuated. The method 216 then proceeds to procedure 228 where the control unit 18 displays a list of the objects 14 assigned to the user 13a, 13 whose associated user identification device 16a, 16 is cradled in the control unit 18. The user 13a, 13 may confirm or edit the list of objects 14. In one embodiment, if the check out or return process is interrupted before the user 13a, 13 can confirm the list of objects 14, the entire process may be voided and the user may be required to start the checking out/returning process again. After the user 13a, 13 has confirmed or edited the list of objects 14, the method 216 proceeds to procedure 230 where the associations between the objects 14 and the user 13a, 13 are confirmed and stored in the memory 28 of the control unit 18. The method 216 proceeds to procedure 232 where the user 13a, 13 may further interact with the control unit 18 or the user identification device 16, 16a may be removed from the control unit 18.

Figure 17:
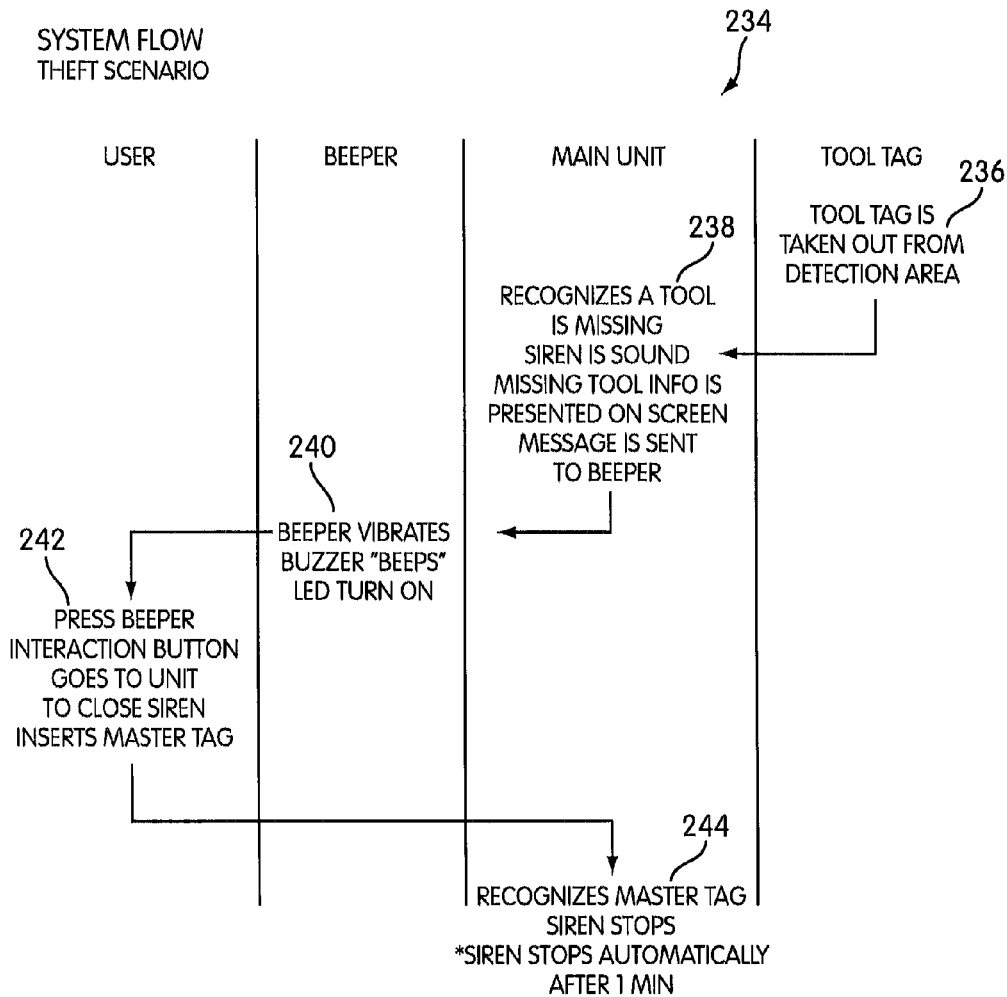
FIG. 17 is a flow diagram illustrating a method of determining a hostile event and generating an alarm indication in response.

FIG. 17 illustrates a method 234 of activating the alarm 34 and/or the indicator unit 22 in response to a hostile event (e.g., theft of object 14) in accordance with one embodiment. The method 234 starts at procedure 236 where an object 14 and the associated object identification device 12 are removed from the detection range of the control unit 18. As mentioned above, the object identification device 12 may also stop transmitting signals, thus indicating the theft of the object 14 or the object 14 as being missing, if the connector 84 of the object identification device 12 is severed or removed from the housing 78. As also mentioned above, the object identification devices 12 are configured to transmit signals at predetermined intervals during movement and in rest and have the status of being "in movement," "in rest," or "frozen." If such status and signals are not transmitted to the control unit 18 within the predetermined interval, the control unit 18 is configured to determine at procedure 238 that a hostile event (theft of object 14 or object 14 is missing) has occurred. The information associated with the object 14 may be displayed on the visual display 44 (for example see FIG. 7a). The control unit 18 may generate an audio alarm via the alarm 34. The control unit may also generate a visual alarm via the light 43. The control unit 18 may transmit an alert/information to the indicator unit 22. In procedure 240, the indicator unit 22 generates an audio alarm and an visual alarm in response to the alert/information from the control unit 18 to alert/provide information to the master user 13a associated with the indicator unit 22. The indicator unit 22 may vibrate, buzz, and/or generate a visual indication via the lights 42. The method 234 then proceeds to procedure 242 where the actuator on the indicator unit 22 can be actuated to cease the alarms. The master user 13a may also interact with the control unit 18 to cease the alarm indications. For example, the master user 13a may enter a master code into the control unit 18 via the user interfaces 48a, 48b, 48c, or may insert the master user identification device 16a into the control unit 18 to be cradled by the control unit 18. The method 234 then proceeds to procedure 244 where the control unit 18 determines if the master user identification device 16a is registered and valid. If not, the alarms may continue to be generated. In contrast, if the master user identification device 16a is recognized as being registered and valid, the control unit 22 ceases generation of the alarm indications after a period of time (e.g., 1 minute). The control unit 22 also ceases transmission of alert signals to the indicator unit 22 so that the indicator unit 22 will also cease generation of alarm indications.

Figure 18:
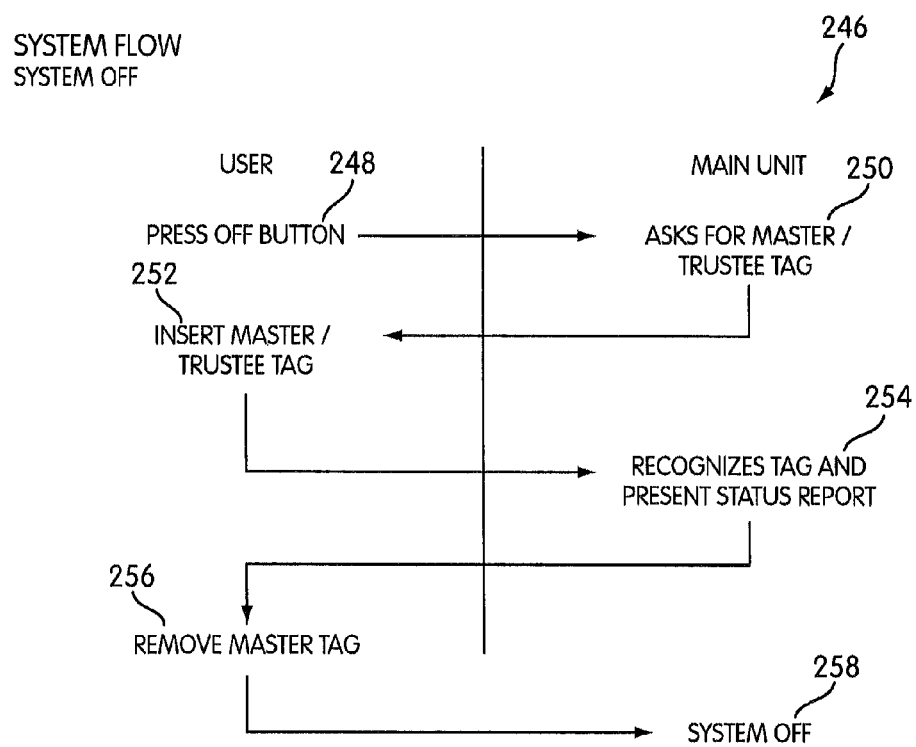
FIG. 18 is a flow diagram illustrating a method of turning off the object management system.

FIG. 18 illustrates a method 246 of turning off the system 10, for example, at the end of the day in accordance with one embodiment. As mentioned above, the master user 13a is authorized to view the status report of the objects 14, including which objects 14 are assigned to which users 13, 13a via their associated user identification devices 16, 16a and object identification devices 12. The master user 13a may then obtain the objects 14 back from their assigned users 13 based on the status report. However, if an object 14 is determined to be missing, the master user 13 may remove the object 14 from the inventory/status list so that alarms will be not generated in the future for the missing object 14. Referring back to FIG. 18, the method 246 starts at procedure 248 where the off button may be actuated to turn off the system. The off button may be part of the user interface 48a, 48b, or 48c. The method 246 then proceeds to procedure 250 where the control unit 18 prompts for the master user identification device 16a. In one embodiment, only the master user 13a may turn on/off the system 10. The method 246 then proceeds to procedure 252 where the master user identification device 16a is inserted into the control unit 18. The method 246 then proceeds to procedure 254 where the control unit 18 determines whether the user identification device 16a is a registered master user identification device 16a. If not, the control unit 18 may visually or audibly indicate that the user identification device 16a was not accepted. If the master user identification device 16 is recognized and accepted, the control unit 18 displays the status report via the visual display 44. In one embodiment, the control unit 18 automatically displays the status report when the master user identification device 16a is inserted into the control unit 18 when the system 10 is about to be turned off. In one embodiment, approving the status list by interacting with the control unit 18 via the user interface 48a, 48b, or 48c automatically shuts off the system 10 after the off button has been actuated. The method 246 then proceeds to procedure 256 where the master user identification device 16a is removed from the control unit 18. The method 246 proceeds to procedure 258 where the system 10 is shut down. It is also contemplated that instead of using the master user identification device 16a, a master code may be entered to shut down the system 10.

Figure 19:
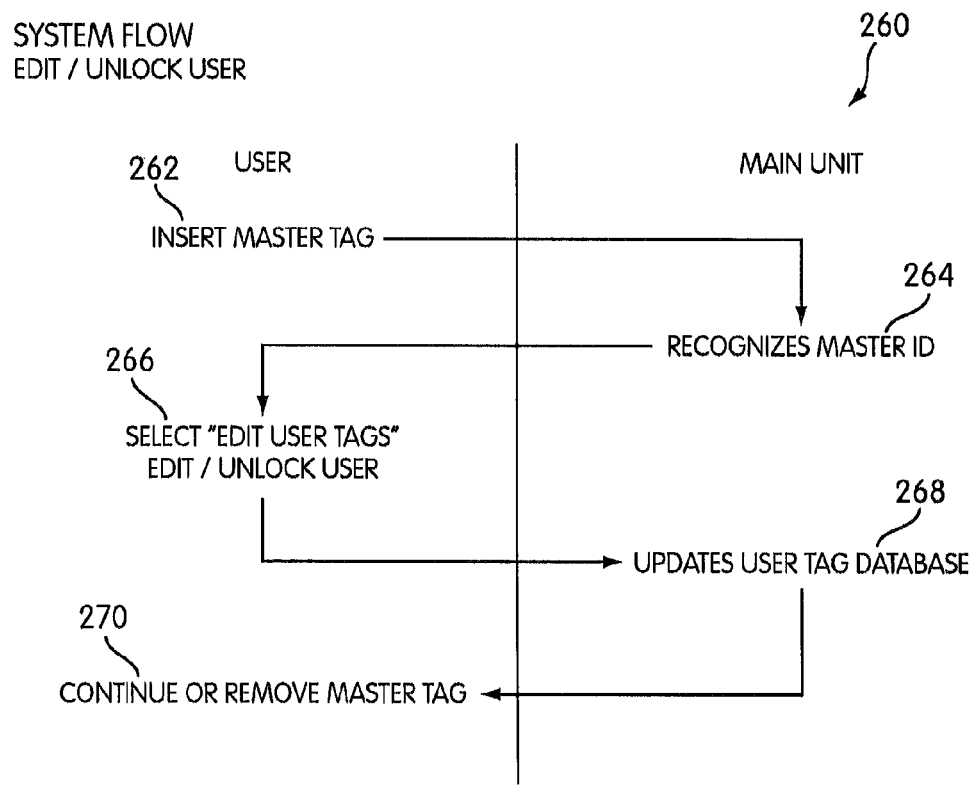
FIG. 19 is a flow diagram illustrating a method of editing or unlocking a user identification device of the object management system.

FIG. 19 illustrates a method 260 of unlocking a user identification device 16 and/or editing user information associated with a user identification device 16 in accordance with one embodiment. This may be useful when the user identification device 16 is to be re-used (associated with another user 13). As mentioned above, user identification devices 16 may be locked when they are cradled for more than a period of time (e.g., 1 minute) in the control unit 18 without any user interaction with the control unit 18. When a user identification device 16 is locked, the user identification device is temporarily removed from the active users list such that the system 10 does not recognize the user identification device 16 as being valid or authorized (and thus the associated user 13 is unable to operate the control unit 18). However, a master user identification device 16a may be used to unlock the user identification device 16 so that the user identification device 16 can be considered valid or authorized again. The method 260 starts at procedure 262 where the master user identification device 16a is inserted into the control unit 18. The method 260 then proceeds to procedure 264 where the control unit 18 determines whether the user identification device 16a is a registered master user identification device 16a. If not, the control unit 18 may visually or audibly indicate that the user identification device 16a was not accepted. If the master user identification device 16a is recognized and accepted, the control unit 18 displays a menu to the master user 13a via the visual display 44. In procedure 266, the master user 13a may then select the option to edit user identification devices 16, which enables the master user 13a to edit/unlock the user identification devices 16 by entering information associated with the user identification device 16 to be unlocked/edited. After the master user 13a has edited or unlocked the user identification device 16, the method 260 proceeds to procedure 268 where the control unit 18 updates the database in the memory 28. The method 216 proceeds to procedure 232 where the master user 13a may further interact with the control unit 18 or the master user identification device 16a may be removed from the control unit 18.

Figure 20:
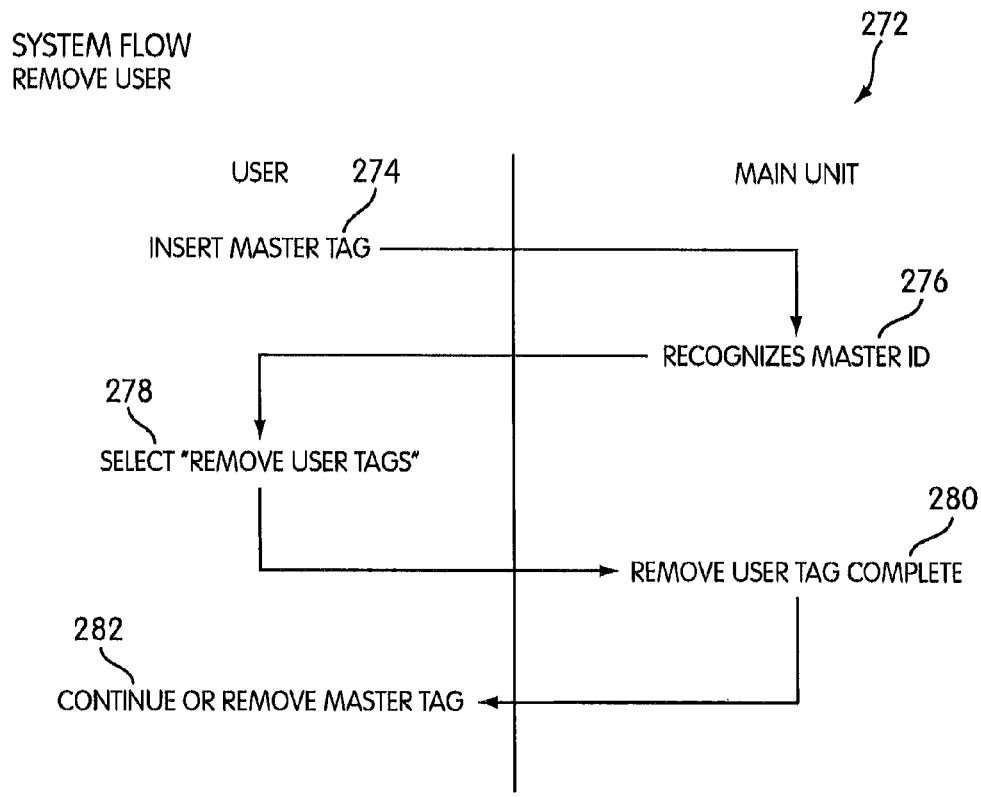
FIG. 20 is a flow diagram illustrating a method of removing a user identification device from the object management system.

FIG. 20 illustrates a method 272 for removing user identification devices 16 from the system 10 in accordance with one embodiment so that the user identification device 16 is no longer valid or authorized. The method 272 starts at procedure 274 where the master user identification device 16a is inserted into the control unit 18 to be cradled by the control unit 18. The method 272 then proceeds to procedure 276 where the control unit 18 determines whether the user identification device 16a is a registered master user identification device 16a. If not, the control unit 18 may visually or audibly indicate that the user identification device 16a was not accepted. If the master user identification device 16a or the entered code is recognized and accepted, the method 272 proceeds to procedure 278 where the control unit 18 enables the master user 13a to select an option to remove user identification devices 16 from the system 10. The master user 13a may then select the user identification device to remove from the system 10 by using the visual display 44 and the user interface 48a, 48b, 48c. After the user identification device 16 has been selected, the method 272 proceeds to procedure 280 where the control unit 18 completes the process of removing the user identification device 16 and associated information from the database in its memory 28. The method 272 then proceeds to procedure 282 where the master user 13a may further interact with the control unit 18 or the master user identification device 16a may be removed from the control unit 18.

Figure 21:
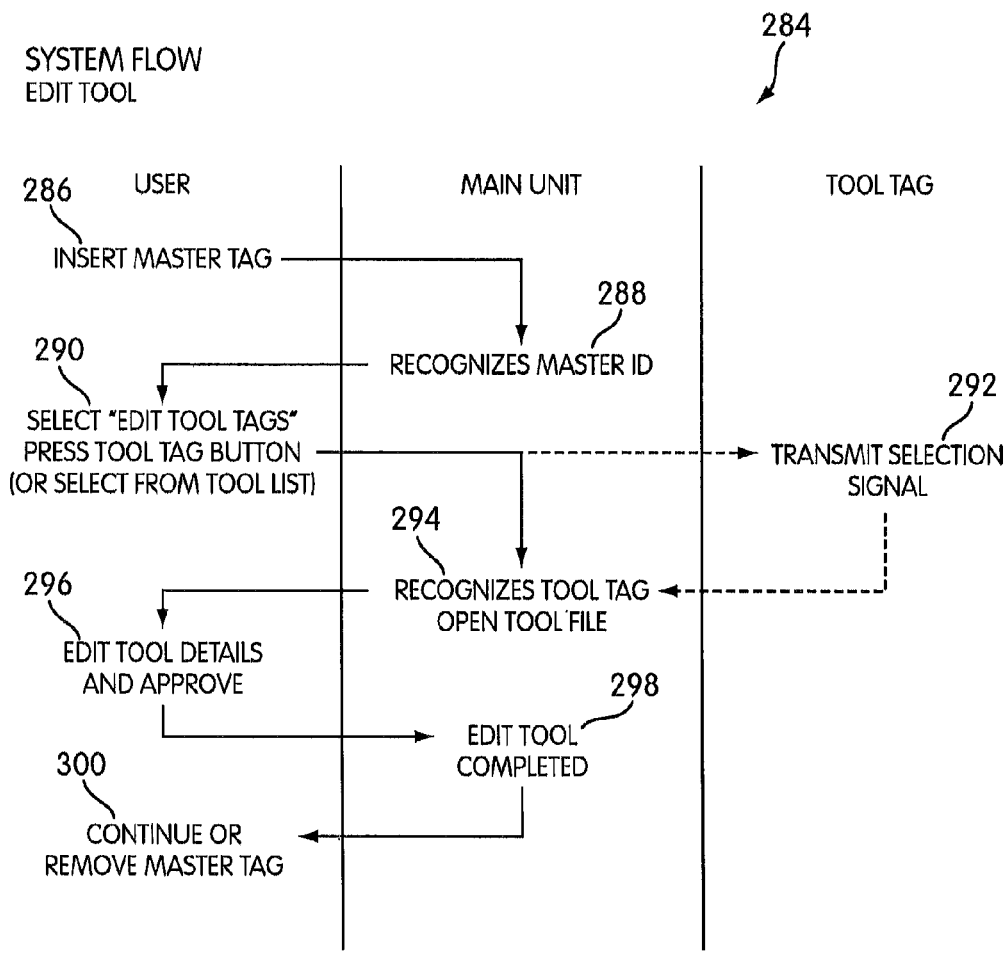
FIG. 21 is a flow diagram illustrating a method of editing information associated with an object identification device of the object management system.

FIG. 21 illustrates a method 284 of editing information associated with the object identification devices 12 stored in the control unit 18 in accordance with one embodiment. In one embodiment, only the master user 16a has authorization to edit information associated with the object identification devices 12. The method 284 starts at procedure 286 where the master user identification device 16a is inserted into the control unit 18. The method 284 then proceeds to procedure 288 where the control unit 18 determines whether the master user identification device 16a is a registered master user identification device 16a. If not, the control unit 18 may visually or audibly indicate that the user identification device 16a was not accepted. If the master user identification device 16a is recognized and accepted, the control unit 18 displays an option for editing object identification devices 12 on the visual display 44 in procedure 290. The actuators 88 on the object identification devices 12 may be actuated to transmit signals from the object identification device 12 to the control unit 18 so that the control unit 18 can read the object identification code from the object identification device 12 to identify the object identification device 12. Alternatively, the object identification device 12 and associated object 14 may be selected from a list displayed by the control unit 18. As mentioned above, the control unit 18 may display a list of active objects 14 and their associated object identification devices 12. If the actuators 88 are actuated, the method 284 proceeds to procedure 292 where the object identification devices 12 transmit signals to the control unit 18. This procedure 262 may be skipped if the object identification devices 12 and associated objects 14 are selected from a list displayed by the control unit 18. The method 284 then proceeds to procedure 294 where the control unit 18 recognizes the object identification device 12 with the information to be edited. The control unit 18 opens the file corresponding to the object identification device 12. The method 284 then proceeds to procedure 296 where information associated with the object identification device 12 is edited, including information of the object 14 associated with the object identification device 12. After the master user 13a has approved the edits, the method 284 proceeds to procedure 298 where the control unit 18 completes the editing process by storing the information in the memory 28 of the control unit 18. The method 284 then proceeds to procedure 300 where the master user 13a may further interact with the control unit 18 or the master user identification device 16a may be removed from the control unit 18.

Figure 22:
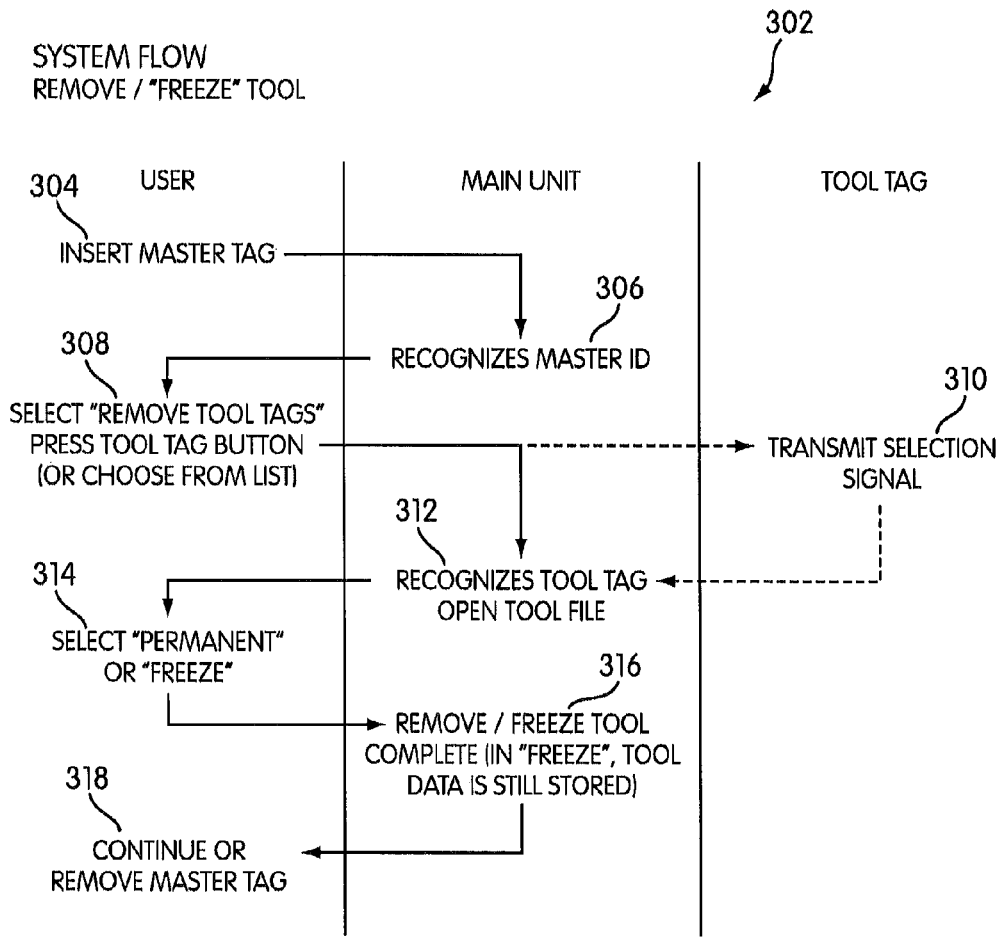
FIG. 22 is a flow diagram illustrating a method of removing an object identification device or editing information associated with an object identification device of the object management system.

FIG. 22 illustrates a method 302 of "freezing" or removing object identification devices 12 from their associated objects 14 in accordance with one embodiment. As mentioned above, the object identification devices 12 may cease transmission of signals if the connector 84 is severed or detached from the housing 78, which causes the control unit 18 to determine that a hostile event has occurred and to generate alarm indications in response thereto. Thus, to detach or remove the object identification device 12 without the control unit 18 generating such alarm indications, the object identification devices 12 must be "frozen". The object identification devices 12 may then be detached and then attached to another object 14. The information associated with the object identification device 12 may then be edited according to method 284 shown in FIG. 21. The method 302 enables the master user 13a to either "freeze" object identification devices 12 or to remove object identification devices 12 from the system 10. The object identification devices 12 may be removed from the system 10 if they, for example, are out of battery, require replacement, or are no longer needed. In one embodiment, only the master user 13a has the authorization to remove or freeze object identification devices 12. Referring back to FIG. 22, the method 302 starts at procedure 304 where the master user identification device 16a is inserted into the control unit 18. The method 302 then proceeds to procedure 306 where the control unit 18 determines whether the master user identification device 16a is a registered master user identification device 16a. If not, the control unit 18 may visually or audibly indicate that the user identification device 16a was not accepted. If the master user identification device 16a is recognized and accepted, the method 302 proceeds to procedure 308 where the control unit 18 displays the option to remove object identification devices 12. The actuators 88 on the object identification devices 12 may be actuated to transmit signals from the object identification device 12 to the control unit 18 so that the control unit 18 can read the object identification code from the object identification device 12 to identify the object identification device 12. Alternatively, the object identification device 12 and associated object 14 may be selected from a list displayed by the control unit 18. As mentioned above, the control unit 18 may display a list of active objects 14 and their associated object identification devices 12. If the actuators 88 are actuated, the method 302 proceeds to procedure 310 where the object identification devices 12 transmit signals to the control unit 18. This procedure 310 may be skipped if the object identification devices 12 and associated objects 14 are selected from a list displayed by the control unit 18. The method 302 then proceeds to procedure 312 where the control unit 18 identifies the object identification device 12 and opens the file associated with the object identification device 12. The method 302 proceeds to procedure 314 where the control unit 18 presents the option to either remove the object identification device 12 from the system 10 or freeze the object identification device 12. The object identification device 12 may be removed "permanently," although the object identification device 12 may be added back into the system 10 later if desired according to method 184 shown in FIG. 14. The method 184 shown in FIG. 14 may also be used to unfreeze the object identification device 12. After the master user 13a has selected the option, the method 302 proceeds to procedure 316 where the control unit 18 completes the removing/freezing process. If the removing option is selected, the information associated with the selected object identification device 12 is removed from memory 28. However, if the freezing option is selected, the information associated with the object identification device 12 is retained in memory but the object identification device 12 and its associated object 14 are no longer considered active. The method 302 then proceeds to procedure 318 where the master user 13a may further interact with the control unit 18 or the master user identification device 16a may be removed from the control unit 18.

Figure 23:
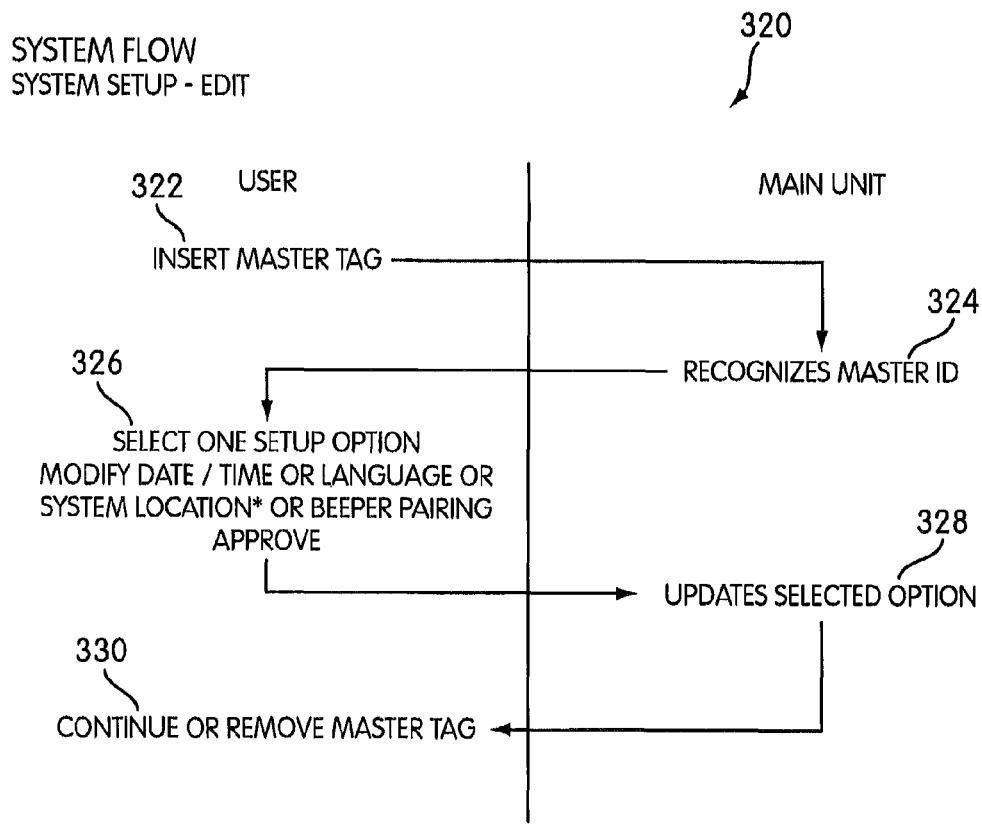
FIG. 23 is a flow diagram illustrating a method of editing settings information of the object management system.

FIG. 23 illustrates a method 320 of edit the settings of the system 10 in accordance with one embodiment. In one embodiment, only the master user 13a associated with a master user identification device 16a has authorization to edit the system settings. The method 320 starts at procedure 322 where the master user identification device 16a is inserted into the control unit. The method 320 then proceeds to procedure 324 where the control unit 18 determines whether the master user identification device 16a is a registered master user identification device 16a. If not, the control unit 18 may visually or audibly indicate that the user identification device 16a was not accepted. If the master user identification device 16a is recognized and accepted, the method 320 proceeds to procedure 326 where the control unit 18 presents a menu and an option to edit set up information. The set up options may include modifying the date/time, language, system location (such as where the control unit 18 is located and/or what kind of container 38 the control unit 18 is attached to), and information regarding the indicator unit 22 paired to the control unit 18. The master user 13a may edit the information in the control unit 18 using the visual display 44 and user interfaces 48a, 48b, and 48c. After the master user 13a has edited the information and approved of the edits, the method 320 proceeds to procedure 328 where the control unit 18 stores the updated information in the memory 28 of the control unit 18. The method 320 then proceeds to procedure 330 where the master user 13a may further interact with the control unit 18 or the master user identification device 16a may be removed from the control unit 18.

It is contemplated for any of the methods described above, a master code may be entered into the system 10 instead of inserting the master user identification device 16a into the control unit 18.

Figure 24:
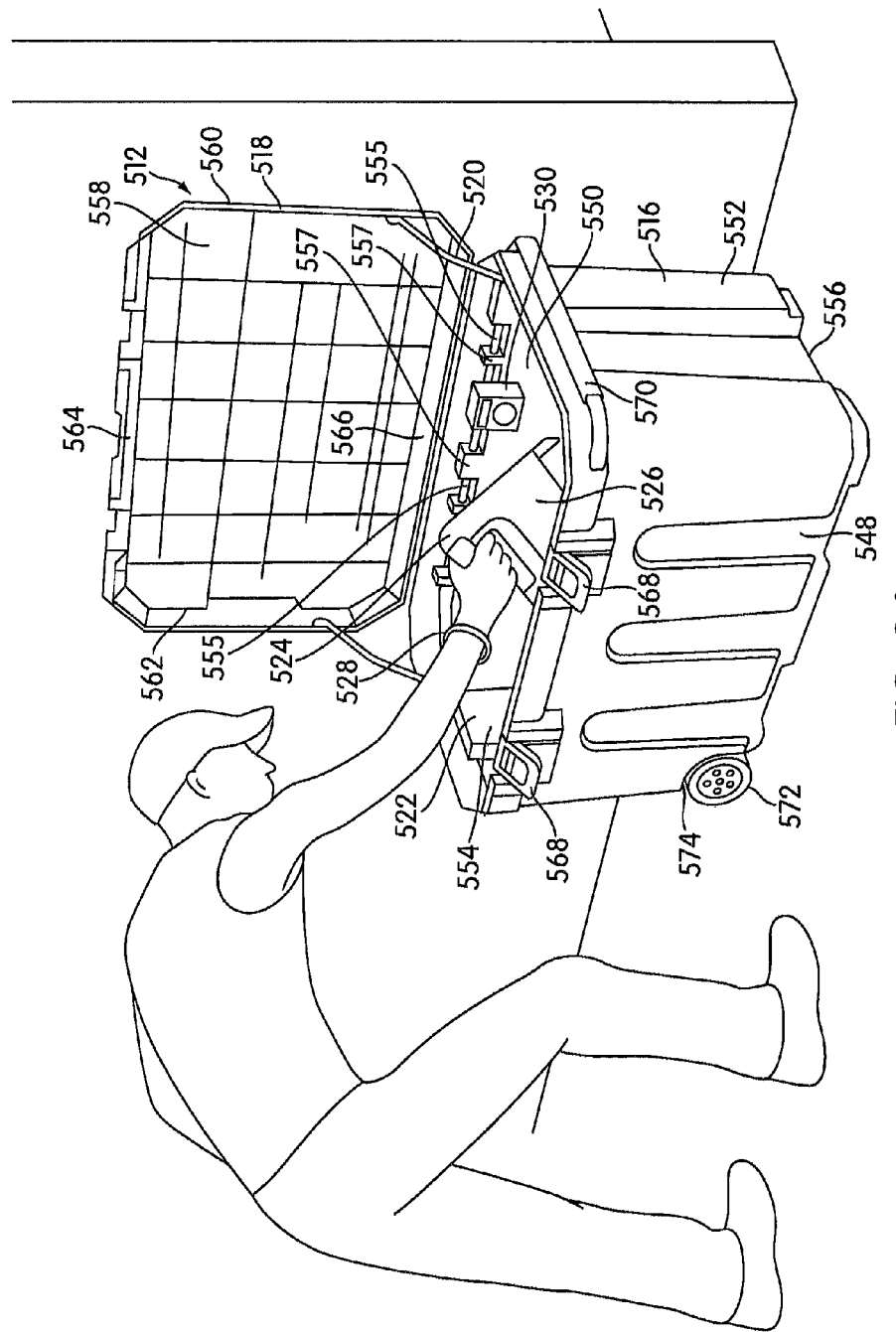
FIG. 24 is a perspective view of a container and object management system in accordance with one embodiment.

FIG. 24 shows another embodiment of the object management system 510 that may be used with a container 512. In this embodiment, the container 512 includes a container portion 516 and a cover 518. The container portion 516 has a storage space 520 and defines an upwardly facing opening 522 into the storage space 520. The cover 518 is movable between a closed position wherein the cover 518 substantially covers the upwardly facing opening 522 and an open position wherein the upwardly facing opening 522 is substantially exposed. The cover 518 is optional and it is contemplated that in some embodiments, the container 512 might not have a cover. At least one object 524 (one is shown) is transported in the containers 512, and each object 524 has an object identification device or tag 526. The objects 524 may be tools that are to be used at a worksite. Each object identification device 526 provides a radio frequency signal containing an object identification code. The object management system 510 also includes at least one user identification device or tag 528, and the at least one user identification device 528 provides a radio frequency signal containing a user identification code. The object management system 510 has at least one control unit 530 (shown in FIG. 26), wherein each control unit 530 is associated with a container 512. The control unit 530 includes a RFID reader 532 (see FIG. 27) that is configured to receive and read the radio frequency signal provided by the user identification devices 528 and the object identification devices 526.

In the embodiment shown in FIG. 24, the control unit 530 is connected to a remote unit 542 (see FIG. 26), which has a database 544 (see FIG. 28) containing user identification codes and object identification codes. In this embodiment, the remote unit 542 is a remote control unit capable of receiving from and transmitting signals to the control unit 530. In one embodiment, the remote unit 542 is constructed and arranged to be carried by the master user 13a. The remote unit 542 also includes a user interface 546 for displaying a status of the control units 530 and a status of the objects 524. The remote unit 542 is configured to generate an alarm indication in response to receiving an output signal from the control unit 530, the output signal from the control unit 530 is generated in response to an occurrence of a predetermined event based on the signal received from the RFID reader 532 and sensors 536, 538, and 540 (see FIGS. 27 and 29). A power supply 547 (see FIG. 27) is configured for powering the control unit 530. The power supply 547 may provide power (directly or indirectly) to any components of the object management system 510 that requires a power source to be operated. A power supply 604 (see FIG. 28) may also be configured for powering the remote unit 542. In one embodiment, the power supply 547 and the power supply 604 may be in the form of batteries, solar panels, and/or A/C mains provided by a utility provider or a generator. In one embodiment, the remote unit 542 and the control units 530 may include hardware that is configured to measure the voltage of the power supply 547 and the power supply 604, such that alarm indications may be generated when the low voltage condition of the power supply 547 and the power supply 604 is detected.

In one embodiment, the object management system 510 may also include at least one sensor. In one embodiment, the at least one sensor includes a motion sensor 536 (see FIG. 29), an proximity sensor 538 (see FIG. 29), and/or a tamper sensor 540 (see FIG. 29). It is contemplated that any, one, or all of these sensors 536, 538, and 540 may be used. In one embodiment, the proximity sensor 538 is an infrared intrusion sensor.

In the embodiment shown in FIG. 24, the container portion 516 of the container 512 includes a pair of side walls 548 and 550, a front wall 552, a rear wall 554, and a bottom wall 556. The front wall 552, the rear wall 554 and the opposed side walls 548 and 550 are constructed and arranged to generally extend vertically upwardly from the bottom wall 556. The front wall 552 and the rear wall 554 are joined to each other by the opposed side walls 548 and 550 to form the aforementioned storage space 520 therewithin with the upwardly facing opening 522 in the container portion 516. In one embodiment, the base container portion 516 is formed from a suitable molded plastic material.

Figure 25:
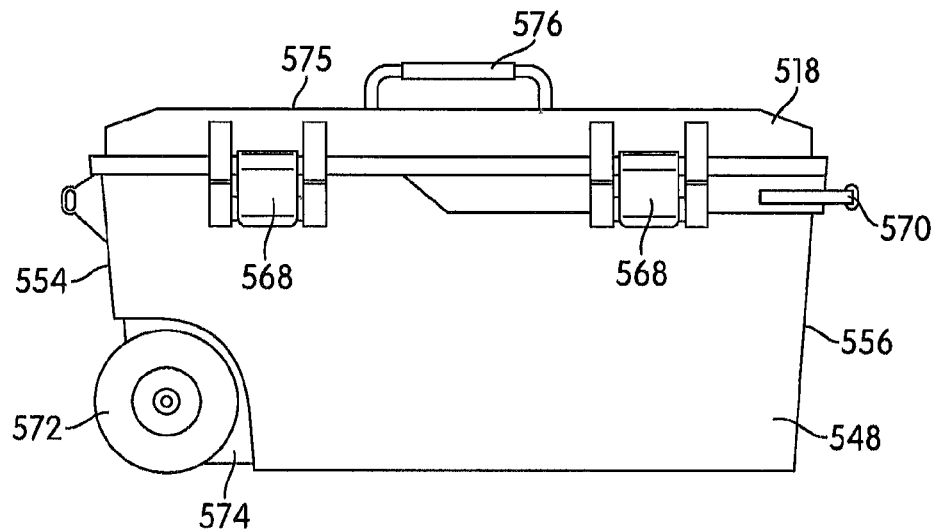
FIG. 25 is a perspective view of the container in accordance with an embodiment of the present invention.

The cover 518 generally includes a top wall 558, a front wall 560, a rear wall 562, and opposed side walls 566. The front wall 552, the rear wall 554 and the opposed side walls 548 and 550 are constructed and arranged to generally extend vertically downwardly from the top wall 558 (when the container 512 is resting on the ground with the cover in the closed position as shown in FIG. 25). The cover 518 may be secured in the closed position, by at least one latch 568 (two are shown). In other embodiments, the cover may be secured in the closed position by mechanisms such as buckles, locks, snap fit connections, or other mechanisms known in the art, or combinations thereof.

In one embodiment, the cover 518 is pivotally connected to the container portion 516 by hinges 555. The pivotal movement may also be controlled by hinge guides 557, which may or may not provide for damped pivotal movement. In other embodiments, a sliding cover or a removable cover can be used.

Figure 29:
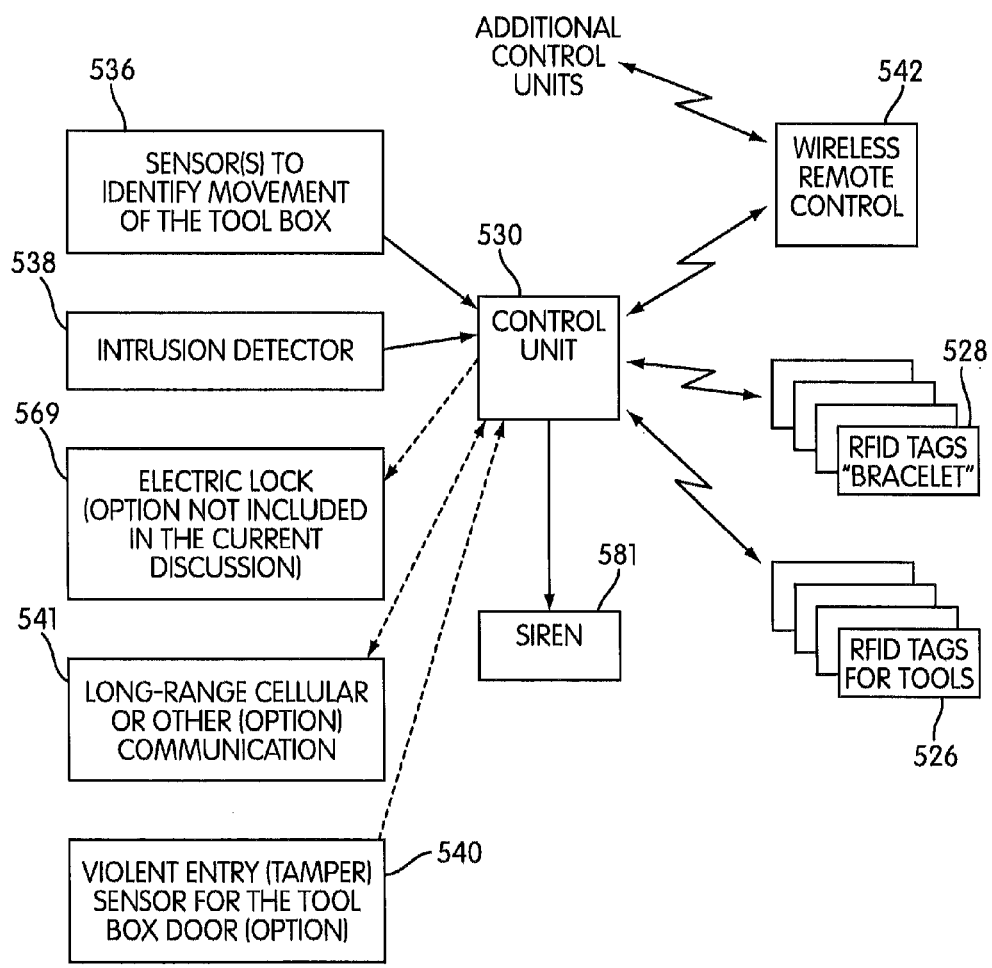
FIG. 29 is a schematic view of the object management system.

In one embodiment, the cover 518 may be secured in the closed position using a lock 569 (see FIG. 29). In one embodiment, the lock 569 includes an electrically operated lock. In such embodiment, the lock 569 includes a solenoid. The solenoid may be a two-directional solenoid. In one embodiment, a solenoid driver is used to ensure highly reliable solenoid control for locking and unlocking the cover 518. In such embodiment, the solenoid driver may include two N-channel MOSFETs. In one embodiment, the lock 569 can only be unlocked when an authorized user is in the vicinity and is sensed by the control unit 530 to be an authorized user.

In the embodiment shown in FIG. 25, the container 512 includes an extendable handle 570 and rollers 572. The extendable handle 570 is operatively connected to the container portion 516 to facilitate tilted rolling transport of the container 512. The container portion 516 includes a pair of handle receiving portions formed near a top edge 549 along the opposing side walls 548 and 550. The handle receiving portions are constructed and arranged to receive the handle 570 therewithin, when the handle 570 is in a retracted position. In one embodiment, the handle receiving portions are hollow structures that are configured to telescopically receive legs of the handle 570 to enable extension and retraction respectively.

The rollers 572 are connected with the container portion 516 to enable transport of the container 512. In one embodiment, the rollers 572 may be in the form of wheels and may facilitate rolling transport of the container 512. In one embodiment, the rollers 572 are mounted in a recess 574 formed in the base container 512 so that the container 12 may be tilted and pulled or pushed along a horizontal surface (e.g., ground surface) by a user holding the handle 570. The rollers 572, in one embodiment, may optionally be locked against rolling motion by roller lock members that are operatively connected to the rollers 570 to provide a stationary configuration.

In one embodiment, the container 512 may include a carrying handle 576. The carrying handle 576 is constructed and arranged to be attached to a top surface 575 of the cover 518. In embodiments where a carrying handle 576 is used, the handle 570 and rollers 572 may optionally be eliminated (and vice versa).

Referring back to FIG. 24, the control unit 530 is disposed on the side wall 550 of the container portion 516, inside the container portion 516, near the opening 522. In another embodiment, the control unit 530 may be disposed in or on the cover 518, either on the inner side or outer side. It is contemplated that the control unit 30 may be disposed anywhere on the container 512 near the opening 522. In one embodiment, the control unit 530 is constructed and arranged to be removably attached to the container 512. The control unit 530 may be optionally attached to the container 512 using screws, snap fit connections, fasteners, pins, or other attachment mechanisms known in the art.

The container 512 shown in FIGS. 24 and 25 is not intended to be limiting. The object management system 510 may also be associated with other forms of storage containers, such as, for example, shipping containers, freight containers, truck boxes, and storage facilities. It is also contemplated that in some embodiments, the object management system 510 may manage objects 524 within a perimeter rather than in an enclosed area. For example, the object management system 510 may be associated with a defined area at a worksite, a truck bed, or an area within a predetermined radius of the object management system 510. These examples of the areas that may be associated with the object management system 510 are not intended to be limiting.

Figure 26:
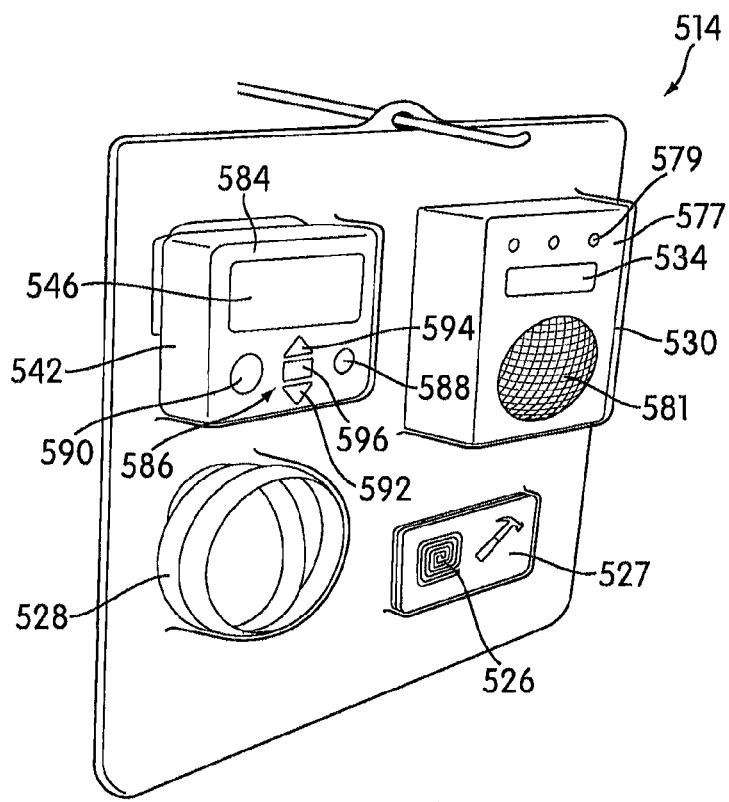
FIG. 26 is a perspective view of the tool management system in accordance with an embodiment of the present invention.

FIG. 26 shows the object management system 510 having the remote unit 542, the user identification devices 528, the control unit 530, and the object identification devices 526. In this embodiment, the control unit 530 has an enclosure 577, which may be made of plastic. It is contemplated that the housing may be made of other materials, such as wood, or other materials known in the art, or a combination thereof.

Figure 27:
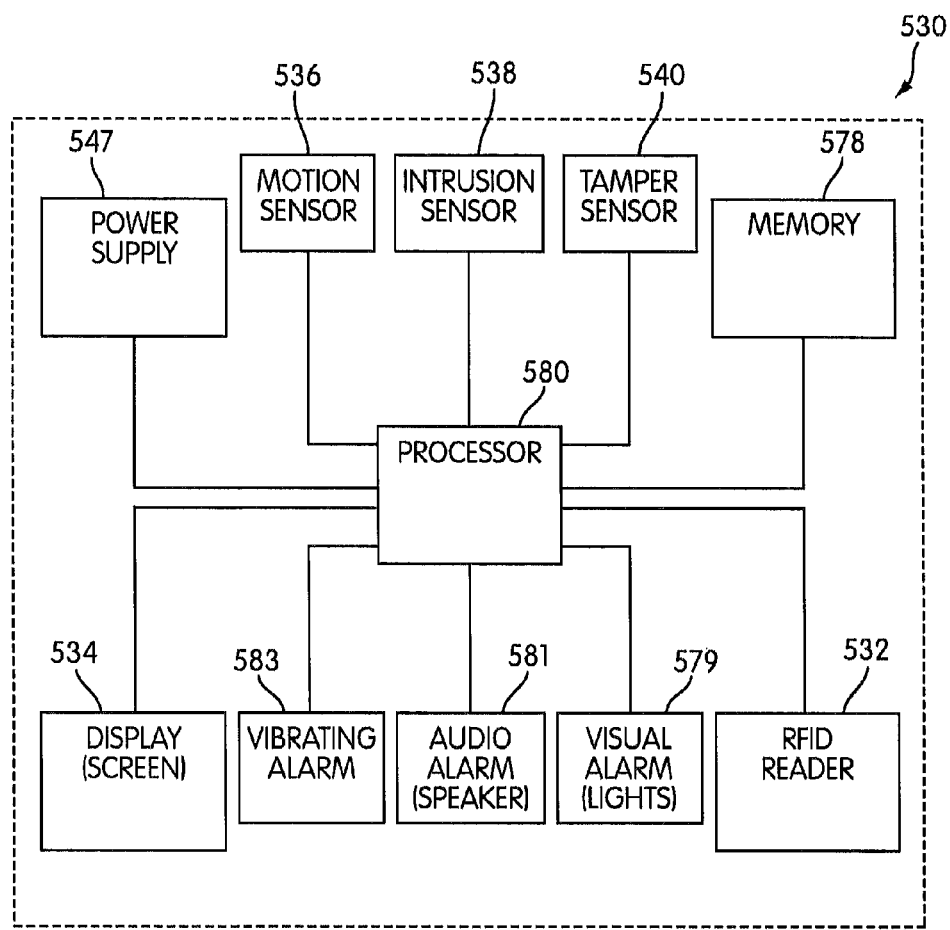
FIG. 27 is a block diagram of a control unit in accordance with an embodiment.

In the embodiment shown in FIG. 27, the control unit 530 includes a display screen 534, a reader 532, memory 578 (such as storage chips or a small hard drive), and a programmable processor 580 for processing information and controlling the functions of the control unit 530. The reader 532 may be a radio frequency identification (RFID) reader. The RFID reader 532, or interrogator, may be of any type suitable for receiving signals from the object identification devices 526 and user identification devices 28. Just for example, the control unit 530 may include a Motorola RD5000 Mobile RFID Reader. The RFID reader 532 may include a radio frequency receiver and a transmitter for providing interrogation signals to passive identification devices. The RFID reader 532 may also transmit information to be stored in the user identification devices 528 and the object identification devices 526. The RFID reader 532 may further include antennas to transmit and receive signals to and from the object identification devices 526 and user identification devices 528.

In one embodiment, the control unit 530 may also include an on/off microswitch 585. The on/off microswitch 585 may be actuated to switch the control unit 530 between the activated state and the deactivated state, or to turn the control unit 530 on or off. In this embodiment, when the control unit 530 is deactivated or turned off, the supply of energy from the power supply 547 to the other components of the control unit 530 is prevented, thus conserving energy in the control unit 530 when the control unit 530 is not in use.

In one embodiment, the control unit 530 displays its status using the screen 34. The status of the control unit 530 may also be displayed by one or more lights 579 disposed on the enclosure 577 of the control unit 530. The status of the control unit 530 may include the control unit 530 having low power. The status of the control unit 530 may also include the control unit 530 and its associated container 512 being armed, where alarm indications are generated in response to the occurrence of predetermined or specified events, or disarmed, where alarm indications are not generated in response to the occurrence of predetermined events. The predetermined events that are recognized may be removal of an object 524 by an unauthorized user, movement of the container 512 by an unauthorized user, tampering of the container 512, loss of communication between the remote unit 542 and the control units 530, and low power in any of the control units 530 and the remote unit 542. It is contemplated that the object management system 510 may recognize other statuses and other particular events. It is also contemplated that other events may also trigger the alarm indication.

Similar to the alarm indications for the control unit 530, the alarm indications for the remote unit 542 may be in the form of a visual alarm indication, an audio alarm indication, or a vibrating alarm indication. The alarm indications may be generated by a vibrating alarm 543 (see FIG. 28), an audio alarm 545 (see FIG. 28), and/or the user interface 546 (see FIG. 28). It is contemplated that any, one, or all of these indications may be used. It is also contemplated that the user may select the type of alarm indications that is generated and where the alarm indications is generated, such as in the control units 530 or in the remote unit 542 or both.

It is contemplated that the volume of an audio alarm indication may vary and may be selected by the user. Furthermore, the alarm indication may be a siren with five volts buzzer. The audio alarm indication may include, but not limited, to a tone, a buzz, a beep, a sound (e.g., a horn or a chime), and/or a prerecorded voice message. In one embodiment, the audio alarm indication may include tones with changing frequency or volume. In another embodiment, the audio alarm indication may include user configurable tones and alarms. The visual indication may be displayed on the user interface 46. It is contemplated that in some embodiments, the remote unit 42 may also have lights that indicate the occurrence of the predetermined events.

In one embodiment, when the object management system 510 is in the armed state, the control unit 530 is capable of outputting the alarm indication in response to the occurrence of one or more predetermined (or programmed) events. As described earlier, the predetermined (preprogrammed) events may be the removal of an object 524 by an unauthorized user, the movement of the container 512, the tampering of the container 512, the loss of communication with the remote unit 542, and low battery in the control unit 530. Unauthorized use occurs when there is no user identification device 528 that is read or sensed when the object 524 with the object identification device 526 is removed from the container 512. Unauthorized use may also occur when a user identification device 528 is sensed and read by the RFID reader 532, but the user identification code associated with the user identification device 528 is not stored in the control unit 530 and/or not recognized by the control unit 530. Accordingly, a user who does not have a recognizable user identification device 528 will be determined by the control unit 530 to be an unauthorized user. The control unit 530, when in the unarmed state, is disabled from outputting the alarm indication in response to the occurrence of the predetermined events. Such disablement may be controlled by the remote unit 542. Furthermore, it is contemplated that other predetermined events may trigger the alarm indication. The alarm indication may be in the form of a visual alarm indication, an audio alarm indication, or a vibrating alarm indication. As shown in FIG. 27, in one embodiment, the alarm indications may be generated by an audio alarm 581, one or more lights 579, the screen 534, and/or a vibrating alarm 583.

In the embodiment shown in FIG. 26, the control unit 530 has the audio alarm 581, such as a speaker, that is constructed and arranged to generate the audio alarm indication in response to the occurrence of the predetermined events. In this embodiment, the audio alarm indication has a volume of 85 dbA at a distance of 3 meters from the control unit 530. It is contemplated that the volume may vary and may be selected by the user. The type of audio alarm indication may also be selected by the user. For example, the alarm indication may be a siren with five volts buzzer. The audio alarm indication may include, but not limited, to a tone, a buzz, a beep, a sound (e.g., a horn or a chime), and/or a prerecorded voice message. In one embodiment, the audio alarm indication may include tones with changing frequency or volume. In another embodiment, the audio alarm indication may include user configurable tones and alarms.

In one embodiment, the alarm indication is a visual alarm indication that is generated by the one or more lights 579. The one or more lights 579 are constructed and arranged to generate the visual alarm indication in response to the occurrence of the predetermined event. In one embodiment, for example, in the case of a plurality of different color lights, each of the plurality of lights emits different visual alarm indications (e.g., different color alarms) corresponding to the different conditions of the container 512. In one embodiment, the lights may include lamps, light emitting diodes and/or liquid crystal displays. In another embodiment, the visual alarm indication may be generated by, for example, continuous, flashing or strobe lights 579.

The alarm indication may cease when a predetermined time has passed or at the request of the remote unit 542 (e.g., in response to an input provided to the remote unit 542). The remote unit 542 may transmit a signal to reset the control unit 530, causing the alarm indication to cease. When the alarm indication is generated because of the removal of an object 524 by an unauthorized user, the alarm indication may cease when a user identification device 528 is read by the RFID reader 532, and the user identification code of the user identification device 528 is recognized by the control unit 530 as corresponding to an authorized user.

In the embodiment shown in FIG. 27, the control unit 530 includes the processor 580, the display 534, the power supply 547, and the RFID reader 532. The control unit 530 also has the sensors 536, 538, and 540 configured to sense the predetermined events. In this embodiment, the control unit 530 has the aforementioned memory 578 to store information and records of events or activities. The number of records and the information stored may vary and may be customized. For example, each record may include the time, date, and identity of the user obtained from the user identification code that is transmitted from the user identification device 528. The control unit 530 may transmit the information and records to the remote control 542 in accordance with a request from the remote control 542 or may transmit the information and records periodically. Time periods between transmission may vary and may be customized.

The object management system 510 may also allow the selection of records or information to be transmitted and the selection of time periods between transmissions. For example, predetermined events may be transmitted as soon as the predetermined events are sensed by the sensors 536, 538, 540 and the RFID reader 532. Other activities that are not unusual or are less urgent, such as the removal of an object 524 by an authorized user, may be transmitted periodically.

In one embodiment, the control unit 530 transmits the object identification codes of the objects 524 that are present in the container 512 to the remote unit 542. The remote unit 542 transmits to the control unit 530 the user identification codes corresponding to authorized users to enable the control unit 530 to determine unauthorized users. Furthermore, the remote unit 542 may request the transmission or the transmission may occur periodically with the time period between transmissions being predetermined or selected by the user. The wireless transmission of information from the control unit 530 to the remote control 542 and vice versa may be made via radio frequency signals. The communication between the remote unit 542 and the control unit 530 may be carried out by the RFID reader 532. It is contemplated that the object management system 510 may include a converter unit 541 that converts the radio frequency signals from the user identification devices 528 and the object identification devices 526 into a signal that can be transmitted to another system, such as a computer or any programmable logic controller. In one embodiment, the control unit 530 may use the converter unit 541 to enable the control unit 530 to wirelessly communicate with the remote unit 542 using certain type of signals, such as long range cellular signals.

Referring back to FIG. 26, the user identification device 528 is disposed on a wristband. It is contemplated that the user identification device 528 may be disposed on a tag, label, badge, or other forms of device that may be carried by or worn by a user. The user identification devices 528 may be attached to the wristbands or may be embedded within the wristbands. The object identification device 526 may be attached to the object 524. In this embodiment, the object identification device 526 is disposed on a label 527 that is affixed to the objects 524. The object identification devices 526 may be attached to the objects 524 via adhesive bonding, fasteners, screws, pins, or other attachment mechanisms known in the art. It is contemplated that the object identification devices 526 may be embedded within the objects 524. The information stored in the object identification devices 526, such as the object identification code, may be manually entered by the user using the remote control 542 or may be pre-registered. The method for entering of information into the object identification devices 526 will be described later.

In one embodiment, the object identification devices 526 and user identification devices 528 include RFID tags or transponders. The object identification devices 526 and user identification devices 528 may include an antenna, circuitry for processing radio frequency signals, and a digital memory. For example, user identification devices 528 and object identification devices 526 may include an EM4102 ASK 125 Khz compatible card. The object identification devices 526 and user identification devices 528 may also have built-in sensor capabilities that senses temperature, humidity, and shock. The object identification devices 526 and user identification devices 528 may be passive, which are activated only within the response range of the RFID reader 532. When the object identification devices 526 and user identification devices 528 are passive, the RFID reader 532 emits a low-power radio wave field which is used to power the object identification devices 526 and the user identification devices 528 so that the object identification devices 526 and user identification devices 528 can transmit radio frequency signals upon receiving interrogation signals from the RFID reader 532. Object identification devices 526 and user identification devices 528 may also be active, which include their own power source, such as a battery, so that the object identification devices 526 and user identification devices 528 may transmit radio frequency signals continuously or periodically. Active object identification devices 526 and active user identification devices 528 are capable of receiving and transmitting radio frequency signals over a much longer range than passive object identification devices 526 and passive user identification devices 528. Active object identification devices 526 and active user identification devices 528 can also power an internal clock and transmit time and date stamp to a recorded event. It is contemplated that in some embodiments, a combination of active and passive object identification devices 526 and active and passive user identification devices 528 may be used. The wireless transmission of information from the user identification devices 528 and object identification devices 526 and vice versa may be made via radio frequency signals. The signals may be transmitted at different frequencies to decrease the likelihood of interference. It is contemplated that the time intervals between transmission may be random and may be different for each user identification device 528 and object identification device 526.

In the embodiment shown in FIG. 26, the remote unit 542 has an enclosure 584, which may be made of plastic. It is contemplated that the enclosure 584 may be made of other materials, such as wood, or other materials known in the art, or a combination thereof. The user interface 546 of the remote unit 542 displays the status of the control units 530 and their associated containers 512 and the status of the objects 524. The user interface 46 may be a liquid crystal display screen and may have a backlight, just for example. The remote unit 542 also has an input device 586 for entering information or commands. In this embodiment, the input device 586 include actuator buttons. The actuator buttons are the right button 588, the left button 590, the down button 592, the up button 594, and the center button 596. The buttons may be illuminated and may be made of rubber, plastic, or other nonslip materials. In other embodiments, the input devices 586 may include a keypad or a touch screen. In some embodiments, the input device 586 may include microswitches that may be activated by the user to navigate the user interface 546.

In one embodiment, the remote unit 542 is connected to the at least one control unit 530 and their associated containers 512. The remote unit 542 is the main device for controlling the object management system 510. The remote unit 542 may be used to communicate with the control units 530 and to indicate to the user the status of the control units 530 and their associated containers 512. The remote unit 542 may also be used to control the control units 530, such as sending a reset signal to cease the alarm indications generated by the control units 530. In one embodiment, the remote unit 542 may be used to add and remove control units 530 from the object management system 510. When the object management system 510 is in the activated state, information is displayed by the remote unit 542. Information may also be displayed by the control units 530 in the activated state. The object management system 510 may have an inactive state, or a power saving mode, such that less power is consumed by the object management system 510.

Figure 28:
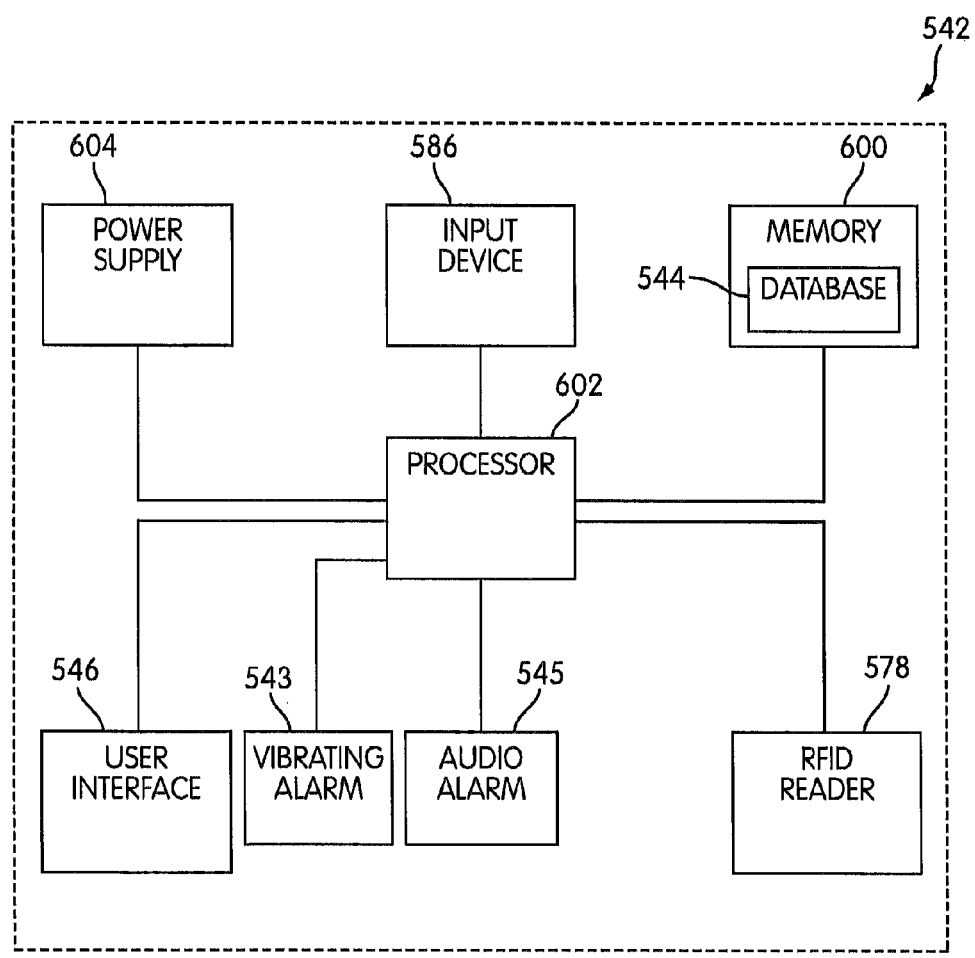
FIG. 28 is a block diagram of a remote unit in accordance with an embodiment.

Referring to FIG. 28, the remote unit 542 may further include a RFID reader 598, memory 600 (such as storage chips or a small hard drive), and a processor 602 for processing information and controlling the functions carried out by remote unit 542. The remote control 542 unit may also include a power supply 604, such as batteries. The remote unit 542 may include an A/C socket or plug to charge the batteries or to provide another source of power. The remote unit 542 may be capable of communicating with the control units 530 via radio frequency signals. It is contemplated that other methods of communications may be used, such as satellite signals. It is also contemplated that the remote unit 542 may communicate with a computer, a personal digital assistant, a cellular phone, or other devices. The remote unit 542 may communicate with devices wirelessly or with a wire. For example, the remote unit 542 may have a USB plug to connect the external devices to the remote unit 542. Furthermore, the remote unit 542 may also have an internal clock to record the time and date of predetermined events and statuses. It is contemplated that the user may also be able to input the time and date into the remote unit 542 using the input device 586. In the embodiment shown in FIG. 28, the remote unit 542 has the aforementioned vibrating alarm 543, the audio alarm 545, and the user interface 546 for generating alarm indications in response to the occurrence of predetermined events. Other embodiments may optionally have one, any, or all of these alarms.

In the embodiment shown in FIG. 29, the control unit 530 receives and processes the signals from the sensors 536, 538, and 540, the electric lock 569, and the RFID reader 532 (see FIG. 27). The control unit 530 processes the signals and transmits the information to the remote unit 542. The remote unit 542 processes the information it receives from the control unit 530 and stores the information in the memory 600. Likewise, the remote unit 542 also transmits information to the control unit 530, such as user identification codes and object identification codes, to be stored in the memory 578 of the control unit 530.

In one embodiment that uses a motion sensor, the motion sensor 536 is configured to detect movement of the container 512. The motion sensor 536 may include a tilt sensor and/or an acceleration sensor. When an acceleration sensor is used, the acceleration sensor is configured to detect the acceleration of the container 512 and, thus, detect the movement of the container 512. In one embodiment, for example, the acceleration of the container 512 is detected in three different axes (e.g., X, Y and Z axes) using one or more acceleration sensors. However, only a single axis (or degree of freedom) of detection can be used. When a tilt sensor is used, the title sensor is configured to detect an inclination or tilt (e.g., an angle) of the container 512, and thus, detect the movement of the container 512. The proximity sensors 538 may be used to identify the removal of tools. The nominal range of the proximity sensors 538 may be low so that the proximity sensors 538 sense the passage of an object 524 through the opening 522, but do not sense the movement of objects 524 outside the container 512. The proximity sensors 538 may be ultrasonic sensors, infrared sensors, and/or laser light sensors. Tamper sensors 540 may also be used to sense damage to the control unit 530 or the removal of the control unit 530 from the container 512. The tamper sensors 540 may also be located on or near the cover 518 such that the tamper sensors 540 may sense the opening or movement of the cover 518. It is contemplated that the tamper sensor 540 may also be located on the power supply unit 547 of the control unit 530 to sense the removal or tampering of the power supply 547. In one embodiment, the sensors 536, 538, and 540 are located in the same enclosure 577 as the control unit 530. In some embodiments, the sensors 536, 538, and 540 may be separate from the control unit 530 and may be placed in different locations in/on the container 512. In some embodiments, the tamper sensors 540 may be electromechanical switches (e.g., microswitch). In an embodiment in which the tamper sensor 540 is used to sense the opening or movement of the cover 518, a contact portion of the microswitch may be engaged by the cover 518 when the cover 518 is in the closed position. When the cover 518 is opened or moved, the microswitch may be activated by the movement of the cover 518 which disengages the contact portion. In another embodiment, the microswitch may be used as a tamper sensor 540 on the control unit 530 to detect the removal of the control unit 530 from the container 512. When the control unit 530 is attached to the container 512, the contact portion of the microswitch may be engaged. When the control unit 530 is removed from the container 512, the contact portion may be disengaged, thus activating the microswitch and indicating that the control unit 530 is being tampered with. It is also contemplated that the tamper sensors 540 may be magnetic switches or optical sensors.

In one embodiment, the remote unit 542 displays the status of the objects 524 on the user interface 546. The status of the objects 524 may include the identification of the objects 524 that are transported in the containers 512 to a worksite. At the worksite, the remote unit 542 may be used to activate the control units 530 such that the control units 530 will monitor the objects 524 in their associated containers 512. The objects 524 may be sorted and displayed according to the containers 512 the objects 524 were transported in. The status of the objects 524 may also include the identification of the objects 524 that are stored in the containers 512 at a certain time, the identification of objects 524 that are not in the containers 512 at a certain time, the identification of objects 524 that are removed from the containers 512, the time and date that objects 524 are removed from the container 512, the identification of objects 524 that are inserted into the containers 512, the time and date the objects 524 are inserted into the containers 512, the identification of the authorized users who remove the objects 524 from the containers 512, and the identification of the authorized users who insert the objects 524 into the containers. These statuses are not intended to be limiting and it is contemplated that only one of these statuses may be used or displayed, or other statuses may be displayed. Furthermore, the statuses may optionally be sorted and displayed by authorized users, by containers 512, or by objects 524.

In one embodiment, the remote control unit 542 displays the status of each of the control units 530 using the user interface 546. The status of the remote unit 542 include whether each control unit 530 is armed or disarmed, and any predetermined events that have not been attended to. The remote unit 542 may also be used to arm and disarm the control units 530. Additionally, the user interface 542 may have an inactive default state, wherein the user interface 542 does not display any information until it receives report of a predetermined event or when the input device 586 is triggered.

Referring back to FIG. 28, the database 544 of the remote unit 542 stores user identification codes associated with authorized users and object identification codes associated with the objects 524. The database 544 may contain the object identification codes of all existing objects 524, and not necessarily only the objects 524 that were transported to the worksite. In this embodiment, the user identification codes and the object identification codes are entered into the remote control device using the input device 586, the RFID reader 598 in the remote unit 542, or the USB port connected to a computer or other programmable logic controller. Details of entering information into the remote unit 542 will be discussed later. In this embodiment, the remote unit 542 transmits the user identification codes and object identification codes to the control units 530. The user identification codes and object identification codes may be associated with user names and object names, which may be entered into the remote unit using the input device 586. There may also be a predetermined list of object names in the remote unit 542 such that the user may select the object name to be associated with the object identification code. Associating object names and user names with object identification codes and user identification codes, respectively, enables the remote unit 542 to display information in a user friendly format. In particular, the remote unit 542 may display the object names and user names instead of the object identification codes and user identification codes.

It is contemplated that the remote unit 542 may be used to monitor the location of the objects and the proximity of the objects 524 to the remote unit 542. For example, the remote unit 542 may utilize RFID receivers positioned in various locations around the worksite to determine the location of the objects 524 using triangulation. The remote unit 542 may also determine the proximity of the objects 524 to the remote unit 542 by the signal strength of the signals transmitted by the object identification device 526.

In one embodiment, at the worksite, the remote unit 542 identifies the containers 512 present by their associated control units 530. The control units 530 may identify the objects 524 stored in their associated containers 512 using the RFID reader 532 in the control units 530. The control units 530 may transmit this list of objects 524 and their containers 512 to the remote unit 542. The remote unit 542 may then display the objects 524 that are in each container 512 sorted by the containers 512.

In one embodiment, the control unit 530 may be integrated with or incorporated into the remote unit 542 such that the combination may optionally have any, some, or all of the features of the control unit 530 and the remote unit 542. For example, in one embodiment, the remote unit 542 and control unit 530 combination may include the user interface 546, the processor 580, the RFID reader 532, the memory 600 having the database 544, and the audio alarm 581 that generates an alarm indication when the remote unit 542 and control unit 530 combination determines that a predetermined event has occurred. In embodiments wherein the control unit 530 is incorporated into the remote unit 542, the remote unit 542 and the control unit 530 combination may be disposed in/on the container 512 or may be portable and may be carried by the user. In some embodiments having the remote unit 542 and control unit 530 combination, the remote unit 542 may be optionally removed from the remote unit 542 and control unit 530 combination to be used at a remote location from the control unit 530. Alternatively, in some embodiments, the remote unit 542 and control unit 530 combination may be fully integrated and inseparable such that the remote unit 542 and the control unit 530 cannot be separated to be used at remote locations from one another. In that case, in one embodiment, the remote unit 542 and control unit 530 combination may just be a control unit 530 having features of both the remote unit 542 and the control unit 530.

Figure 30:
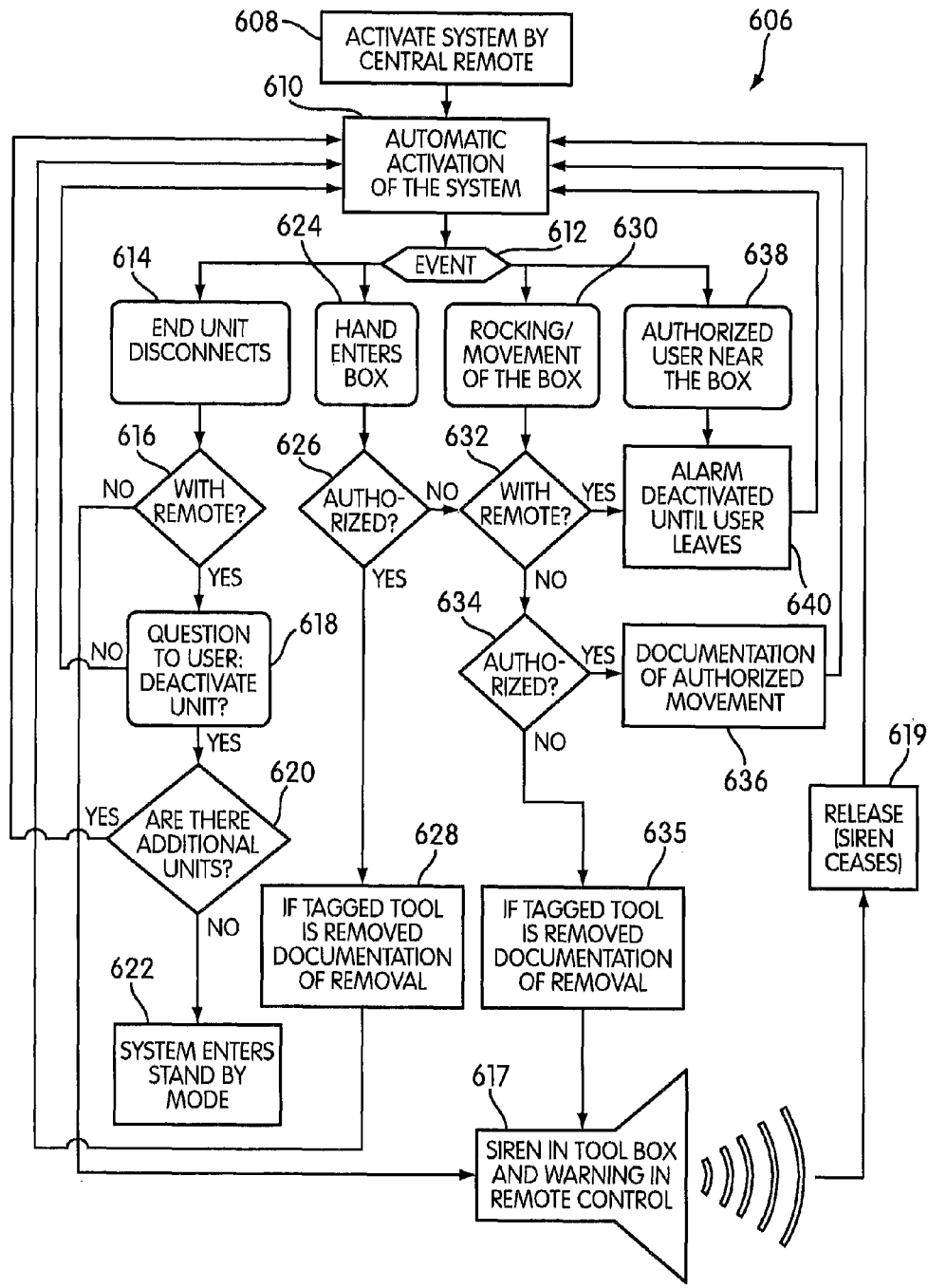
FIG. 30 is a flow diagram illustrating operating procedures performed by the control unit and the remote unit in accordance with one embodiment.

Referring to FIG. 30, a method 606 for operating the object management system 510 is performed by the remote unit 542. Initially, the object management system 510 is in the inactive state in which no information is displayed on the remote unit 542. In procedure 608, the remote unit 542 activates the object management system 510, wherein information is displayed by the remote unit 42 and alarm indications may be generated. The object management system 542 may also be activated automatically in procedure 610 by the occurrence of events determined by procedure 612.

In procedure 114, the remote unit 542 determines if a control unit 530 has lost communication with the remote unit 542. If there is a loss of communication between the remote unit 542 and one or more of the control units 30 in the object management system 510, the method 606 proceeds to procedure 616 to determine whether the loss of communication was on purpose and if it was performed with the remote unit 542. If the remote unit 542 determines that the loss of communication was not caused by the remote unit 542 and is a predetermined event, the method 606 proceeds to procedure 617 where an alarm indication is generated in the remote unit 542 and in the control unit 530 that has lost communication with the remote unit 542. The method 606 then proceeds to 619 in which the siren ceases after a predetermined amount of time or at the request of the remote unit 542. The user of the remote unit 542 may cease the alarm indication by using the input device 586. The method 606 proceeds to procedure 610 in which the object management system 510 is activated. The remote unit 542 may display the event that has occurred on the user interface 546. If the remote unit 542 determines that the loss of communication was made using the remote unit 542, the method 606 proceeds to procedure 618 in which the user may deactivate the control unit 530 by confirming that the user intended for the remote unit 542 and the control unit 530 to lose communication. If the user decides not to deactivate the control unit 530, the method 606 then proceeds to procedure 610 in which the object management system 510 is activated. If the user decides to deactivate the control unit 530 using the remote unit 542, the method proceeds to procedure 620 in which the remote unit 542 determines if there are other control units 530 in communication with the remote unit 542. If there are additional control units 530 present, the method 606 proceeds to procedure 610 and the object management system 510 is activated. If there are no additional control units 530 present, then the object management system 510 enters the stand by mode in procedure 622 to await further instructions. The object management system 510 may also be deactivated to be in the power saving mode.

In procedure 624, the control units 530 determine if a user is accessing the contents of their associated containers 512. For example, a user may insert a hand into the container 512 to remove or insert objects 524. If that is the case, then the method 606 proceeds to procedure 626 in which the control unit 530 determines if the user is authorized. This is determined by reading the user identification device 528, if present, and determining if the user identification device 528 has a user identification code that is on the list of user identification codes stored in the control unit 530 and the remote unit 542. If the user identification device 528 is not present or is not recognized, the method 606 proceeds to procedure 635 in which the object 524 that is removed is recorded and transmitted to the remote unit 542. The method 606 also proceeds to procedure 617 in which an alarm indication is generated in the remote unit 542 and in the control unit 530 in response to the occurrence of the predetermined event. The method 606 then proceeds to procedure 619 in which the siren ceases after a predetermined amount of time or at the request of the remote unit 542. The user of the remote unit 542 may cease the alarm indication by using the input device 586. The method 606 then proceeds to procedure 610 in which the object management system 510 is activated. If the user identification device 528 is present and recognized, and the user identification code is on the list of user identification codes in the remote unit 542 and the control unit 530, the method proceeds to procedure 628 in which the control unit 530 determines if an object 524 has been inserted or removed and if so, the object identification code of the object 524. The object identification device 526 is read and the removal or insertion of the object 524 by the authorized user is recorded in the memory 578 of the control unit 530, which then transmits the information to the remote unit 542. The information may include the object identification code, the name of the object 524, the user identification code of the user who removed or inserted the object 524, and the user name. The method 606 proceeds to procedure 610 in which the object management system 510 is activated.

In procedure 630, the control units 530 determine if there is rocking or movement of their associated containers 512. If there is a rocking or movement, the method 606 proceeds to procedure 632 in which the control unit 530 determines if the movement or rocking of the container 512 is carried out by a user with the remote unit 542. This may be determined by the proximity of the remote unit 542 to the control unit 530 when the rocking or movement is sensed. If the movement or rocking of the container 512 is by a user with the remote unit 542, then the alarm indications are deactivated until the user is not in the proximity. It is contemplated that the proximity may vary and the distance may be selected by the user. If the rocking or movement is not carried out by a user with the remote unit 542, then the method 606 proceeds to procedure 634 in which the control unit 30 determines if the movement or rocking is carried out by an authorized user. This may be determined by the user identification device 528 that is in proximity to the control unit 530. If the user has a user identification device 528 with a user identification code that is recognized by the control unit 530, then the method 1606 proceeds to procedure 636 in which the authorized movement is recorded by the control unit 530 and transmitted to the remote unit 542. The method 606 then proceeds to procedure 610 in which the object management system 510 is activated. If the control unit 530 determines that the movement or shaking of the container 512 is not by an authorized user, the method 606 proceeds to procedure 635 in which the control unit 530 determines if an object 524 has been removed and if so, the identity of the object 524 that has been removed. The object identification code associated with the object identification device 526 of the object 524 is recorded by the control unit 530 and transmitted to the remote unit 542. The information is recorded in the memory 600 of the remote unit 542. The method 606 then proceeds to procedure 617 in which an alarm indication is generated in the remote unit 542 and in the control unit 530 in response to the occurrence of the predetermined event. The method 606 then proceeds to 619 in which the siren ceases after a predetermined amount of time or at the request of the remote unit 542. The user of the remote unit 542 may cease the alarm indication by using the input device 586. The method 606 then proceeds to procedure 610 in which the object management system 510 is activated.

In procedure 638, the control unit 530 determines if an authorized user is in proximity to the container 512. This may be determined by the user identification device 528 that is worn or carried by the user. If the control unit 530 determines that the user is authorized, the method 606 proceeds to procedure 640 in which the alarm indication is deactivated until the authorized user is not in the proximity. It is contemplated that the proximity may vary and may be selected by the user using the remote unit 542. The deactivation of the alarm indications, or the disarming of the control unit 530, enables the authorized user to remove and insert objects 524 freely from the container 524 without the chance that alarm indications would be generated accidentally. The method 606 then proceeds to procedure 610 in which the object management system 510 is activated.

Figure 31:
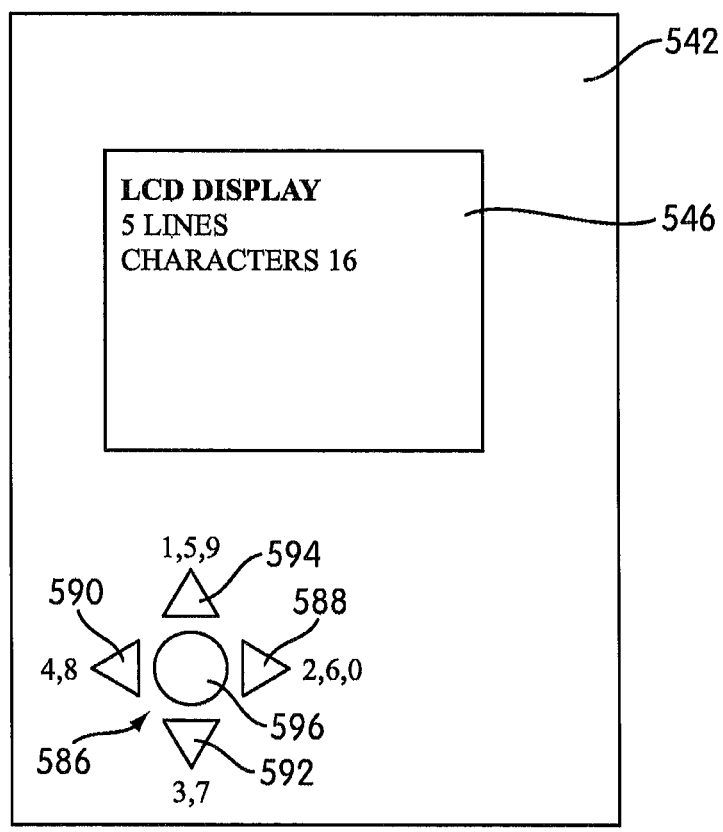
FIG. 31 is a front view of the remote unit in accordance with one embodiment.

FIG. 31 illustrates the remote unit 542 in accordance with an embodiment. The user interface 546 displays information concerning the object management system 510. The user may also use the user interface 546 and the input device 586 to enter information into the remote unit 542.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An object identification device configured to transmit a radio frequency signal containing an object identification code, the object identification device constructed to be secured to an associated object, the object identification device comprising:
   a housing having an interior space;
   a transmitter within the housing configured to transmit radio frequency signals containing an object identification code;
   a closed loop connector comprising an electrically conductive material and operatively connected to the housing and moveable between i) an unsecured position wherein the at least one object identification device can be released from the associated object and ii) a secured position wherein the housing and the connector form a closed loop to be attached to the associated object, the connector being adjustable to adjust a size of the closed loop formed by at least a portion of the connector, wherein the electrically conductive material of the connector is configured such that severing the connector or disconnecting the connector from the housing causes the RFID transmitter to cease transmission of radio frequency signals from the object identification device, wherein the electrically conductive material forms a continuum of electrical connection portions along a length of the connector, and wherein the continuum of electrical connection portions are constructed and arranged to slidably engage with components disposed in the housing to continually maintain a closed circuit connection with the components disposed in the housing while the connector is being adjusted to adjust the size of the closed loop.

2. The object identification device of claim 1, wherein the connector comprises a first portion constructed and arranged to be fixed within the housing.

3. The object identification device of claim 1, wherein the transmitter is configured to transmit a signal indicating the severance of the connector or the disconnection of the connector from the housing.

4. The object identification device of claim 1, wherein the connector comprises a first portion and a second portion, each of the first portion and the second portion being removably connected to the housing to form the closed loop.

5. The object identification device of claim 1, wherein the connector comprises a second portion constructed and arranged to be movable into and out of the housing such that the size of the closed loop formed by the portion of the connector is adjustable.

6. The object identification device of claim 1, wherein the housing comprises electrical contacts configured to connect to the electrically conductive material.

7. The object identification device of claim 1, wherein the connector comprises teeth provided on a surface thereof.

8. The object identification device of claim 7, wherein the housing comprises a teeth engaging structure constructed and arranged to engage with the teeth of the connector to prevent the connector from being moved to the unsecured position.

9. The object identification device of claim 1, wherein the housing is constructed and arranged to receive a screw that is constructed and arranged to engage at least a portion of the connector to prevent the connector from being moved to the unsecured position.

10. The object identification device of claim 1, wherein the connector comprises a first end portion and a second end portion, and wherein the first end portion and the second end portion of the connector are not connected to one another.

11. The object identification device of claim 1, wherein the connector comprises a first end portion and a second end portion, and wherein one of the first end portion and the second end portion of the connector is inserted into and pulled through a structure of the housing to adjust the size of the closed loop.

12. An object identification device configured to transmit a radio frequency signal containing an object identification code, the object identification device constructed to be secured to an associated object, the object identification device comprising:

a housing having an interior space;

a transmitter within the housing configured to transmit radio frequency signals containing an object identification code;

a closed loop connector comprising an electrically conductive material and operatively connected to the housing and moveable between i) an unsecured position wherein the at least one object identification device can be released from the associated object and ii) a secured position wherein the housing and the connector form a closed loop to be attached to the associated object, the connector being adjustable to adjust a size of the closed loop formed by at least a portion of the connector, wherein the electrically conductive material of the connector is configured such that severing the connector or disconnecting the connector from the housing causes the RFID transmitter to cease transmission of radio frequency signals from the object identification device, wherein the electrically conductive material forms a continuum of electrical connection portions along a length of the connector, wherein the continuum of electrical connection portions continually maintains a closed circuit connection with components disposed in the housing while the connector is being adjusted to adjust the size of the closed loop, wherein the connector comprises a first end portion and a second end portion, and wherein one of the first end portion and the second end portion of the connector is removably connected to the housing such that the one of the first end portion and the second end portion of the connector may be removed from the housing to move the connector to the unsecured position wherein the at least one object identification device can be released from the associated object.

* * * * *